(12) United States Patent
Nystad et al.

(10) Patent No.: US 9,041,723 B2
(45) Date of Patent: May 26, 2015

(54) METHOD OF AND APPARATUS FOR ENCODING AND DECODING DATA

(75) Inventors: Jorn Nystad, Trondheim (NO); Anders Lassen, Trondheim (NO)

(73) Assignee: ARM LIMITED, Cambridge (GB)

( * ) Notice: Subject to any disclaimer, the term of this patent is extended or adjusted under 35 U.S.C. 154(b) by 295 days.

(21) Appl. No.: 13/464,663

(22) Filed: May 4, 2012

(65) Prior Publication Data

US 2012/0281005 A1 Nov. 8, 2012

(30) Foreign Application Priority Data

May 5, 2011 (GB) .................................. 1107523.1
Oct. 19, 2011 (GB) .................................. 1118037.9

(51) Int. Cl.
*G09G 5/00* (2006.01)
*G06T 9/00* (2006.01)
*H04N 19/90* (2014.01)

(52) U.S. Cl.
CPC . *G06T 9/00* (2013.01); *G06T 9/005* (2013.01); *H04N 19/90* (2013.01)

(58) Field of Classification Search
CPC ........ G06T 15/04; G06T 11/001; G09G 5/39; G09G 5/346; G06C 17/00; H03M 7/06; H03M 7/08
See application file for complete search history.

(56) References Cited

U.S. PATENT DOCUMENTS

| | | | |
|---|---|---|---|
| 5,046,119 A | 9/1991 | Hoffert | |
| 5,047,853 A | 9/1991 | Hoffert | |
| 5,956,431 A | 9/1999 | Iourcha | |
| 6,292,590 B1 | 9/2001 | Kondo et al. | |
| 6,298,169 B1 | 10/2001 | Guenter | |
| 6,775,417 B2 | 8/2004 | Hong | |
| 6,937,250 B1 | 8/2005 | Schilling | |
| 6,940,511 B2 | 9/2005 | Akenine-Moller et al. | |
| 7,242,811 B2 | 7/2007 | Fenney | |
| 7,734,105 B2 | 6/2010 | Strom et al. | |
| 8,102,402 B2 | 1/2012 | Sorgard | |
| 8,289,343 B2 | 10/2012 | Sorgard | |

(Continued)

FOREIGN PATENT DOCUMENTS

| | | |
|---|---|---|
| CN | 101398936 | 4/2009 |
| EP | 0775981 | 3/1997 |

(Continued)

OTHER PUBLICATIONS

UK Search Report dated Mar. 27, 2012, UK Patent Application No. GB 1117110.5.

(Continued)

*Primary Examiner* — Antonio A Caschera
(74) *Attorney, Agent, or Firm* — Vierra Magen Marcus LLP

(57) ABSTRACT

Each block of texture data elements is encoded as a block of texture data that includes a set of integer values to be used to generate a set of base data values for the block, and a set of index values indicating how to use the base data values to generate data values for the texture data elements that the block represents. The integer values and the index values are both encoded in an encoded texture data block using a combination of base-n values, where n is greater than two, and base-2 values. Predefined bit representations are used to represent plural base-n values (n>2) collectively, and the bits of the bit representations representing the base-n values are interleaved with bits representing the base-2 values in the encoded texture data block.

18 Claims, 11 Drawing Sheets

(56) References Cited

U.S. PATENT DOCUMENTS

| 8,666,177 | B2 | 3/2014 | Chen et al. |
|---|---|---|---|
| 2002/0171660 | A1 | 11/2002 | Luo |
| 2003/0123740 | A1 | 7/2003 | Mukherjee |
| 2003/0227462 | A1 | 12/2003 | Akenine-Miller |
| 2008/0050047 | A1 | 2/2008 | Bashyam et al. |
| 2008/0055331 | A1 | 3/2008 | Iourcha et al. |
| 2011/0148896 | A1 | 6/2011 | Lee |
| 2011/0148897 | A1 | 6/2011 | Wong et al. |
| 2012/0281006 | A1 | 11/2012 | Nystad |
| 2012/0281007 | A1 | 11/2012 | Nystad |
| 2012/0281925 | A1 | 11/2012 | Nystad |
| 2013/0084018 | A1 | 4/2013 | Nystad |

FOREIGN PATENT DOCUMENTS

| EP | 0859517 A2 | 8/1998 |
|---|---|---|
| EP | 1280359 A2 | 1/2003 |
| GB | 1517383 | 8/1975 |
| GB | 2423906 | 9/2006 |
| GB | 2439481 | 12/2007 |
| WO | WO9713219 A1 | 4/1997 |
| WO | WO 99/22519 | 5/1999 |
| WO | WO 2008027413 | 3/2008 |
| WO | WO2009/133860 | 4/2009 |

OTHER PUBLICATIONS

UK Search Report dated Feb. 28, 2013, UK Patent Application No. GB1211862.6.
English translation of Abstract of Chinese Application No. CN101398936.
BC6H Format, 2011 Microsoft, http://msdn.microsoft.com/en-us/library/hh308952(d=printer).aspx.
BC7H Format, 2011 Microsoft, http://msdn.microsoft.com/en-us/library/hh308953(d=printer).aspx.
Levkovich-Maslyuk, "Texture Compression with Adaptive Block Partitions," ACM Multimedia, 2000, pp. 401-403.
Ivanov, "Image Compression with Vector Quantization," Apr. 16, 2001, http://www.gamasutra.com/view/feature/131499/image_compression_with_vector_.php.
Block Truncation Coding, Wikipedia, Aug. 2013, http://en.wikipedia.org/wiki/Block_Truncation_Coding.
Fenney, "Texture Compression using Low-Frequency Signal Modulation," Graphics Hardware 2003, Imagination Technologies Ltc., UK, The Eurographics Association 2003.
PVRTC, Wikipedia, Mar. 2012, http://en.wikipedia.org/wiki/PVRTC.
S3 Texture Compression, Wikipedia, Nov. 2013, http://en.wikipedia.org/wiki/S3_Texture_Compression.
Strom, "iPackman: High-Quality, Low-Complexity Texture Compression for Mobile Phones," Lund University, Graphics Hardware 2005, The Eurographics Association.
Karhunen-Loeve theorem, Wikipedia, Sep. 2013, http://en.wikipedia.org/wiki/Karhunen%E2%80%93Lo%C3%A8ve_theorem.
Castano, "High Quality DXT Compression using OpenCL for CUDA," NVIDIA, Mar. 2009.
"Simple, fast DXT compressor," Molly Rocket Feed, Jun. 2007, https://mollyrocket.com/forums/viewtopic.php?t=392.
van Waveren, "Real-Time DXT Compression," Id Software, Inc. May 20, 2006.
U.S. Appl. No. 13/753,921, filed Jan. 30, 2013.
U.S. Appl. No. 13/836,887, filed Mar. 15, 2013.
U.S. Appl. No. 13/933,604, filed Jul. 2, 2013.
Office Action dated Mar. 21, 2014 in U.S. Appl. No. 13/630,040, 18 pages.
Office Action (Restriction) dated May 13, 2014 in U.S. Appl. No. 13/464,686, 6 pages.
Office Action (Restriction) dated May 13, 2014 in U.S. Appl. No. 13/464,696, 6 pages.
Response to Office Action (Restriction) filed Jul. 14, 2014 in U.S. Appl. No. 13/464,686, 12 pages.
Response to Office Action (Restriction) filed Jul. 14, 2014 in U.S. Appl. No. 13/464,696, 17 pages.
Combined Search and Examination Report, dated Oct. 9, 2012, GB Patent Application No. GB1208058.6.
Response to Office Action filed Jul. 10, 2014 in U.S. Appl. No. 13/630,040, 8 pages.
Combined Search and Examination Report, dated Oct. 8, 2012, GB Patent Application No. GB1208060.2.
Combined Search and Examination Report, dated Oct. 9, 2012, GB Patent Application No. GB1208059.4.
Combined Search and Examination Report, dated Sep. 27, 2012, GB Patent Application No. GB1208056.0.
Search and Examination Report dated Jul. 3, 2014 in GB Patent Application No. GB1401504.4, 8 pages.
Communications, Radar and Signal Processing; vol. 131, Issue 5; Aug. 1984; D. E. Pearson et al; Transform coding of images using interleaved blocks; pp. 466-472; 7 pages.
Notice of Allowance dated Jul. 1, 2014 in U.S. Appl. No. 13/630,040, 11 pages.
Office Action dated Sep. 18, 2014 in U.S. Appl. No. 13/464,686, 29 pages.
Office Action dated Sep. 18, 2014 in U.S. Appl. No. 13/464,696, 24 pages.
Office Action dated Oct. 9, 2014 in U.S. Appl. No. 13/933,604, 19 pages.
Office Action dated Dec. 29, 2014 in U.S. Appl. No. 13/753,921, 36 pages.
Response to Office Action filed Jan. 9, 2015 in U.S. Appl. No. 13/933,604, 13 pages.
Response to Office Action filed Jan. 20, 2015 in U.S. Appl. No. 13/464,696, 15 pages.
Notice of Allowance date Feb. 6, 2015 in U.S. Appl. No. 13/464,696, 22 pages.
Office Action dated Feb. 13, 2015 in U.S. Appl. No. 13/836,887, 60 pages.
Response to Office Action filed Feb. 18, 2015 in U.S. Appl. No. 13/464,686, 17 pages.
Final Office Action filed Mar. 2, 2015 in U.S. Appl. No. 13/933,604, 11 pages.

FIG. 5

*Non-Partitioned Block Layout with Dual Planes*

FIG. 6

2-Partition Block Layout

FIG. 7

3-Partition Block Layout

FIG. 8

*4-Partition Block Layout*

FIG. 9

2-Partition Block Layout with Dual Planes

FIG. 10

*2D Void-Extent Block Layout*

FIG. 11

3D Void-Extent Block Layout

METHOD OF AND APPARATUS FOR ENCODING AND DECODING DATA

CLAIM OF PRIORITY

This application claims priority to UK Application No. 1107523.1 filed May 5, 2011 and UK Application No. 1118037.9 filed Oct. 19, 2011, both of which are incorporated herein by reference in their entirety.

BACKGROUND

The technology described herein relates to a method of and apparatus for encoding and decoding data, and in particular to such a method and apparatus for use to compress and decompress texture data in computer graphics systems.

It is common in computer graphics systems to generate colours for sampling positions in the image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to encode such texture data in a "compressed" form so as to try to reduce, e.g., the storage and bandwidth burden that may be imposed on a device.

One known such texture data compression technique determines a set or palette of colours to be used for, e.g., a given texture map, and then stores for each texture element (texel) in the texture map an index into the set or palette of colours, indicating the colour to be used for that texel. This has the advantage that only an index, rather than a full (e.g.) colour value needs to be stored for each texel. This helps to reduce, e.g., the texture data storage requirements, but still has some drawbacks, such as in terms of reduced image quality and the necessary data processing.

Another known texture compression technique is to use so-called block truncation coding (BTC). In this technique the overall texture array (texture map) is subdivided into smaller blocks, e.g. of 4×4 texels, and a number (typically two) of base or primary colour values are determined for each such block, with each texel in the block being set to one of the base colour values. This again saves on the data that has to be stored and accessed, but at a cost of lower image quality.

U.S. Pat. No. 5,047,853 describes an improved block truncation coding technique. In this technique, two base colours are again stored for each texel block, but two additional colours to be used for the block are also derived from those two base colours (e.g. by linearly blending those colours). In this way, four colours are provided as a "palette" for the texel block, but only two colour values need to be stored for the block. Each texel in the block is then encoded using two bits, to indicate which of the four block "colours" should be used for the texel. This system provides improved image quality over basic block truncation coding, but requires more data per block.

In texture compression schemes, each encoded texture data block will typically include, inter alia, one or more integer values, representing, e.g., data values such as endpoint or base colours, to be used when determining the data value (e.g. colour) for a texture data element that the block represents. The encoded block may also include other integer values, such as index values for texture data elements that the block represents. While these integer values can be encoded in an encoded texture data block in any desired fashion, the Applicants have recognised that there is scope for improved integer value encoding and compression techniques for use when, e.g., encoding texture data for graphics processing.

BRIEF DESCRIPTION OF THE DRAWINGS

A number of embodiments of the technology described herein will now be described by way of example only and with reference to the accompanying drawings, in which:

FIGS. 3 to 11 show encoded block layouts of the described embodiment of the technology described herein.

DETAILED DESCRIPTION

Figure 1:
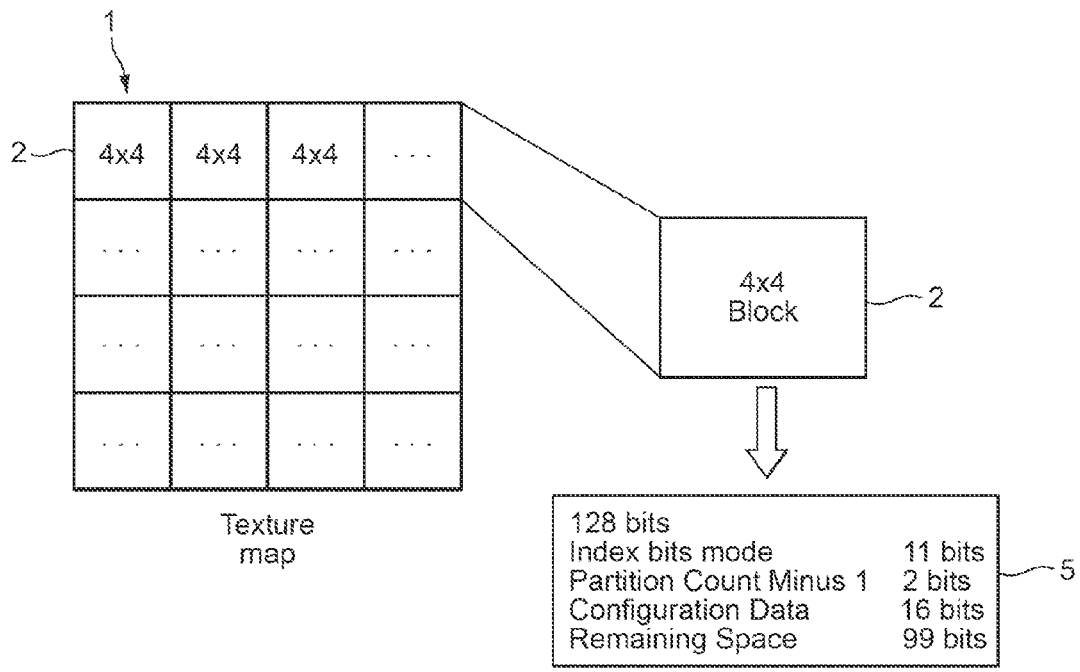
FIG. 1 shows schematically the encoding of an array of image data as a plurality of encoded data blocks in accordance with an embodiment of the technology described herein.

A first embodiment of the technology described herein comprises a method of representing integer values to be encoded in an encoded texture data block that represents a set of graphics texture data elements to be used in a graphics processing system, the method comprising:

representing an integer value to be encoded in the encoded texture data block using a base-n value, where n is greater than two.

A second embodiment of the technology described herein comprises an apparatus for representing integer values to be encoded in an encoded texture data block that represents a set of graphics texture data elements to be used in a graphics processing system, the apparatus comprising:

processing circuitry for representing an integer value to be encoded in the encoded texture data block using a base-n value, where n is greater than two.

Another embodiment of the technology described herein comprises a block of texture data representing a set of texture data elements to be used in a graphics processing system, wherein: one or more integer values encoded in the texture data block are represented using a base-n value, where n is greater than two.

The technology described herein uses base-n values, where n is greater than two, to represent integer values to be included in an encoded texture data block when encoding texture data for use in a graphics processing system.

Using base-n (n>2) values to represent integer values in an encoded texture data block helps to make the encoding more efficient, as it can, for example, allow the use of non-integer numbers of bits for encoding integer values in an encoded texture data block. It can also, as will be discussed further below, facilitate a particularly flexible, and readily, and finely, adjustable, integer value encoding scheme.

Any base-n values (n>2) can be used to encode the integer values. However in an embodiment the encoding can use and uses base-3 values, which are in an embodiment encoded using trits (items that can take three values, namely the values 0, 1, 2 (whereas base-2 values are encoded using bits, which can only take the values 0 and 1)). In an embodiment the encoding can also or instead use, and uses, base-5 values, which are in an embodiment encoded using quints (items that can take five values, namely the values 0, 1, 2, 3, 4). In an embodiment both base-3 and base-5 values can be, and are, used to encode integer values in the encoded texture data blocks.

In an embodiment, base-2 values can also be used to encode integer values in an encoded texture data block. Thus in an embodiment a combination of both base-2 values, and base-n values (where n is greater than two) can be, and are, used to represent integer values when they are encoded. Accordingly, in an embodiment, the integer values encoded in an encoded texture data block can be, and are, encoded using a combination of base-2 values, and base-3 and/or base-5 values. In an embodiment a combination of base-2, base-3 and base-5 values can be, and are, used.

The base-n (n>2) values used to represent the integer values to be encoded can be encoded in the encoded texture data block in any desired and suitable manner. However, in an embodiment the base-n (n>2) values are stored (encoded) in the encoded texture data block using predefined bit representations (with each respective bit representation indicating a given base-n value (n>2) or set of plural base-n values (n>2)).

In an embodiment, bit representations that each represent a particular combination of plural base-n values (e.g., and in an embodiment, base-n (n>2) values for a group of plural integer values to be encoded in the encoded texture data block) are used, as this has been found to provide a particularly efficient way of storing the base-n values in the encoded texture data block.

For example, in an embodiment the bit representations that are used for trits are such that n trits will be represented with $$\left\lceil \frac{8n}{5} \right\rceil$$

bits (i.e. bit representations of 8 bits are in an embodiment used to indicate the values of 5 trits). Similarly, for quints, the bit representations are in an embodiment such that n quints will be represented with $$\left\lceil \frac{7n}{3} \right\rceil$$

bits (i.e. bit representations of 7 bits are used to indicate the values of 3 quints).

It is believed that the use of such bit representations may be new and advantageous in its own right.

Thus an embodiment of the technology described herein comprises a method of representing base-n values, where n is greater than two, to be used to represent integer values to be encoded in an encoded texture data block that represents a set of graphics texture data elements to be used in a graphics processing system, the method comprising:

using predefined bit representations to represent collectively plural base-n values, where n is greater than two, in an encoded texture data block.

Another embodiment of the technology described herein comprises an apparatus for representing base-n values, where n is greater than two, to be used to represent integer values to be encoded in an encoded texture data block that represents a set of graphics texture data elements to be used in a graphics processing system, the apparatus comprising:

processing circuitry for using predefined bit representations to represent collectively plural base-n values, where n is greater than two, in an encoded texture data block.

An embodiment of the technology described herein comprises a block of texture data representing a set of texture data elements to be used in a graphics processing system, wherein:

plural integer values encoded in the texture data block are represented using base-n values, where n is greater than two; and the block includes:

a predefined bit representation that represents collectively a plurality of the base n-values.

As will be appreciated by those skilled in the art, these embodiments of the technology described herein can, and in an embodiment do, include any one or more or all of the preferred and optional features of the technology described herein described herein, as appropriate.

The bit representations for the sets of plural base-n values (n>2) are in an embodiment representations from which the individual base n (n>2) values (in the set) can be derived by using bit manipulation of the bit representation (and in an embodiment bit manipulations that can easily be implemented in hardware). This then facilitates decoding the bit representations more straightforwardly in hardware. In an embodiment, particular bit patterns (representations) are used to represent any special cases (combinations of base-n values) that are difficult to represent in a form that can easily be decoded using bit manipulation.

Other arrangements, such as the use of look-up tables, to interpret the bit representations would, of course, be possible.

Where an integer value is to be encoded using a base-n (n>2) value, then in an embodiment each integer value to be encoded is broken into plural, and in an embodiment two, parts before encoding, and in an embodiment into respective high and low parts (portions). One of these parts (in an embodiment the low part) is in an embodiment then represented by zero or more bits (base-2 values), and the other part (in an embodiment the high part) by one or more (and in an embodiment by one) base-n (n>2) values (e.g., and in an embodiment, trit(s) or quint(s)).

Thus, in a embodiment, at least some of the integer values included in the encoded texture data block are encoded using a combination of one or more base-2 values and one or more base-n (n>2) values (and in an embodiment one and only one base-n (n>2) value). Similarly, the technology described herein in an embodiment comprises encoding one or more of the integer values included in the encoded texture data block using a combination of one or more base-2 values and one or more (and in an embodiment one and only one) base-n (n>2) values. In these arrangements, the base-2 values in an embodiment represent the lower part (portion) of the integer value, and the base-n (n>2) value(s) the higher part (portion).

Where the integer values to be encoded in the encoded texture data block are represented using a combination of base-n (n>2) values and bits (base-2 values), then the bit representations for the base-n (n>2) values and the bit values being used to encode the integer values in the encoded texture data block can be organised in the encoded texture data block in any desired and suitable manner. For example, the bit representations for the base-n (n>2) values could be placed together, with the bit values for the base-2 values then following (or vice-versa). However, in an embodiment, where the integer values to be encoded in the encoded texture data block are represented using a combination of base-n (n>2) values and bits (base-2 values), then in an embodiment the bits of the bit representations for the base-n (n>2) values are interleaved with the bits for the base-2 values in the encoded texture data block. Accordingly, where the base-n (n>2) values for a group of integers to be encoded are represented as a particular bit representation (as discussed above), the bits of that bit representation are in an embodiment interleaved with the bits for the base-2 values for that group of integers.

In an embodiment the bits for the base-2 values for a given integer are placed next to the bits of the base-n (n>2) value bit representation that represent or indicate the base n (n>2) value for that integer. In other words, the base-n (n>2) value information (bits) for a given integer value being encoded are in an embodiment placed next to the base-2 value information for that integer value in the encoded texture data block.

It is again believed that such arrangements may be new and advantageous in their own right.

Thus, an embodiment of the technology described herein comprises a method of encoding integer values to be encoded in an encoded texture data block that represents a set of graphics texture data elements to be used in a graphics processing system, the method comprising:

representing a set of integer values to be encoded in the encoded texture data block using a combination of base-n values, where n is greater than two, and base-2 values;

representing the values of the base-n values (n>2) for the set of integer values using bit representations, and representing the values of the base-2 values for the set of integer values using bits; and interleaving the bits of the bit representations representing the values of the base-n values (n>2) with the bits representing the values of the base-2 values in the encoded texture data block.

An embodiment of the technology described herein comprises an apparatus for encoding integer values to be encoded in an encoded texture data block that represents a set of graphics texture data elements to be used in a graphics processing system, the apparatus comprising:

processing circuitry for representing a set of integer values to be encoded in the encoded texture data block using a combination of base-n values, where n is greater than two, and base-2 values;

processing circuitry for representing the values of the base-n values (n>2) for the set of integer values using bit representations, and representing the values of the base-2 values for the set of integer values using bits; and processing circuitry for interleaving the bits of the bit representations representing the values of the base-n values (n>2) with the bits representing the values of the base-2 values in the encoded texture data block.

An embodiment of the technology described herein comprises a block of texture data representing a set of texture data elements to be used in a graphics processing system, wherein:

the block of texture data:

represents a set of integer values encoded in the encoded texture data block using a combination of base-n values, where n is greater than two, and base-2 values; and represents the values of the base-n values (n>2) for the set of integer values using bit representations, and representing the values of the base-2 values for the set of integer values using bits; and wherein:

the bits of the bit representations representing the values of the base-n values (n>2) are interleaved with the bits representing the values of the base-2 values in the encoded texture data block.

As will be appreciated by those skilled in the art, these embodiments of the technology described herein can, and in an embodiment do, include any one or more or all of the preferred and optional features of the technology described herein described herein, as appropriate.

In a embodiment, the encoding process is configured to store the "useful" information in the lowest bits in the relevant sequence of encoded bits, and if there are not enough useful values to fill the entire sequence of bits that would be encoded, the bit sequence is padded with zeroes up to the required size at encode time. The decoder is correspondingly in an embodiment configured to assume that any bits that are "missing" from the encoded texture data block in a sequence of bits encoding integer values are always zero. This means that if the encoding is done in a defined order (which it in an embodiment is), the "dummy", padding zeroes do not need to be included in the encoded texture data block, thereby facilitating more efficient inclusion of the integer values in the encoded texture data block.

Where a set of integer values is to be encoded using base-2 values (i.e. bits) only (as will be discussed further below), then in an embodiment the integers are encoded sequentially in the encoded texture data block, with lowest bit appearing first in the sequence encoding.

The integer value encoding arrangement of the technology described herein can be used to encode any desired integer values that are to be included in an encoded texture data block, such as colour (or other) data values to be included in the block, index values to be included in the block, etc.

In an embodiment, the encoding is used to encode sequences or sets of one or more, and in an embodiment of plural, integer values in the encoded texture data block. In an embodiment, plural sets of integer values are encoded in the encoded texture data block(s) in the manner of the technology described herein. In one embodiment, the encoded texture data block includes two sequences or sets of integer values, that are each respectively encoded in the manner of the technology described herein.

In an embodiment the integer values that are encoded in the manner of the technology described herein comprise both index values for use for the encoded texture data block, and one or more data values (e.g. colour values) to be used as, and/or to generate, a set of base data values (e.g., and in an embodiment, endpoint colour values) to be used for the encoded texture data block.

In an embodiment some or all of the integer values that are encoded in the block are integer values from a defined (allowable) range or ranges of integer values. Thus, a given encoded texture data block in an embodiment can have defined for it a range (or ranges) of integer values, from which a set of integer values for the block are then taken (i.e. such that each integer value in the set will be an integer from the defined (permitted) integer value range).

In this case the range(s) of values that the integer values fall within can in an embodiment be defined for, and can be and are derived for, each encoded texture data block separately (i.e. on a block-by-block basis).

This will then allow, e.g., some encoded blocks to use a greater range of integer values, and other encoded texture data blocks to use a more restricted range of integer values. This further enhances the flexibility of the system of the technology described herein.

In an embodiment a number of different integer value ranges can be defined and are supported (i.e. the integer values to be encoded can extend over different ranges of permitted values).

In an embodiment, the integer value encoding arrangement of the technology described herein is used to encode a set or group, and in an embodiment a sequence, of integers within (from) a bounded range, such as a set of index values, a set of data (e.g. colour) values, etc. In an embodiment plural sets (sequences) of integer values are encoded, such as, and in an embodiment, one set representing a set of index values for the encoded block, and another set representing a set of data values for the block. In this case, each set of integer values is in an embodiment encoded separately to the other set or sets of integer values, and each set of integer values can in an embodiment have its own defined value range that it is constrained to be within.

The range or each range of integer values could, e.g., comprise the "true" range over which the values in question (e.g. colour values) need to be represented. However, in an embodiment, the integer values that are used (and encoded in the encoded texture data block) are taken from a constrained range of values, which values are then "expanded" or "blown-up" to corresponding values from the "true" range that the values in question (e.g. colour values) can take (on decoding). In other words, the integer values which are encoded are in an embodiment constrained to be from a restricted range of permitted values, which values are then converted to corresponding, "true", values as part of the decoding process.

In these arrangements, the permitted (defined) integer value range will determine how many different values from the overall, "true" range for the values in question can be indicated by the encoded texture data block (and their spacing across the overall, "true" range for the values).

This could be done in respect of some or all of the groups of integer values that are to be encoded. It is in an embodiment done at least in respect of a group or groups of integer values that are to represent data values (such as colour values) and/or index values to be used for the block.

Where the encoding schemes uses defined ranges of integer values, then in an embodiment, the encoding scheme that is used for the integer values in a given set of or sequence of integer values is dependent upon the defined range that the sequence of integer values is taken from (bounded to be within). As discussed above, in an embodiment a plurality of allowed (supported) integer value ranges are defined, and each range in an embodiment has its own predefined encoding scheme.

In an embodiment the integer values of an integer value range are encoded using just bits (base-2 values) if that is the most efficient manner to encode them, i.e. where the number of integer values in the range is $2^n$, but are encoded using bits (base-2 values) and a base-n value (where n is greater than 2) otherwise. In an embodiment the encoding is such that for any given range of integer values at most one base-n value (where n is greater than 2), e.g. one trit or one quint, and then however many base-2 values (bits) are required to represent the values in the range in combination with the base-n value (n>2), are used to encode the integer values (each integer value) taken from that range. Thus, in an embodiment, each integer value is represented for encoding purposes using one of: a number of bits; one trit; one quint; a number of bits and one trit; or a number of bits and one quint, in an embodiment depending upon the range from which the integer value is taken (the range that the integer value is constrained to be within).

The Applicants have found that this arrangement can provide a canonical representation of integer values, that is easy to use, for plural different ranges of integer values. Also, it can allow the number of bits required to encode different sets of integer values (such as data and index values) in the encoded texture data block to be adjusted in a fine-grained manner (as increasing an integer value range being used by one, for example, may only effectively require one more bit, or indeed, less than a bit, per individual value in the encoded texture data block). This fine-grained adjustment can then, e.g., allow the trading-off of encoding bits between different sets of integer values to be encoded in a block, such as, e.g., and in an embodiment, between the index values and the (e.g. endpoint) colour values that are included in an encoded texture data block, e.g., on a block-by-block basis. This accordingly can provide a very flexible, but still efficient, encoding system.

It will be appreciated from the above that the integer value encoding scheme of the technology described herein is accordingly in an embodiment used to encode (store) sets (sequences) of integers from within respective bounded ranges in an encoded texture data block, with the number of base-2 values and base-n (n>2) values (e.g. trits or quints) being used to encode (store) each integer being determined by the range that the respective set (sequence) of integers is constrained to.

In one embodiment the defined range that has been used for a set of integer values is indicated explicitly in the encoded texture data block (this is in an embodiment done where the set of integer values represents index values). This avoids the need to explicitly encode the range in the encoded data block. In another embodiment, this is not done, and instead the defined range is derived implicitly from the encoded texture data block. This is in an embodiment done where the set of integer values indicate data, e.g., endpoint colour, values to be used for the block.

In an embodiment, at least one set of integer values has its range indicated explicitly in the encoded texture data block, but another set of integer values does not (i.e. its defined range must be derived implicitly from the encoded texture data block).

Where the range used for a set or sequence of integer values is to be derived implicitly from an encoded texture data block, then this is in an embodiment done by determining the available space in the encoded texture data block for encoding the set of integer values, and then determining the range used based on that available space and the number of integer values in the set (i.e. that must actually be encoded in the available space) (and, e.g., and in an embodiment, based on the integer value encoding scheme being used). The range used is in an embodiment determined as being the largest integer value range whose encoding scheme (format) will still permit the required number of integer values to be included in the encoded block to fit in the available space.

This determination is in an embodiment done when decoding the texture data block (to determine the range that has been used for the integer values when encoding the block), and is in an embodiment also done when encoding the encoded texture data block (to determine the range should be used for the integer values for the block). As discussed above, in an embodiment the largest range of integer values that can be used (while still being able to fit the required number of integer values in the encoded block) is used.

It is believed that such arrangements are particularly advantageous, as they facilitate, e.g., a more flexible system, but which can still always use the highest resolution available for the integer values for any given encoded texture data block.

Thus, an embodiment of the technology described herein comprises a method of encoding a set of texture data elements to be used in a graphics processing system, comprising:

encoding the set of texture data elements as a block of texture data representing the texture data elements; and including in the texture data block:

a set of integer values (in an embodiment for use when generating data values for a set of the texture data elements that the block represents); wherein:

the integer values are constrained to be from a restricted range of permitted integer values; and the method further comprises:

determining the range to be used for the set of integer values based on the number of integer values in the set and the space available in the encoded texture data block for encoding the set of integer values.

An embodiment of the technology described herein comprises an apparatus for encoding a set of texture data elements to be used in a graphics processing system, comprising:

processing circuitry for encoding the set of texture data elements as a block of texture data representing the texture data elements; and processing circuitry for including in the texture data block:

a set of integer values (in an embodiment for use when generating data values for a set of the texture data elements that the block represents); wherein:

the integer values are constrained to be from a restricted range of permitted integer values; and the apparatus further comprises:

processing circuitry for determining the range to be used for the set of integer values based on the number of integer values in the set and the space available in the encoded texture data block for encoding the set of integer values.

An embodiment of the technology described herein comprises a method of decoding a block of encoded texture data representing a set of texture data elements to be used in a graphics processing system, comprising:

using a set of integer values included in the encoded texture data block when decoding the block (and in an embodiment to generate data values for a set of the texture data elements that the block represents); wherein:

the integer values are constrained to be from a restricted range of permitted integer values; and the method further comprises:

determining the range that has been used for the set of integer values based on the number of integer values in the set and the space available in the encoded texture data block for encoding the set of integer values.

An embodiment of the technology described herein comprises an apparatus for decoding a block of encoded texture data representing a set of texture data elements to be used in a graphics processing system, comprising:

processing circuitry for using a set of integer values included in the encoded texture data block when decoding block (and in an embodiment to generate data values for a set of the texture data elements that the block represents); wherein:

the integer values are constrained to be from a restricted range of permitted integer values; and the apparatus further comprises:

processing circuitry for determining the range that has been used for the set of integer values based on the number of integer values in the set and the space available in the encoded texture data block for encoding the required integer values.

As will be appreciated by those skilled in the art, these embodiments of the technology described herein can, and in an embodiment do, include any one or more or all of the preferred and optional features of the technology described herein described herein, as appropriate. Thus, for example, in an embodiment the largest range of values for which the set of integer values can be encoded in the block (i.e. in the determined available space in the block) is used. Similarly, in a embodiment, this arrangement is used for a set of integer values for use to generate a set of data values (e.g. colour values) to be used to generate data values for a set of the texture data elements that the encoded block of texture data represents.

In these embodiments of the technology described herein, the available space in the encoded texture data block for encoding the required integer values may be determined as desired. It is in an embodiment determined by determining the space (number of bits) required to represent the other information that must be included in the encoded texture data block and then subtracting that from the total capacity (bit capacity) of the encoded texture data block.

The decoder thus in an embodiment uses information included in the encoded texture block, such as, and in an embodiment information indicating the encoding arrangement that has been used for the block, to determine the space (number of bits) required to represent all the information in the block apart from the set of integers whose range is unknown (and in an embodiment then subtracts that bit count from the (known) size of the block to determine the space (number of bits) available for the set of integers whose range is unknown, and then determines the range that has been used for the set of integers whose range is unknown based on the determined available space).

Similarly, the number of integer values in the set (to be included in the encoded texture data block) may be determined as desired. It is in an embodiment determined from or using information included in the encoded texture data block that indicates how many of the respective integer values are required to decode, and/or are included in, the block.

The decoder thus in an embodiment uses information included in the encoded texture block, such as, and in an embodiment information indicating how many of the respective integer values are required to decode and/or are included in, the block, to determine the number of integer values in the set of integers whose range is unknown included in the block.

Although the technology described herein is directed in particular to the encoding of integer values in an encoded texture data block, it will be appreciated that the overall encoding process should be such that an (and each) encoded texture data block will include all the information that is necessary for, and/or expected by, a decoder, to allow the decoder to decode the encoded texture data block to reproduce (at least approximately) the original set of texture data elements. The data that should be included in the encoded texture data block to achieve this will depend upon the exact nature of the texture data encoding (compression) scheme in question. This data can be arranged in any suitable and desired manner in the encoded texture data block (i.e. in practice in the manner that a decoder can recognise and correctly interpret).

In general it is in an embodiment (and in a embodiment this is done) for the encoded texture data block to include at least data indicating or allowing to be derived a base data (e.g. colour) value or values (such as colour endpoint values) for the encoded texture data block, and information to allow the decoder to determine (at least an approximation to) the value of a given texture data element from the base data value or values (e.g. endpoint colours) for the block.

In one embodiment, each encoded block of texture data includes, inter alia, data indicating, or indicating how to generate, a set of base data values (e.g. colour endpoint values) to be used to generate data values for a set of the texture data elements that the block represents, and data indicating how to use the set of base data values (e.g. colour endpoint values) to generate data values for texture data elements of the set of texture data elements that the set of base data values is to be used for.

The base set of data values (e.g. endpoint colours) to be used for a block can be generated as desired, for example, by, as is known in the art, assessing the data values present in the original texture data (i.e. the data which is to be encoded and compressed) and deriving therefrom a set of data values that are representative of and/or can be used to derive, the original data values. Any suitable technique can be used for this, such as, for example, using error comparison techniques to determine a reduced set of data values that best matches the original set of data values.

The base set of data values is in an embodiment determined on a block-by-block basis. For example, in the case of colour data, as in conventional block truncation encoding techniques, one or two (or more) base representative colours could be determined for the texture block, which colours would then serve as the base colour palette to be used when generating the set of colours to be used when reproducing the texture block.

In an embodiment, the set of base data values for a block comprises a pair (or respective pairs) of data values. In an embodiment it comprises a pair (or pairs) of endpoint data values, such as a pair of endpoint colour values, from which, e.g., data (e.g. colour) values for texture data elements of the block in an embodiment can be interpolated (and in an embodiment can be derived by determining a weighted sum of the endpoint values for the block). The pairs of base data values could instead comprise, e.g., a base value and a difference value that can then be combined to give values for the texture data elements, if desired.

In an embodiment, the encoded texture data blocks include data for indicating how to generate a set or sets of base data values for the block using a set of integer values that are encoded in the block (which integer values are in an embodiment encoded in the block in the manner of the technology described herein).

In this case, the data value generation method in an embodiment uses plural integer values to derive the base data values, such as, and in an embodiment, two, four, six or eight integer values.

The integer values may be used to generate the base data values to be used in any desired and suitable manner. In one embodiment, the integer values are used directly to generate the base data values. In this case, one or more integer values will be used for one endpoint value, and another integer value or values used for the other endpoint value, for example.

In another embodiment, some or all of the base data values to be used are derived from the integer values. In this case, the integer values can in an embodiment be used as, or to derive, an offset to apply to another integer value or values to generate one or more of the base data values (e.g. endpoint values) to be used, and/or they can in an embodiment be used as, or to derive, a scaling factor to apply to another integer value or values to generate one (or more) of the base data values (e.g. endpoint values) to be used.

In an embodiment a combination of these techniques is used, and/or different predefined data value generation methods use different ones of, or different combinations of, these techniques.

Thus in an embodiment, the encoded texture data block includes data indicating how to generate a set or sets of base data values to be used which data indicates that the generated set of base data values is to comprise a data value or values generated directly from a set of integer values encoded in the block, and/or should comprise a data value or values derived or interpolated from a set of integer values encoded in the block, or a combination of such data values.

In an embodiment, the data indicating how to generate the set of base data values to be used indicates which one of a plurality of selected, in an embodiment predetermined, base data value set generation techniques or methods is to be used.

In an embodiment, the set of texture data elements that is encoded in a given texture data block is divided into plural "sub-sets" or "partitions" of texture data elements. In other words, the set of texture elements encoded as a single block of texture data is in an embodiment sub-divided within the texture data block into plural separate texture data "sub-blocks", or "partitions". In an embodiment 2, 3 or 4 partitions can be used.

Where partitioning is used, each texture data element partition for the texture data block in an embodiment has its own base value(s) (e.g. colour endpoint value(s)), and/or set of data indicating how to generate a set of base data values to be used to generate data values for the particular sub-set of the texture data elements that the partition corresponds to (i.e. for the sub-set that the partition corresponds to).

This has the advantage that different partitions can use, in effect, different encoding schemes (and in an embodiment, this is done).

For example, each partition of a texture data block could, and in an embodiment does, have its own colour endpoints or colour endpoints encoding, which can be specified independently of the colour endpoints or colour endpoint encodings for the other texture data element partitions in the encoded block. For example, one partition could have a full RGB colour encoding scheme but another partition could use a grayscale encoding scheme, within the same encoded texture data block.

In this case, there may, accordingly, be, for example, a single set of integer values to be shared by all the partitions encoded in the texture data block, or each partition may have its own separate set of integer values.

Where an encoded texture data block can include plural partitions, then in that case the encoded texture data block in an embodiment further includes information to indicate which partitioning pattern has been used for the block. This information can take any suitable and desired form, such as an index, that indicates to the decoder which one of a set of stored predefined partitioning patterns has been used.

In one embodiment, the partitioning patterns are generated using a partitioning pattern generation function, and the encoded texture data blocks in an embodiment then include information to be used by the decoder to configure the partitioning pattern generation function so as to allow the decoder to generate the particular partitioning pattern that has been used. This information in an embodiment comprises a partitioning pattern generation function index or seed, and the number of partitions, that were used as inputs to the partitioning pattern generation function at the encoding stage for generating the partitioning pattern that was used. (The decoder in an embodiment then uses this information, together with the position of the texture data element to be decoded (i.e. whose value is to be determined), as inputs to the partitioning pattern generation function, to determine which partition of the encoded texture data block, the texture data element in question belongs to. Once this has been done, the decoder can then, e.g., and in an embodiment, determine the base data values (e.g. endpoint colours) to be used for the partition that the texture data element has been determined to belong to, and then use those data values to determine the data value (e.g. colour value) to be used for the texture data element itself.)

As discussed above, an encoded texture data block in an embodiment includes data indicating how to use respective set(s) of base data values (e.g. endpoint colours), or generated set(s) of base data values, for a block to generate data values for the texture data elements of the block.

The data that is included in the encoded texture data block for indicating how to use the set of base data values (e.g. colour endpoint values) to generate the data values for the individual texture data elements of the block can be any suitable such data. In an embodiment, it comprises index data, giving indexes for some or all of the texture data elements in question, and that can be used to derive the data values for the texture data elements from the base data values.

In an embodiment the indexes are used to interpolate the data value for a given texture data element from the base (e.g. endpoint) data values. In an embodiment the index is used as or to derive a weight to compute a weighted sum of the base data values (e.g. endpoint values) (which weighted sum is then used as the data value for the texture data element to which the index relates).

An encoded texture data block in an embodiment includes, and/or allows to be derived, an index for each individual texture data element that the encoded texture data block represents. In some arrangements, this is done by providing (explicitly) in the encoded texture data block an index value for each and every texture data element that the encoded texture data block represents.

In other arrangements, the encoded texture data block does not encode (explicitly include) all of the indexes to be used for the texture data elements that the encoded block represents (or indeed any of the indexes to be used for the texture data elements of the block), but instead includes (encodes) a set of index values (indexes) from which the indexes to be used for the texture data elements that the encoded block represent will be derived in use by the decoder, e.g., and in an embodiment, by interpolation (and in an embodiment by bilinear or simplex or trilinear interpolation) from the set of index values included in the encoded block. This further enhances the flexibility of the encoding scheme, as it allows the number of indexes that are provided to be varied (and to not have to correspond to the number of texture data elements that an encoded block represents). This may be useful, in particular for larger block sizes.

Thus, in an embodiment, the decoder derives the indexes to use for the encoded block from a set of indexes that are provided in the encoded texture data block, in an embodiment by interpolating the indexes to use from the indexes that are provided. For example, an index to use may be computed as a weighted sum of 2, 3, or 4 (or more) of the indexes included in the encoded block. The interpolation could use, e.g., bilinear, trilinear or simplex interpolation, e.g. depending upon whether the block is a 2D or a 3D block. The set of indices that are provided in the encoded texture data block is in an embodiment a reduced set of indexes, i.e. contains fewer indexes than the number of texture data elements that the block represents.

Alternatively or additionally, any "missing" indexes could be determined, e.g., using a look-up table or tables, or predetermined index "infill" patterns for use to derive the indexes to use could be defined, e.g., for each different combination of block size and number of indexes that could be provided explicitly in the encoded texture data block. These index "infill" patterns could specify, e.g., the weight or weights to be used when summing the provided indexes to derive the "missing" indexes.

In one embodiment, a texture data element can have plural indexes assigned to it. In an embodiment one or two index planes can be used. Where two index planes are used (i.e. two indexes rather than one are specified for the texture data elements), one index is in an embodiment used for three of the colour components (e.g. the red, green and blue colour components), and the other index for one colour component (e.g. the alpha colour component). Other arrangements would, of course, be possible.

The index values included in an encoded texture data block are in an embodiment in the form of integer values from a defined (allowable) range of integer values (as discussed above). Thus, a given encoded texture data block in an embodiment includes a set of index values taken from a defined from a range of integer values (i.e. each index value included in the block will be an integer from the defined (permitted) index value range). The integers representing the index values from this range can then be, and are in an embodiment, encoded in the encoded texture data block in the manner of the technology described herein.

In this arrangement, the permitted (defined) index value range will accordingly determine the effective resolution available for the index values encoded in the block. Using a larger range of index values will give a higher resolution, thus, potentially, facilitating greater accuracy in terms of being able to define a given index value (but at the cost of needing more bits to encode each index value), whereas using a more restricted range of index values will reduce the encoded block capacity that is required for the index values (but reduce the potential accuracy of the index values).

In an embodiment, the defined range for the index values can be specified for encoded texture data blocks individually. This would then allow, e.g., some blocks to use a greater range of index values, and other encoded texture data blocks to use a more restricted range of index values. This enhances the flexibility of the system of the technology described herein.

As discussed above, in an embodiment a range of different index ranges can be defined and are supported (i.e. the indexes can be encoded across (extend over) different ranges of permitted index values), in an embodiment on a block-by-block basis.

In these arrangements, the indexes are in an embodiment scaled from whatever range they are defined for (i.e. extend across), into the range 0 . . . 1, before being used to derive the actual data value for a texture data element in the decoding process.

It will be appreciated that where different index ranges, etc., may be used and included in an encoded texture data block, the decoder will need to know the particular "index" encoding arrangement that has been used. Thus, in an embodiment, information to indicate this is included in the encoded texture block, in an embodiment by including in the encoded texture data block information indicating a predetermined "index mode" to be used (that has been used) for the block. In an embodiment there are plural predefined index modes, with each index mode being associated with a particular index range, etc.

The technology described herein can be used to encode any suitable form of texture data. As discussed above, such data, in its original, raw or unencoded form, is typically arranged in the form of arrays of texture elements or texels, and thus in an embodiment, the technology described herein is used to encode an array of texture data elements (texels). Such arrays are typically, as is known in the art, 2-dimensional, although it is also possible to use the technology described herein to encode a 3-dimensional array (and, indeed, it is an advantage of the technology described herein that it can be used to encode 3-dimensional textures in an efficient manner).

The texture to be encoded and the texture data elements can represent any suitable texture data. In one embodiment the texture is a texture that is to be used for graphics processing, e.g., and in an embodiment, when rendering an image and/or frame for display, such as for example an image to be applied to primitives to be rendered, colours (including grayscale), luminances, bump-maps, shadow-maps (light-maps), etc., as is known in the art.

However, the technology described herein can also be used to process and encode (and decode) textures to be used to process, and that represent, other forms of data, e.g. where it is desired to use a graphics texture (and graphics texture processing) to represent and process other forms of data. As is known in the art, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the texture of the technology described herein may represent other forms of data that are to be processed as a texture in a graphics processing system, if desired.

In an embodiment, the texture data elements each represent a colour value for a texture element, but this is not essential. In an embodiment the texture data elements represent: low dynamic range (LDR) texture data with 1, 2, 3 or 4 components per texel (luminance, luminance-alpha, RGB and RGB-alpha, respectively) or high dynamic range (HDR) texture data with 1, 3 or 4 components per texel.

As will be appreciated by those skilled in the art, the actual data values accorded to the texture elements, both in their original, unencoded raw form, and in their encoded form (or at least when the encoded data has been decoded to reproduce a representation of the original data) will depend on the form of "texture" that the texture elements are intended to define or represent.

Thus, for example, where the texture elements define colours to be used, the texture data elements in their original, unencoded form may each comprise a set of colour values (Red, Green, Blue (RGB), a set of colour and transparency values (Red, Green, Blue, Alpha (RGBa)), or a set of luminance and chrominance values, and the encoded data, when decoded (reproduced), will generate a corresponding set of colour values.

In the case of shadow (light)-maps, for example, the texture data elements, will each comprise or represent a set of data values indicating, e.g., whether the texture element is in light or in shadow, and the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

It would be possible, where appropriate for each texture data block to only encode data necessary to generate some, but not all, of the data values necessary to reproduce the original data, with the remaining data values being derived (e.g. therefrom) as part of the data reproduction process. Thus, in one embodiment, the encoded texture data block encodes data representative of some of the original texture data, with data representative of other parts of the original data being derived from the encoded data during the decoding process.

For example, in the case of normal-maps, it would be possible for the encoded texture data to, e.g., only encode two of the normal direction components (e.g. dx and dy), with the third component (dz) being derived from these two values when the data is decoded (since it is known that the sum of the squares of the components must be 1 (as they define a normal vector of length 1): $1=dx^2+dy^2+dz^2$).

It should be noted here that references herein to "colours" or "luminances", etc., accordingly refer to, as will be appreciated by those skilled in the art, a set of data values that allow the colour or luminance, etc., in question to be reproduced, e.g., on a display. These data values may comprise any suitable set of colour or luminance, etc., data, such as a set of RGBa values as discussed above. Equally, references to generating a set of data values for an encoded texture data block, and to data values for individual texture elements, encompass data values that each comprise or include a combination of values, such as a set of colour values (RGB or RGBa), as appropriate.

The set or array of texture data elements that is encoded in accordance with the technology described herein can be any suitable or desired such set. For example, the encoded texture data block could, if desired, represent the entire texture map to be reproduced.

However, in an embodiment, each texture data block encodes a smaller portion (or block) of the texture map in question, as in traditional block encoding techniques. In such a case, the texture data block will encode and represent a selected set or array of the original texture data elements. Each texture data block in an embodiment encodes a 4×4, 5×5, 6×6, 8×8, 10×10, 12×12, 3×3×3, 4×4×4, 5×5×5 or 6×6×6 array of texels. (It is an advantage of the technology described herein that it can support many different block sizes.)

It will be appreciated that in such arrangements, a plurality of such individual texture data blocks will be needed to encode the overall set of original texture data (texture data elements), e.g. make-up the entire texture map. Thus, in an embodiment, the technology described herein includes sub-dividing a set of texture data elements (e.g. for a texture map) into a plurality of sub-sets of texture data elements, and then encoding each sub-set of texture data elements as a texture data block in accordance with the technology described herein. In an embodiment the texture map being encoded is divided into blocks of equal size, i.e. each sub-set of the texture map represents the same number (and, e.g., array) of texture data elements. This can, e.g., simplify the task of finding which block a given texture data element lies in. In an embodiment each encoded texture data block has the same size, i.e. a fixed rate encoding scheme is used for the texture map in question. This facilitates the encoding and decoding processes, as is known in the art. Thus, for example, a texture map could be divided into a plurality of 4×4 texel arrays, with each such array being encoded as a separate texture data block.

Where plural texture data blocks are used to encode a larger texture map (or set or array of texture elements) (or part thereof), the actual subdividing of the array into smaller blocks, and the order of encoding into texture blocks can be selected as desired. In an embodiment the blocks (sub-sets of data) are encoded in raster order, although other arrangements, such as the use of Morton order, would, of course, be possible.

The encoding process of the technology described herein (i.e. to produce a set of encoded data blocks of the form discussed above) can be carried out in any suitable manner on or using the original texture data that is to be encoded. For example, as in known prior art processes, the original data (e.g. texture map) could be, and in an embodiment is, divided into blocks, and then each block encoded using some or all of the various different encoding possibilities that are available (i.e. that, in effect, an encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block when it is encoded).

This will then be repeated for each different block that the original data (e.g. texture map) has been divided into, to produce a stream or set of encoded texture data blocks representing, and corresponding to, the original set of data (e.g. texture map). This set of encoded texture data blocks can then be stored, e.g. on a portable storage device such as a DVD, for later use when it is desired to apply the texture to an image to be rendered. In an embodiment a texture is encoded as a set of mipmaps, with each mipmap being generated in the manner of the technology described herein.

Each block that the original data (e.g. texture map) is divided into is in an embodiment the same size and configuration. The block size that is being used is in an embodiment provided to the decoder. The block size is in an embodiment not included in the encoded texture data blocks themselves, but is in an embodiment provided to the decoder separately. For example, the block size could be implicitly indicated by another parameter that is provided to the decoder, such as, and in an embodiment, the image type, or included in (and indicated in) a (global) data header that is associated with (attached to) the set of encoded texture data blocks.

It can be seen from the above that in an embodiment of the technology described herein, an encoded texture data block will include data indicating how to generate a set of base data values to be used to generate data values for a set of the texture data elements that the block represents (which data is in an embodiment in the form of an index or other indication which indicates which of a plurality of predefined data value set generation techniques or methods is to be used); a set of integer values to be used to generate the set of base data values to be used to generate data values for a set of the texture data elements that the block represents; a set of index values indicating how to use the generated set of base data values to generate data values for texture elements of the set of texture data elements that the generated set of base data values to be used for (which index values are in an embodiment used to interpolate the data value for a given texture data element from the generated base data values); and information to allow the indexing scheme for the block to be determined (which information is in an embodiment in the form of an index or flag indicating a predetermined "index mode" to be used for the block). The set of integer values to be used to generate the set of base data values, and/or the set of index values, are in an embodiment encoded in the encoded texture data block in the manner of the technology described herein.

Thus, an embodiment of the technology described herein comprises a method of encoding a set of texture data elements to be used in a graphics processing system, comprising:

encoding the set of texture data elements as a block of texture data representing the texture data elements; and
including in the texture data block:
data indicating how to generate a set of base data values to be used to generate data values for a set of the texture data elements that the block represents;
data indicating a set of integer values to be used to generate the set of base data values to be used to generate data values for a set of the texture data elements that the block represents;
data indicating a set of index values indicating how to use the generated set of base data values to generate data values for texture data elements of the set of texture data elements that the generated set of base data values is to be used for; and
data indicating the indexing scheme that has been used for the block;
wherein at least the set of integer values to be used to generate the set of base data values, and/or the set of index values, comprise integer values that are encoded in the encoded texture data block in the manner of the technology described herein.

An embodiment of the technology described herein comprises an apparatus for encoding a set of texture data elements to be used in a graphics processing system, comprising:

processing circuitry for encoding the set of texture data elements as a block of texture data representing the texture data elements; and
processing circuitry for including in the texture data block:
data indicating how to generate a set of base data values to be used to generate data values for a set of the texture data elements that the block represents;
data indicating a set of integer values to be used to generate the set of base data values to be used to generate data values for a set of the texture data elements that the block represents;
data indicating a set of index values indicating how to use the generated set of base data values to generate data values for texture data elements of the set of texture data elements that the generated set of base data values is to be used for; and
data indicating the indexing scheme that has been used for the block;
wherein at least the set of integer values to be used to generate the set of base data values, and/or the set of index values, comprise integer values that are encoded in the encoded texture data block in the manner of the technology described herein.

An embodiment of the technology described herein comprises a block of texture data representing a set of texture data elements to be used in a graphics processing system, comprising:

data indicating how to generate a set of base data values to be used to generate data values for a set of the texture data elements that the block represents;
data indicating a set of integer values to be used to generate the set of base data values to be used to generate data values for a set of the texture data elements that the block represents;
data indicating a set of index values indicating how to use the generated set of base data values to generate data values for texture data elements of the set of texture data elements that the generated set of base data values is to be used for; and
data indicating the indexing scheme that has been used for the block;

wherein at least the set of integer values to be used to generate the set of base data values, and/or the set of index values, comprise integer values that are encoded in the encoded texture data block in the manner of the technology described herein.

An embodiment of the technology described herein comprises a method of encoding a set of texture data elements to be used in a graphics processing system, comprising:

encoding the set of texture data elements as a block of texture data representing the texture data elements; wherein the encoding process comprises:

determining a set of integer values to be used when generating data values for a set of the texture data elements that the block represents; and encoding the set of integer values in the encoded texture data block in the manner of the technology described herein.

An embodiment of the technology described herein comprises an apparatus for encoding a set of texture data elements to be used in a graphics processing system, comprising:

processing circuitry for encoding the set of texture data elements as a block of texture data representing the texture data elements;

processing circuitry for determining a set of integer values to be used when generating data values for a set of the texture data elements that the block represents; and processing circuitry for encoding the set of integer values in the encoded texture data block in the manner of the technology described herein.

An embodiment of the technology described herein comprises a block of texture data representing a set of texture data elements to be used in a graphics processing system, comprising:

data indicating a set of integer values to be used when generating data values for a set of the texture data elements that the block represents;

wherein the set of integer values are encoded in the encoded texture data block in the manner of the technology described herein.

As will be appreciated by those skilled in the art, these embodiments of the technology described herein can, and in an embodiment do, include any one or more or all of the preferred and optional features of the technology described herein described herein, as appropriate.

Where the texture data elements that the encoded texture data block have been partitioned (as discussed above), the encoded texture data block in an embodiment further includes, as discussed above, information to allow the partition that a particular texture data element belongs to, to be determined.

Where partitioning has been used, the encoded texture data block may also, and in an embodiment does also, include, as discussed above, a separate set of data indicating how to generate a set of base data values to be used to generate the data values for a set of the texture data elements that the block represents for each partition that the texture data elements of the block have been divided into, in an embodiment together with appropriate integer values to be used for each respective partition.

The information to be included in an encoded texture data block can be included in the encoded texture data block in any desired order and arrangement, but in a embodiment a particular (and in an embodiment common) format and organisation is used for each encoded texture data block.

Where the encoded block is to include information of the form discussed above, then the format in an embodiment comprises including the index mode and data indicating how to generate a set of base data values to be used to generate data values for a set of texture data elements that the block represents in a particular portion (e.g. at the beginning) of the block, together with, where necessary, partitioning information (where partitioning is being used).

The remaining space of the block is in an embodiment then used to hold the index data, the integer value data for use to generate the set(s) of base data values to be used to generate base data values for the texture data elements that the block represents, and any needed further data indicating how to generate a set of base data values to be used to generate data values for a set of the texture data elements that the block represents where there is insufficient space in the portion of the block predefined for that data (e.g. because partitioning is being used).

In an embodiment, the index data is stored in the remaining space by adding the index data from the top down, and the integer values and any further data indicating how to generate a set of base data values to be used is stored in the remaining space from the bottom up (or vice-versa).

The above primarily describes the encoding of integer values in the technology described herein. As will be appreciated by those skilled in the art, the technology described herein also extends to the reverse, decoding, process, i.e. in which an encoded texture data block is used to produce one or more integer values for use when decoding an encoded texture data block to produce one or more or an array of texture data elements for use (and those integer values are then used to derive the value of a texture data element that the encoded block of texture data represents).

The decoding process in an embodiment first comprises determining which encoded texture data block in the set of encoded texture data blocks representing the texture map to be used represents (contains) the texture data element whose value is required (i.e. that is to be decoded). This may be done, e.g., and in an embodiment, based on the position of the texture data element (and, e.g., knowledge of the block size and size of the texture). The identified encoded texture data block can then be used to determine the value to be used for the texture data element in question.

The so-generated, decoded texel values can then be applied, as is known in the art, to sampling positions and/or fragments that are being rendered to generate rendered data for those sampling positions and/or fragments, which rendered data is then, e.g. written to a frame buffer for a display to display the "textured" sampling positions and/or fragments.

Thus, the technology described herein also extends to a decoder and a decoding apparatus configured to decode a texture that has been encoded in the manner of the technology described herein.

Thus, an embodiment of the technology described herein comprises a method of decoding a texture data block that encodes a set of texture data elements to be used in a graphics processing system (and in an embodiment in which integer values encoded in the encoded texture data block are encoded using base-n values, where n is greater than two), the method comprising:

determining from the encoded texture data block a base-n value, where n is greater than two, and using the base-n value to determine an integer value encoded in the encoded texture data block.

An embodiment of the technology described herein comprises an apparatus for decoding a texture data block that encodes a set of texture data elements to be used in a graphics processing system (and in an embodiment in which integer values encoded in the encoded texture data block are encoded using base-n values, where n is greater than two), the apparatus comprising:

processing circuitry for using a base-n value, where n is greater than two, included in the encoded texture data block to determine an integer value encoded in the encoded texture data block.

The decoding process can, and indeed in an embodiment does, include, as appropriate, one or more or all of the various preferred and optional features of the technology described herein discussed herein.

Thus, for example, the determined integer value is in an embodiment then used to determine the value of a texture data element that the encoded block of texture data represents. The so-generated, decoded texel values are in an embodiment applied to, or used for, as is known in the art, sampling positions and/or fragments that are being rendered to generate rendered data for those sampling positions and/or fragments, which rendered data is then in an embodiment written to a frame buffer for a display to display the "textured" sampling positions and/or fragments.

Similarly, the integer value in an embodiment represents an index value, a base data value, or a value to be used to derive a base data value, for the encoded texture data block.

In an embodiment the decoding process and decoder include steps of or processing circuitry for determining from a bit representation included in the encoded texture data block, plural base-n values, where n is greater than two, that are encoded in the encoded texture data block, and then using the determined base-n values to determine integer values encoded in the encoded texture data block.

Thus, another embodiment of the technology described herein comprises a method of decoding a texture data block that encodes a set of texture data elements to be used in a graphics processing system (and in an embodiment in which base-n values, where n is greater than two, are used to represent integer values encoded in the encoded texture data), the method comprising:

determining from a bit representation included in the encoded texture data block that represents plural base-n values, where n is greater than two, a base-n value (n>2) that is encoded in the encoded texture data block, and using the determined base-n value to determine an integer value encoded in the encoded texture data block.

An embodiment of the technology described herein comprises an apparatus for decoding a texture data block that encodes a set of texture data elements to be used in a graphics processing system (and in an embodiment in which base-n values, where n is greater than two, are used to represent integer values encoded in the encoded texture data), the apparatus comprising:

processing circuitry for determining from a bit representation included in the encoded texture data block that represents plural base-n values, where n is greater than two, a base-n value (n>2) that is encoded in the encoded texture data block; and processing circuitry for using the determined base-n value to determine an integer value encoded in the encoded texture data block.

Similarly, in an embodiment the decoding process and decoder include steps of or processing circuitry for determining from an interleaved sequence of bits in the encoded texture data block, bits of a bit representation representing the values of base-n values (n>2) and bits representing the values of base-2 values encoded in the encoded texture data block; determining the base-n values (n>2) and the base-2 values from the determined bits; and determining a set of integer values encoded in the encoded texture data block using a combination of the determined base-n values (n>2) and base-2 values.

An embodiment of the technology described herein comprises a method of decoding a texture data block that encodes a set of texture data elements to be used in a graphics processing system, the method comprising:

determining from an interleaved sequence of bits in the encoded texture data block, bits of a bit representation representing the values of base-n values (n>2) and bits representing the values of base-2 values encoded in the encoded texture data block;

determining one or more of the base-n values (n>2) and of the base-2 values from the determined bits; and determining one or more integer values encoded in the encoded texture data block using a combination of the determined base-n values (n>2) and base-2 values.

An embodiment of the technology described herein comprises an apparatus for decoding a texture data block that encodes a set of texture data elements to be used in a graphics processing system, the apparatus comprising:

processing circuitry for determining from an interleaved sequence of bits in the encoded texture data block, bits of a bit representation representing the values of base-n values (n>2) and bits representing the values of base-2 values encoded in the encoded texture data block;

processing circuitry for determining one or more of the base-n values (n>2) and of the base-2 values from the determined bits; and processing circuitry for determining one or more integer values encoded in the encoded texture data block using a combination of the determined base-n values (n>2) and base-2 values.

As will be appreciated by those skilled in the art, all of these decoding in an embodiments of the technology described herein can, and in an embodiment do, include any one or more or all of the preferred and optional features of the technology described herein described herein, as appropriate. Thus, for example, the base-n values (n>2) in an embodiment comprise trits or quints.

As discussed above, the decoding process in an embodiment comprises determining a range that has been used for a set of integer values encoded in the encoded texture data block. Similarly, where a set of integer values encoded in the encoded texture data block (such as, and in an embodiment, a set of integer values to be used to generate a set of base data values (e.g. endpoint colours) to be used for the encoded texture data block) is encoded as a restricted, defined range of integer values, then the decoder in an embodiment converts those integer values to appropriate data values to be used (i.e. unquantises the integer values). For example, each texture data element's colour value may be able to fall within the range 0 . . . 255 (for each component), and so a given encoded integer value for use as a colour value will need to be converted from its position within the range that was used for the encoding, to the corresponding position within the range that the colour values can take, such as 0 . . . 255, when it is to be used to determine the colour value for a texture data element.

Thus, in an embodiment, the decoding process comprises converting, and the decoder converts, a given encoded integer value from its position within a range that was used for the encoding, to a corresponding position within a larger permitted range that the values that the integer value corresponds to or is to be used for can take.

It is again believed that such arrangements may be new and advantageous in their own right.

Thus, an embodiment of the technology described herein comprises a method of decoding a block of encoded texture data representing a set of texture data elements to be used in a graphics processing system, comprising:

using at least one integer value from a set of integer values encoded in the encoded texture data block to generate a data value for a texture data element that the block represents; wherein:

the integer values in the set of integer values are constrained to be from a restricted range of permitted integer values; and the method further comprises:

converting the at least one encoded integer value from its position within the range that was used for the encoding, to a corresponding position within a larger permitted range of integer values, before using the at least one integer value to generate a data value for a texture data element that the block represents.

An embodiment of the technology described herein comprises an apparatus for decoding a block of encoded texture data representing a set of texture data elements to be used in a graphics processing system, comprising:

processing circuitry for using at least one integer value from a set of integer values encoded in the encoded texture data block to generate a data value for a texture data element that the block represents; wherein:

the integer values in the set of integer values are constrained to be from a restricted range of permitted integer values; and the apparatus further comprises:

processing circuitry for converting the at least one encoded integer value from its position within the range that was used for the encoding, to a corresponding position within a larger permitted range of integer values before using the at least one integer value to generate a data value for a texture data element that the block represents.

As will be appreciated by those skilled in the art, these embodiments of the technology described herein can, and in an embodiment do, include any one or more or all of the preferred and optional features of the technology described herein described herein, as appropriate.

The conversion (unquantisation) of the integer values can be done in any suitable and desired manner. For example, for integer values encoded using bits (base-2-values) only, the conversion (unquantisation) can be done using bit replication.

Where the encoded integer values are represented and encoded using base-n (n>2) values, then in an embodiment the "unquantisation" is performed using a predefined process, or series, of bit manipulations. This has been found to provide a relatively accurate method for doing this, and without the need to use any multipliers.

It is again believed that such arrangements may be new and advantageous in their own right.

Thus, an embodiment of the technology described herein comprises a method of decoding a block of encoded texture data representing a set of texture data elements to be used in a graphics processing system, comprising:

using at least one integer value from a set of integer values encoded in the encoded texture data block to generate a data value for a texture data element that the block represents; wherein:

the integer values in the set of integer values are constrained to be from a restricted range of permitted integer values;

the integer values are represented in the encoded texture data block using base-n values, where n is greater than two; and the values of the base-n values (n>2) for the integer values are represented using bit representations; and the method further comprises:

converting the at least one encoded integer value from its position within the range that was used for the encoding, to a corresponding position within a larger permitted range of integer values, before using the at least one integer value to generate a data value for a texture data element that the block represents, using a series of bit manipulations on the bit representation for the integer value.

An embodiment of the technology described herein comprises an apparatus for decoding a block of encoded texture data representing a set of texture data elements to be used in a graphics processing system, comprising:

processing circuitry for using at least one integer value from a set of integer values encoded in the encoded texture data block to generate a data value for a texture data element that the block represents; wherein:

the integer values in the set of integer values are constrained to be from a restricted range of permitted integer values;

the integer values are represented in the encoded texture data block using base-n values, where n is greater than two; and the values of the base-n values (n>2) for the integer values are represented using bit representations; and the apparatus further comprises:

processing circuitry for converting the at least one encoded integer value from its position within the range that was used for the encoding, to a corresponding position within a larger permitted range of integer values, before using the at least one integer value to generate a data value for a texture data element that the block represents, using a series of bit manipulations on the bit representation for the integer value.

As will be appreciated by those skilled in the art, these embodiments of the technology described herein can, and in an embodiment do, include any one or more or all of the preferred and optional features of the technology described herein described herein, as appropriate.

In an embodiment, the bit manipulations include multiplying the base-n (n>2) values for the integer by a predefined constant value, which constant is defined based on the range used when encoding the integer values. The constant is in an embodiment selected so that the base-n (n>2) value makes a low-order contribution to the final unquantised (converted) result.

In an embodiment, the integer values are, as discussed above, also encoded, at least in part, using base-2 values (bits). In this case, in an embodiment a swizzle is also or instead (and in an embodiment also) performed on some or all of the base-2 value bits (if any) for the encoded integer value as part of the "unquantisation" bit manipulations. This swizzle is again in an embodiment defined based on the range used when encoding the integer values, and in an embodiment performs a truncated multiplication, and in an embodiment acts to make the bits (the base-2 value bits) make a high-order contribution to the final unquantised result.

In an embodiment some further bit manipulations are performed to try to obtain code point symmetry (so that, for example, for an unquantised range 0 . . . 255, if there is an integer value that unquantises to X, there will also be a value (where that is possible) that unquantises to 255-X). This process in an embodiment comprises adding the results of the constant multiplication and swizzle operations, XORing that value with the lowest bit of the encoded integer value, prepending the lowest bit to the resultant value, and then discarding the lowest two bits of the result. The remaining bits give the unquantisation (conversion) result (e.g. the data (e.g. colour) value to use).

The decoding process in an embodiment further comprises performing any other "decoding" steps necessary to produce one or more or an array of texture data elements for use in graphics processing from the encoded texture data block. Thus, for example, it in an embodiment comprises using the (unquantised if necessary) integer value or values as or to derive an index value or values for a texture data element or elements that the block represents, and/or as a data value or values to be used as or to generate a set or sets of base data values (e.g., and in an embodiment endpoint colour values) to be used for a texture data element or elements that the block represents.

In an embodiment the decoder determines integer values from two different sets of integer values for the encoded texture data block, with one set to be used as or to derive a set of index values for the texture data elements that the block represents, and one set to be used as data value(s) to be used as or to generate a set or sets of base data values (e.g., and in an embodiment endpoint colour values) to be used for the texture data elements that the block represents.

The overall decoding process will essentially be the reverse of the encoding process, and thus comprise, e.g., determining from the encoded texture data block how to generate a set of base data values (e.g. endpoint colours) to be used for block, generating that set of base data values (e.g. endpoint colours) (in an embodiment using integer values encoded in the block for that purpose) and then generating the data values (e.g. colours) for individual texture data elements accordingly (again, in an embodiment using integer index values encoded in the block for that purpose). The so-generated, decoded texel values can then be applied, as is known in the art, to sampling positions and/or fragments that are being rendered to generate rendered data for those sampling positions and/or fragments, which rendered data is then, e.g. written to a frame buffer for a display to display the "textured" sampling positions and/or fragments.

As will be appreciated from the above, in an embodiment, the decoding process for an individual texture data element will comprise reading and decoding data for generating a set of base data values to be used to derive the data value for the texture data element; reading and decoding integer values to be used for that process and thereby generating the set of base data values (e.g., and in an embodiment endpoint colour values) to be used to determine the data value for the texture data element in question; determining an index value for the texture data element, using a defined index mode; and interpolating between the generated data values (e.g. endpoint colours) using the index value. This then gives the final decoded texture data element data value (e.g. colour).

The decoding process may be repeated for each texture data element of the block whose value is required (and for texture data elements in other encoded blocks).

In an embodiment, the decoder (decoding apparatus) is implemented in the device that is to use the encoded textures, such as a graphics processor. The decoder is in an embodiment implemented as a dedicated hardware element that is configured to carry out the decoding process.

Although the technology described herein has been described above with particular reference to the encoding (and decoding) of texture data in graphics processing systems, as will be appreciated by those skilled in the art, it would equally be applicable to the encoding and decoding of data in other forms of data processing system, and in particular to data that is in the form of (or can be expressed in the form of) arrays or blocks of (similar) data elements (e.g. data elements whose values follow a common or similar format and/or that will be or can be used for a similar or the same purpose or that represent similar information). It is in particular applicable to the encoding of such data where random access to the data is desired.

Such data could comprise, for example, vector-fields used for simulations, data representing flow-directions for fluids or bounce directions for impacts, etc. (which data would, for example, be analogous to the normal-maps (bump-maps) discussed above in relation to graphics data), heat-maps, or sound data, etc.

In such arrangements, the data can be encoded and decoded in an analogous manner to the texture data as described herein.

An embodiment of the technology described herein comprises a method of representing integer values to be encoded in an encoded data block that represents a set of data elements, the method comprising:

representing an integer value to be encoded in the encoded data block using a base-n value, where n is greater than two.

An embodiment of the technology described herein comprises an apparatus for representing integer values to be encoded in an encoded data block that represents a set of data elements, the apparatus comprising:

processing circuitry for representing an integer value to be encoded in the encoded data block using a base-n value, where n is greater than two.

An embodiment of the technology described herein comprises a block of data representing a set of data elements, wherein:

one or more integer values encoded in the data block are represented using a base-n value, where n is greater than two.

An embodiment of the technology described herein comprises a method of representing base-n values, where n is greater than two, to be used to represent integer values to be encoded in an encoded data block that represents a set of data elements, the method comprising:

using a predefined bit representation to represent collectively plural base-n values, where n is greater than two.

An embodiment of the technology described herein comprises an apparatus for representing base-n values, where n is greater than two, to be used to represent integer values to be encoded in an encoded data block that represents a set of data elements, the apparatus comprising:

processing circuitry for using a predefined bit representation to represent collectively plural base-n values, where n is greater than two.

An embodiment of the technology described herein comprises a block of data representing a set of data elements, wherein:

plural integer values encoded in the data block are represented using base-n values, where n is greater than two; and
the block includes:
a predefined bit representation that represents collectively a plurality of the base n-values.

An embodiment of the technology described herein comprises a method of encoding integer values to be encoded in an encoded data block that represents a set of data elements, the method comprising:

representing a set of integer values to be encoded in the encoded data block using a combination of base-n values, where n is greater than two, and base-2 values;

representing the values of the base-n values (n>2) for the set of integer values using bit representations, and representing the values of the base-2 values for the set of integer values using bits; and interleaving the bits of the bit representations representing the values of the base-n values (n>2) with the bits representing the values of the base-2 values in the encoded data block.

An embodiment of the technology described herein comprises an apparatus for encoding integer values to be encoded in an encoded data block that represents a set of data elements, the apparatus comprising:

processing circuitry for representing a set of integer values to be encoded in the encoded data block using a combination of base-n values, where n is greater than two, and base-2 values;

processing circuitry for representing the values of the base-n values (n>2) for the set of integer values using bit representations, and representing the values of the base-2 values for the set of integer values using bits; and processing circuitry for interleaving the bits of the bit representations representing the values of the base-n values (n>2) with the bits representing the values of the base-2 values in the encoded data block.

An embodiment of the technology described herein comprises a block of data representing a set of data elements, wherein:

the block of data:

represents a set of integer values encoded in the encoded data block using a combination of base-n values, where n is greater than two, and base-2 values; and represents the values of the base-n values (n>2) for the set of integer values using bit representations, and represents the values of the base-2 values for the set of integer values using bits; and wherein:

the bits of the bit representations representing the values of the base-n values (n>2) are interleaved with the bits representing the values of the base-2 values in the encoded data block.

An embodiment of the technology described herein comprises a method of encoding a set of data elements, comprising:

encoding the set of data elements as a block of data representing the data elements; and including in the data block:

a set of integer values (in an embodiment for using to generate a set of data values to be used to generate data values for a set of the data elements that the block represents); wherein:

the integer values are constrained to be from a restricted range of permitted integer values; and the method further comprises:

determining the range to be used for the set of integer values based on the number of integer values in the set and the space available in the encoded data block for encoding the set of integer values.

An embodiment of the technology described herein comprises an apparatus for encoding a set of data elements, comprising:

processing circuitry for encoding the set of data elements as a block of data representing the data elements; and processing circuitry for including in the data block:

a set of integer values (in an embodiment for using to generate a set of data values to be used to generate data values for a set of the data elements that the block represents); wherein:

the integer values are constrained to be from a restricted range of permitted integer values; and the apparatus further comprises:

processing circuitry for determining the range to be used for the set of integer values based on the number of integer values in the set, and the space available in the encoded texture data block for encoding the set of integer values.

An embodiment of the technology described herein comprises a method of decoding a block of encoded data representing a set of data elements, comprising:

using a set of integer values included in the encoded data block when decoding the block (and in an embodiment to generate data values for a set of the data elements that the block represents); wherein:

the integer values are constrained to be from a restricted range of permitted integer values; and the method further comprises:

determining the range that has been used for the set of integer values based on the number of integer values in the set, and the space available in the encoded data block for encoding the set of integer values.

An embodiment of the technology described herein comprises an apparatus for decoding a block of encoded data representing a set of data elements, comprising:

processing circuitry for using a set of integer values included in the encoded data block when decoding the block (and in an embodiment to generate data values for a set of the data elements that the block represents); wherein:

the integer values are constrained to be from a restricted range of permitted integer values; and the apparatus further comprises:

processing circuitry for determining the range that has been used for the set of integer values based on the number of integer values in the set, and the available space in the encoded data block for encoding the set of integer values.

An embodiment of the technology described herein comprises a method of encoding a set of data elements, comprising:

encoding the set of data elements as a block of data representing the data elements; and including in the data block:

data indicating how to generate a set of base data values to be used to generate data values for a set of the data elements that the block represents;

data indicating a set of integer values to be used to generate the set of base data values to be used to generate data values for a set of the data elements that the block represents;

data indicating a set of index values indicating how to use the generated set of base data values to generate data values for data elements of the set of data elements that the generated set of base data values is to be used for; and data indicating the indexing scheme that has been used for the block;

wherein at least the set of integer values to be used to generate the set of base data values, and/or the set of index values, comprise integer values that are encoded in the encoded data block in the manner of the technology described herein.

An embodiment of the technology described herein comprises an apparatus for encoding a set of data elements, comprising:

processing circuitry for encoding the set of data elements as a block of data representing the data elements; and processing circuitry for including in the data block:

data indicating how to generate a set of base data values to be used to generate data values for a set of the data elements that the block represents;

data indicating a set of integer values to be used to generate the set of base data values to be used to generate data values for a set of the data elements that the block represents;

data indicating a set of index values indicating how to use the generated set of base data values to generate data values for data elements of the set of data elements that the generated set of base data values is to be used for; and data indicating the indexing scheme that has been used for the block;

wherein at least the set of integer values to be used to generate the set of base data values, and/or the set of index values, comprise integer values that are encoded in the encoded data block in the manner of the technology described herein.

An embodiment of the technology described herein comprises a block of data representing a set of data elements, comprising:

data indicating how to generate a set of base data values to be used to generate data values for a set of the data elements that the block represents;

data indicating a set of integer values to be used to generate the set of base data values to be used to generate data values for a set of the data elements that the block represents;

data indicating a set of index values indicating how to use the generated set of base data values to generate data values for data elements of the set of data elements that the generated set of base data values is to be used for; and data indicating the indexing scheme that has been used for the block;

wherein at least the set of integer values to be used to generate the set of base data values, and/or the set of index values, comprise integer values that are encoded in the encoded data block in the manner of the technology described herein.

An embodiment of the technology described herein comprises a method of encoding a set of data elements, comprising:

encoding the set of data elements as a block of data representing the data elements; wherein the encoding process comprises:

determining a set of integer values to be used when generating data values for a set of the data elements that the block represents; and encoding the set of integer values in the encoded data block in the manner of the technology described herein.

An embodiment of the technology described herein comprises an apparatus for encoding a set of data elements, comprising:

processing circuitry for encoding the set of data elements as a block of data representing the data elements;

processing circuitry for determining a set of integer values to be used when generating data values for a set of the data elements that the block represents; and processing circuitry for encoding the set of integer values in the encoded data block in the manner of the technology described herein.

An embodiment of the technology described herein comprises a block of data representing a set of data elements, comprising:

data indicating a set of integer values to be used when generating data values for a set of the data elements that the block represents;

wherein the set of integer values are encoded in the encoded data block in the manner of the technology described herein.

An embodiment of the technology described herein comprises a method of decoding a block of encoded data representing a set of data elements, comprising:

using at least one integer value from a set of integer values encoded in the encoded data block to generate a data value for a data element that the block represents; wherein:

the integer values in the set of integer values are constrained to be from a restricted range of permitted integer values; and the method further comprises:

converting the at least one encoded integer value from its position within the range that was used for the encoding, to a corresponding position within a larger permitted range of integer values, before using the at least one integer value to generate a data value for a data element that the block represents.

An embodiment of the technology described herein comprises an apparatus for decoding a block of encoded data representing a set of data elements, comprising:

processing circuitry for using at least one integer value from a set of integer values encoded in the encoded data block to generate a data value for a data element that the block represents; wherein:

the integer values in the set of integer values are constrained to be from a restricted range of permitted integer values; and the apparatus further comprises:

processing circuitry for converting the at least one encoded integer value from its position within the range that was used for the encoding, to a corresponding position within a larger permitted range of integer values before using the at least one integer value to generate a data value for a data element that the block represents.

An embodiment of the technology described herein comprises a method of decoding a block of encoded data representing a set of data elements, comprising:

using at least one integer value from a set of integer values encoded in the encoded data block to generate a data value for a data element that the block represents; wherein:

the integer values in the set of integer values are constrained to be from a restricted range of permitted integer values;

the integer values are represented in the encoded data block using base-n values, where n is greater than two; and the values of the base-n values (n>2) for the integer values are represented using bit representations; and the method further comprises:

converting the at least one encoded integer value from its position within the range that was used for the encoding, to a corresponding position within a larger permitted range of integer values, before using the at least one integer value to generate a data value for a data element that the block represents, using a series of bit manipulations on the bit representation for the integer value.

An embodiment of the technology described herein comprises an apparatus for decoding a block of encoded data representing a set of data elements, comprising:

processing circuitry for using at least one integer value from a set of integer values encoded in the encoded data block to generate a data value for a data element that the block represents; wherein:

the integer values in the set of integer values are constrained to be from a restricted range of permitted integer values;

the integer values are represented in the encoded data block using base-n values, where n is greater than two; and the values of the base-n values (n>2) for the integer values are represented using bit representations; and the apparatus further comprises:

processing circuitry for converting the at least one encoded integer value from its position within the range that was used for the encoding, to a corresponding position within a larger permitted range of integer values, before using the at least one integer value to generate a data value for a data element that the block represents, using a series of bit manipulations on the bit representation for the integer value.

An embodiment of the technology described herein comprises a method of decoding a data block that encodes a set of data elements (and in an embodiment in which base-n values, where n is greater than two, are used to represent integer values encoded in the encoded data), the method comprising:

determining from a bit representation included in the encoded data block that represents plural base-n values, where n is greater than two, a base-n (n>2) value that is encoded in the encoded data block, and using the determined base-n value to determine an integer value encoded in the encoded texture data block.

An embodiment of the technology described herein comprises an apparatus for decoding a data block that encodes a set of data elements (and in an embodiment in which base-n values, where n is greater than two, are used to represent integer values encoded in the encoded data), the apparatus comprising:

processing circuitry for determining from a bit representation included in the encoded data block that represents plural base-n values, where n is greater than two, a base-n (n>2) value that is encoded in the encoded data block; and processing circuitry for using the determined base-n value to determine an integer value encoded in the encoded texture data block.

An embodiment of the technology described herein comprises a method of decoding a data block that encodes a set of data elements (and in an embodiment in which integer values encoded in the encoded data block are encoded using base-n values, where n is greater than two), the method comprising:

determining from the encoded data block a base-n value, where n is greater than two, and using the base-n value to determine an integer value encoded in the encoded data block.

An embodiment of the technology described herein comprises an apparatus for decoding a data block that encodes a set of data elements (and in an embodiment in which integer values encoded in the encoded data block are encoded using base-n values, where n is greater than two), the apparatus comprising:

processing circuitry for using a base-n value, where n is greater than two, included in the encoded data block to determine an integer value encoded in the encoded data block.

An embodiment of the technology described herein comprises a method of decoding a data block that encodes a set of data elements, the method comprising:

determining from an interleaved sequence of bits in the encoded data block, bits of a bit representation representing the values of base-n values (n>2) and bits representing the values of base-2 values encoded in the encoded data block;

determining one or more of the base-n values and of the base-2 values from the determined bits; and determining one or more integer values encoded in the encoded data block using a combination of the determined base-n values, where n is greater than two, and base-2 values.

An embodiment of the technology described herein comprises an apparatus for decoding a data block that encodes a set of data elements, the apparatus comprising:

processing circuitry for determining from an interleaved sequence of bits in the encoded data block, bits of a bit representation representing the values of base-n values (n>2) and bits representing the values of base-2 values encoded in the encoded data block;

processing circuitry for determining one or more of the base-n values and of the base-2 values from the determined bits; and processing circuitry for determining one or more integer values encoded in the encoded data block using a combination of the determined base-n values, where n is greater than two, and base-2 values.

As will be appreciated by those skilled in the art, all of these embodiments of the technology described herein can, and in an embodiment do, include any one or more or all of the preferred and optional features of the technology described herein described herein, as appropriate.

The methods and apparatus of the technology described herein can be implemented in any appropriate manner, e.g. in hardware or software, and in (and be included in) any appropriate device or component. In an embodiment they are implemented in a graphics processor, and thus the technology described herein also extends to a graphics processor configured to use the methods of the technology described herein, or that includes the apparatus of the technology described herein. In an embodiment, the methods and apparatus of the technology described herein are implemented in hardware, in an embodiment on a single semi-conductor platform.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and processing circuitry and/or programmable hardware elements and processing circuitry that can be programmed to operate in the desired manner. The various functional elements, etc., may be separate to each other or may share circuitry (e.g. be performed by the same processor), as desired.

It should also be noted here that, as will be appreciated by those skilled in the art, the various functions, etc., of the technology described herein may be duplicated and/or carried out in parallel on a given processor.

The technology described herein is applicable to any suitable form or configuration of graphics processor and renderer, such as tile-based graphics processors, immediate mode renderers, processors having a "pipelined" rendering arrangement, etc.

As will be appreciated from the above, the technology described herein is particularly, although not exclusively, applicable to graphics processors and processing devices, and accordingly extends to a graphics processor and a graphics processing platform including the apparatus of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can include, as appropriate, any one or more or all of the preferred and optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad in an embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein will now be described with reference to the encoding of texture data for use in graphics processing that is in the form of a colour map (i.e. colour data). However, as discussed above, and as will be appreciated by those skilled in the art, the technology described herein is applicable to data encoding and decoding in general, and so therefore should not be considered to be limited to the present example of texture colour data encoding.

FIG. 1 illustrates the basic encoding process of this embodiment. As shown in FIG. 1, an original image or array 1 of texture data elements (texels) (a texture "map") is subdivided into a plurality of 4×4 texture element blocks 2. (Other block sizes can be used, as will be discussed further below.)

In the present embodiment, as shown in FIG. 1, the original image (texture map) 1 is divided into blocks of equal size. This simplifies the task of finding which block a given texture data element lies in, and gives a constant data rate.

In this embodiment, each texture element (texel) in the original texture map data array (image) represents the colour to be used at the position of the respective texture element, and accordingly has allocated to it a data value comprising a set of colour values (e.g. red, green, blue (RGB), and, optionally alpha (transparency) values. In other words, in this embodiment, the data values that are encoded and generated, etc., each correspond to and represent a colour (a set of colour values). For convenience, the following description will therefore refer primarily to "colours" but it should be understood that such references indicate a data value comprising a set of colour values that represent the colour in question.

In the present embodiment, rather than storing the array of colour data in its full, original form, each 4×4 texture element block 2 is encoded as a texture data block 5 that has a reduced size as compared to the texture data in its original, unencoded form. This, in effect, compresses the original texture data, thereby making its storage and processing easier and more efficient. In the present embodiment, each encoded texture data block 5 uses 128 bits. (Other arrangements would, of course, be possible.)

Each encoded, reduced size, texture data block 5 contains, as will be discussed further below, sufficient and appropriate data to allow data corresponding to or representing the original, unencoded, data of the 4×4 texture element block in question to be reproduced.

For each block 2 of the original image (texture map) 1, a corresponding encoded texture data block 5 is generated. The individual texture data blocks making up the texture map are encoded in the present embodiment in raster order. Other arrangements, such as the use of Morton order, would, of course, be possible.

Thus, in the present embodiment, each encoded texture data file comprises a sequence of individual texture data blocks encoding the array of texture data elements (the image data).

The number of texture data blocks in the file will depend on the size of the texture map (texture data array) that is being encoded, and, e.g., whether the data is being stored in mipmap form. If mip-maps are used, then if the first level of texture map resolution is encoded using "n" texture data blocks, there will be "n/4" texture data blocks for the mipmap level above, "n/16" blocks for the next mip-map, "n/64" for the next, "n/256" for the next again, and so on (but no less than one block for each level) until the mip-map level with size 1×1 is reached.

(In the present embodiment, the encoded texture data can be and in an embodiment is stored in the form of mip-maps (i.e. where multiple versions of the original texture data array, each having different levels of detail (resolution), are stored for use). The mip-maps are in an embodiment stored one after each other in memory, with each mip-map level being, as is known in the art, a downscaled (by a factor of 2) representation (image) of the original array (image). The mip-maps are stored in order of descending resolution, i.e. n×n, . . . , 16×16, 8×8, 4×4, 2×2, 1×1. The smaller mip-maps (<8×8) are each stored individually in a separate encoded data block.)

Figure 2:
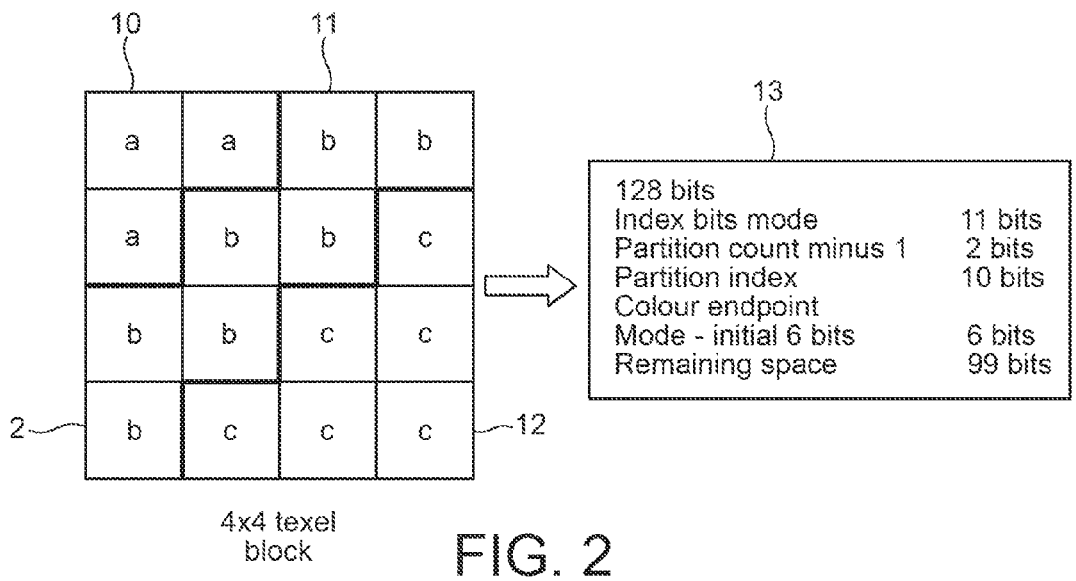
FIG. 2 shows schematically the encoding of a partitioned data block in the described embodiment of the technology described herein.

As will be discussed further below, the present embodiment supports arrangements in which the texture data elements (texels) in a given texel block to be encoded are divided into different sub-sets or partitions within the block. FIG. 2 illustrates this, and shows a 4×4 texel block 2 which has been divided into three partitions 10, 11 and 12. Thus the texels labelled "a" in FIG. 2 belong to a first partition 10, the texels labelled "b" belong to a second partition 11, and the texels labelled "c" belong to a third partition 12. This block is then encoded in a compressed form as an encoded texture data block 13, but with, as will be explained in more detail below, additional information relating to the partitioning of the original 4×4 texel block.

The format for encoding (and decoding) a block of texture data elements (texels) that is used in the present embodiment will now be described. As will be discussed further below, the encoding format of the present embodiment includes sequences of integer values in the encoded texture data blocks and uses the integer value encoding techniques of the technology described herein to encode those sequences of integer values.

Overview

The present embodiment uses a texture compression format designed to provide lossy texture compression suitable for a wide range of different types of content and a wide range of quality/bitrate tradeoffs. The format has the following main features:
- 128-bit block size
- an encoded block is self-contained (any given texel is completely defined by the contents of a single block)
- Designed for compression of the following types of texture data:
    - LDR (low dynamic range) texture data with 1, 2, 3 or 4 components per texel (Luminance, Luminance-Alpha, RGB and RGB-Alpha, respectively)
    - HDR (high dynamic range) texture data with 1, 3 or 4 components per texel
- Fine-grained per-block adjustable bit-allocation between index bits and color endpoint bits.
- 2D and 3D variants.
- Each block represents a rectangular or cuboidal footprint of texels. The footprint size determines the bit-rate of this texture format and is global for the texture as a whole.

Supported footprint sizes for 2D variants are:
- 4×4 (8 bpp)
- 5×4 (6.40 bpp)
- 5×5 (5.12 bpp)
- 6×5 (4.27 bpp)
- 6×6 (3.56 bpp)
- 8×5 (3.20 bpp)
- 8×6 (2.67 bpp)
- 10×5 (2.56 bpp)
- 10×6 (2.13 bpp)
- 8×8 (2 bpp)
- 10×8 (1.60 bpp)
- 10×10 (1.28 bpp)
- 12×10 (1.07 bpp)
- 12×12 (0.88 bpp)

Supported footprint sizes for 3D variants are:
- 3×3×3 (4.74 bpp)
- 4×3×3 (3.56 bpp)
- 4×4×3 (2.67 bpp)
- 4×4×4 (2 bpp)
- 5×4×4 (1.60 bpp)
- 5×5×4 (1.28 bpp)
- 5×5×5 (1.02 bpp)
- 6×5×5 (0.85 bpp)
- 6×6×5 (0.71 bpp)
- 6×6×6 (0.59 bpp)

The types of texture data supported (component count, LDR vs HDR) is not dependent on footprint size; all types are available at all sizes.
- Block partitioning, with a partitioning pattern generation function; each partition has a separate pair of endpoint colors. The format allows different partitions within a single block to have different endpoint types. The format supports 1 to 4 partitions per block.
- Index decimation: The format allows indices to be specified for only some texels, with an infill procedure used for the remaining texels; this is especially useful at lower bitrates.
- Void extents: The format offers an encoding to indicate large empty regions within the texture.
- The ability to use different data rates for different mipmap levels.

Layout of the Block

If partitioning is disabled for the block, then the encoded block has the following format:

| Bits | Usage |
| --- | --- |
| 10:0 | Index Bits Mode |
| 12:11 | "00" |
| 16:13 | Color Endpoint Mode |
| 127:17 | Remaining Space |

If partitioning is enabled, the encoded block has the following format:

| Bits | Usage |
| --- | --- |
| 10:0 | Index Bits Mode |
| 12:11 | Partition count minus 1 |
| 22:13 | Partition index |
| 28:23 | Color Endpoint Mode, initial six bits |
| 127:29 | Remaining Space |

The "Remaining Space" is used to hold Index Data (from the top down), Color Endpoint Data (from the bottom up) and Color Endpoint Mode bits (if more than 6 bits are needed). The sizes of the Index Data, the Color Endpoint Data and the Color Endpoint Mode bits are not fixed, but are instead computed based on Index Bit Mode and the initial six bits of Color Endpoint Mode.

As a special case, if bits[8:0] of the encoded block are "111111100", then the block does not encode ordinary compressed content; instead, it encodes a Void-Extent Block.

Partitioning

An encoded block is subdivided into 1, 2, 3 or 4 partitions, with a separate color endpoint pair for each partition. The number of partitions is specified by the "Partition count minus 1" bits.

If 2 or more partitions are used, then the partition index is used to select one of 1024 partitioning patterns; the set of patterns supported depends on the partition count and block size.

The partitioning patterns are produced with a generator function; this enables a very large set of partitioning patterns for different block sizes to be implemented with a minimal number of gates. The details on how the generator works in this embodiment are given below.

Index Modes

The "Index Bits Mode" field controls the number of indexes present, as well as the range used for them. The set of possible combinations depend on the block dimensionality (2D or 3D).

The actual indexes in the block are stored are follows:
  First, they are encoded using the Integer Sequence Encoding method described below.
  The resulting bit-sequence is then bit-reversed, and stored from the top of the block downwards.

Usage of Indexes

The indexes are used to interpolate between two endpoint colors for each texel. First, they are scaled from whatever interval (range) they were supplied in to the range 0.1; the resulting value is then used as a weight to compute a weighted sum of the two endpoints. Any suitable unquantization procedure for the scaling to the 0.1 range can be used.

Index Infill

Each texel that the block encodes has a corresponding index to be used for that texel. In some of the index modes, one index is supplied for every texel in the block; in others, the number of indexes is less than the number of texels. In the latter case, the indexes that are actually to be used for the texels are derived by bilinear (or simplex or trilinear, for 3D blocks) interpolation from the indexes that are supplied (encoded) in the block. Thus, when the index count is smaller than the number of texels in the block, the actual indexes to be used for the texels of the block are derived by bilinear (or simplex or trilinear) interpolation from the index values supplied in the encoded block, i.e. the index for a texel will be computed as an appropriately weighted sum of 2, 3 or 4 (or more) of the indexes supplied (included) in the encoded block.

Thus, in the present embodiment, where an encoded texture data block includes fewer indices than the number of texels the block represents, the encoded texture data block will include a set of index values representing an array of index values at a given resolution that is less than the resolution of the array of texture data elements that the block represents, and then the index values to use for the array of texture data elements that the block represents are derived in use by bilinear (or simplex or trilinear) interpolation from the array of index values that is encoded (included) in the encoded texture data block. For example, an encoded block encoding an 8×8 array of texels may encode (include) only a 5×5 array of index values.

Other arrangements, such as using look-up tables, and/or using predefined index infill patterns (which may be derived, e.g. using a predefined infill pattern generation function, or stored explicitly, e.g. in look-up tables), to derive any "missing" texel indexes can also or instead be used if desired.

Index Planes

Depending on the Index Bits mode selected, the format may offer 1 or 2 index planes. In the case of 2 index planes, two indexes rather than just one are supplied for each texel that receives indexes. Of these two indexes, the first one is used for a weighted sum of three of the color components; the second is used for a weighted sum of the fourth color component. If only 1 index plane is present, it applies to all four color components.

If two index planes are used, then a 2-bit bitfield is used to indicate which of the color components the second index plane applies to. These two bits are stored just below the index bits, except in the case where leftover color endpoint type bits are present; in that case, these two bits are stored just below the leftover color endpoint type bits.

This two-bit bitfield has the following layout:

| Value | Meaning |
|---|---|
| 0 | Red |
| 1 | Green |
| 2 | Blue |
| 3 | Alpha |

If index infill is present while two index planes are being used, then index infill is performed on each index plane separately.

Index Modes

The Index Mode field specifies the width, height and depth of the grid of indices, what range of values they use, and whether dual index planes are present. Since some these are not represented using powers of two (there are 12 possible index widths, for example), and not all combinations are allowed, this is not a simple bit packing. However, it can be unpacked quickly in hardware.

The index ranges are encoded using a 3 bit value R, which is interpreted together with a precision bit H, as follows:

| R | Index Range | Trits | Quints | Bits |
|---|---|---|---|---|
| \multicolumn{5}{c}{Low Precision Range (H = 0)} | | | | |
| 000 | Invalid | | | |
| 001 | Invalid | | | |
| 010 | 0 . . . 1 | | | 1 |
| 011 | 0 . . . 2 | 1 | | |
| 100 | 0 . . . 3 | | | 2 |
| 101 | 0 . . . 4 | | 1 | |
| 110 | 0 . . . 5 | 1 | | 1 |
| 111 | 0 . . . 7 | | | 3 |
| \multicolumn{5}{c}{High Precision Range (H = 1)} | | | | |
| 000 | Invalid | | | |
| 001 | Invalid | | | |
| 010 | 0 . . . 9 | | 1 | 1 |
| 011 | 0 . . . 11 | 1 | | 2 |
| 100 | 0 . . . 15 | | | 4 |
| 101 | 0 . . . 19 | | 1 | 2 |
| 110 | 0 . . . 23 | 1 | | 3 |
| 111 | 0 . . . 31 | | | 5 |

For 2D blocks, the index mode field is laid out as follows:

| 10 | 9 | 8 | 7 | 6 | 5 | 4 | 3 | 2 | 1 | 0 | Width N | Height M | Notes |
|---|---|---|---|---|---|---|---|---|---|---|---|---|---|
| D | H | | B | | A | $R_0$ | 0 | 0 | $R_2$ | $R_1$ | B + 4 | A + 2 | |
| D | H | | B | | A | $R_0$ | 0 | 1 | $R_2$ | $R_1$ | B + 8 | A + 2 | |
| D | H | | B | | A | $R_0$ | 1 | 0 | $R_2$ | $R_1$ | A + 2 | B + 8 | |
| D | H | 0 | B | | A | $R_0$ | 1 | 1 | $R_2$ | $R_1$ | A + 2 | B + 6 | |
| D | H | 1 | B | | A | $R_0$ | 1 | 1 | $R_2$ | $R_1$ | B + 2 | A + 2 | |
| D | H | 0 | 0 | | A | $R_0$ | $R_2$ | $R_1$ | 0 | 0 | 12 | A + 2 | |

| 10 | 9 | 8 | 7 | 6 | 5 | 4 | 3 | 2 | 1 | 0 | Width N | Height M | Notes |
|---|---|---|---|---|---|---|---|---|---|---|---|---|---|
| D | H | 0 | 1 |   | A | $R_0$ | $R_2$ | $R_1$ | 0 | 0 | A + 2 | 12 |   |
| D | H | 1 | 1 | 0 | 0 | $R_0$ | $R_2$ | $R_1$ | 0 | 0 | 6 | 10 |   |
| D | H | 1 | 1 | 0 | 1 | $R_0$ | $R_2$ | $R_1$ | 0 | 0 | 10 | 6 |   |
|   | B | 1 | 0 |   | A | $R_0$ | $R_2$ | $R_1$ | 0 | 0 | A + 6 | B + 6 | D = 0, H = 0 |
| x | x | 1 | 1 | 1 | 1 | 1 | 1 | 1 | 0 | 0 | — | — | Void-extent |
| x | x | 1 | 1 | 1 | x | x | x | x | 0 | 0 | — | — | Reserved |
| x | x | x | x | x | x | x | 0 | 0 | 0 | 0 | — | — | Reserved |

Note that, due to the encoding of the R field, as described in the previous page, bits $R_2$ and $R_1$ cannot both be zero, which disambiguates the first five rows from the rest of the table.

For 3D blocks, the index mode field is laid out as follows:

| 10 | 9 | 8 | 7 | 6 | 5 | 4 | 3 | 2 | 1 | 0 | Width N | Height M | Depth Q | Notes |
|---|---|---|---|---|---|---|---|---|---|---|---|---|---|---|
| D | H | B |   | A | $R_0$ | C | $R_2$ | $R_1$ | A + 2 | B + 2 | C + 2 |   |   |   |
|   | B | 0 | 0 |   | A | $R_0$ | $R_2$ | $R_1$ | 0 | 0 | 6 | B + 2 | A + 2 | D = 0, H = 0 |
|   | B | 0 | 1 |   | A | $R_0$ | $R_2$ | $R_1$ | 0 | 0 | A + 2 | 6 | B + 2 | D = 0, H = 0 |
|   | B | 1 | 0 |   | A | $R_0$ | $R_2$ | $R_1$ | 0 | 0 | A + 2 | B + 2 | 6 | D = 0, H = 0 |
| D | H | 1 | 1 | 0 | 0 | $R_0$ | $R_2$ | $R_1$ | 0 | 0 | 6 | 2 | 2 |   |
| D | H | 1 | 1 | 0 | 1 | $R_0$ | $R_2$ | $R_1$ | 0 | 0 | 2 | 6 | 2 |   |
| D | H | 1 | 1 | 1 | 0 | $R_0$ | $R_2$ | $R_1$ | 0 | 0 | 2 | 2 | 6 |   |
| x | x | 1 | 1 | 1 | 1 | 1 | 1 | 1 | 0 | 0 | — | — | — | Void-extent |
| x | x | 1 | 1 | 1 | 1 | x | x | x | 0 | 0 | — | — | — | Reserved (except for valid void extent encodings) |
| x | x | x | x | x | x | x | 0 | 0 | 0 | 0 | — | — | — | Reserved |

The D bit is set to indicate dual-plane mode. In this mode, the maximum allowed number of partitions is 3.

The size of the grid in each dimension must be less than or equal to the corresponding dimension of the block footprint. If the grid size is greater than the footprint dimension in any axis, then this is an illegal block encoding and all texels will decode to an error color.

The index range specifies how the index values are used to compute the weightings. In all cases, the value 0 will generate an interpolated value with the value of endpoint 1, and the maximum value (according to the selected range) generates an interpolated value equal to endpoint 2's value.

For LDR endpoint values, the interpolation is linear. So if M is the maximum allowed value in the range, the actual interpolated value is equal to (1−index/M)*(endpoint value 1)+(index/M)*(endpoint value 2). The division by M is what scales the input values in the range 0 . . . M into weighting values in the range 0..1. The range therefore selects how many intermediate steps there are between these two values. The more range, the more likely one is able to represent a value closely, but the more bits needed to encode it.

In the present embodiment, the index value is first rescaled so that M is a power of two (in an embodiment 64), so that the costly division by M can be replaced with a relatively cheap multiplication by 64/M, and then a division by 64.

For HDR endpoint values, the interpolation is a logarithmic function, or an approximation thereof. The endpoint values are encoded as logarithms to the base 2 of the original endpoint values. So if M is the maximum allowed value in the range, the interpolated value is the logarithm of the final decoded values, and is equal to (1−index/M)*(endpoint value 1)+(index/M)*(endpoint value 2). The final decoded value is therefore 2 to the power of the interpolated value.

In the present embodiment, the HDR endpoint values are stored as values with a 12 bit floating point representation, and interpolation occurs in a piecewise-approximate logarithmic manner as follows.

The HDR color components from each endpoint, C0 and C1, are initially shifted left 4 bits to become 16-bit integer values and these are first interpolated in the same way as LDR, using the rescaled index value i. The resulting 16-bit value C is then decomposed into the top five bits, e, and the bottom 11 bits m, which are then processed and recombined with e to form the final value Cf:

C=floor((C0*(64−i)+C1*i+32)/64)
E=(C&0xF800)>>11; m=C&0x7FF;
if (m<512) {mt=3*m;}
else if (m>=1536) {mt=5*m−2048;}
else {mt=4*m−512;}
Cf=(e<<10)+(mt>>3)

This interpolation is simple to implement in hardware, and is a considerably closer approximation to a logarithmic interpolation than interpolating the integer interpretation of the bit pattern of a floating-point value.

The final value Cf is interpreted as an IEEE FP16 value. If the result is +Inf or NaN, it is converted to the bit pattern 0x7BFF, which is the largest representable finite value.

The index count is used in larger block sizes to indicate how many indexes are actually present in the encoded block. This may be less than the size of the block, in which case the "missing" indexes have to be derived (as discussed above). (For example, a block encoding an 8×8 texel array may only specify a 4×4 grid of indexes, in which case the remaining indexes will be generated using "index infill", as discussed above.)

Color Endpoint Modes

The format of the present embodiment supports 16 Color Endpoint Modes, which are described in more detail later. These endpoint modes are subdivided into 4 classes:

class 0: one color endpoint pair is specified by 2 integers
class 1: one color endpont pair is specified by 4 integers
class 2: one color endpoint pair is specified with 6 integers
class 3: one color endpoint pair is specified with 8 integers
Each of these classes contains 4 Color Endpoint Modes.

In 1-partition mode, the 4-bit Color Endpoint Mode field has the following encoding:

| Bits | Usage |
|------|-------|
| 1:0  | Endpoint Mode Class |
| 3:2  | Endpoint Mode within class |

In modes with more than 1 partition, the color endpoint mode coding is more elaborate:

First, we have a 2-bit Endpoint Mode Class Pair Selector; this selector is encoded as follows:

| Value | Meaning |
|-------|---------|
| 00 | All endpoint pairs are of same type, this type follows |
| 01 | All endpoint pairs are of class 0 or class 1 |
| 10 | All endpoint pairs are of class 1 or class 2 |
| 11 | All endpoint pairs are of class 2 or class 3 |

If all endpoints are of same type, then this field is followed by a 4-bit field, containing the Color Endpoint Mode used for all partitions. Otherwise, the field is followed by:

First, one bit per partition indicating which class its endpoint pair belongs to.

Then, two bits per partition indicating which mode within the class it belongs to.

Thus, for multi-partition modes, the endpoint mode representation may take from 6 to 14 bits. Of these, the 6 first bits are stored just after the partition indexes, and the remaining bits are stored just below the index bits (variable position).

This data layout ensures that the bits that indicate endpoint pair class always appear in fixed locations; this helps decode performance in hardware.

Color Endpoint Representation

The color endpoints themselves are also represented using the Integer Sequence Encoding. The actual range being used is not directly encoded in the block; instead, the following is done:

From the partition-count and color-mode encodings, the number of integers actually needed for the color encodings is computed. This may be from 2 to 32, in increments of 2. (The lowest count, 2, occurs when using the Two-Luminance endpoint type with a single partition; the highest count, 32, occurs when using the Two-RGBA endpoint type with 4 partitions).

From the partition-count, color-mode encoding and index-bits-mode, the number of bits needed to represent these data fields is computed; this bit count is then subtracted from the block size in order to obtain the number of bits actually available for the color encodings.

Then, the largest range whose Integer Sequence Encoding will fit into the available number of bits is determined (and used).

For example, if the space available for color endpoints is 35 bits, and the number of integers actually needed for the color encodings is ten, then the range used will be 0 . . . 9: the Integer Sequence Encoding of ten integers of such a range takes 34 bits, which fits. The next step up would be to use the range 0 . . . 11; for this range, the Integer Sequence Encoding would take 36 bits to encode ten integers, which would not fit.

Integer Sequence Encoding

The Integer Sequence Encoding is a data encoding that is used to encode most of the data in the compressed (encoded) texture data block in the present embodiment, and uses the integer encoding techniques of the technology described herein.

In order to use space efficiently, the encoding format is able to use a non-integer number of bits for its color endpoint and index fields. This is achieved by using trits (items that can take the values 0, 1, 2 (whereas bits can only take the values 0 and 1)), and quints (which can take the values 0, 1, 2, 3, 4). As trits and quints cannot be represented directly in a binary computer the encoding format instead stores trits and quints in a bit representation that allows n trits to be represented with $$\left\lceil \frac{8n}{5} \right\rceil$$

bits and n quints to be represented with $$\left\lceil \frac{7n}{3} \right\rceil$$

bits.

The Integer Sequence Encoding is used to store a sequence of integers within a bounded range. The range used determines how many bits, trits and quints are used to store each integer. The set of supported ranges and their bit/trit/quint allocation is:

| Range | Bits | Trits/Quints |
|-------|------|--------------|
| 0 . . . 1   | 1 | 0 |
| 0 . . . 2   | 0 | 1 trit |
| 0 . . . 3   | 2 | 0 |
| 0 . . . 4   | 0 | 1 quint |
| 0 . . . 5   | 1 | 1 trit |
| 0 . . . 7   | 3 | 0 |
| 0 . . . 9   | 1 | 1 quint |
| 0 . . . 11  | 2 | 1 trit |
| 0 . . . 15  | 4 | 0 |
| 0 . . . 19  | 2 | 1 quint |
| 0 . . . 23  | 3 | 1 trit |
| 0 . . . 31  | 5 | 0 |
| 0 . . . 39  | 3 | 1 quint |
| 0 . . . 47  | 4 | 1 trit |
| 0 . . . 63  | 6 | 0 |
| 0 . . . 79  | 4 | 1 quint |
| 0 . . . 95  | 5 | 1 trit |
| 0 . . . 127 | 7 | 0 |
| 0 . . . 159 | 5 | 1 quint |
| 0 . . . 191 | 6 | 1 trit |
| 0 . . . 255 | 8 | 0 |

Encoding with Bits Only

If the range selected only uses bits, then integers are stored sequentially, with the lowest bit appearing first in the sequence encoding. For example, if you want to encode a sequence of four numbers (a, b, c, d) whose range is 0.7 and whose bit-representation is ($a=a_2a_1a_0$, $b=b_2b_1b_0$, $c=c_2c_1c_0$, $d=d_2d_1d_0$), then the resulting sequence is the 12-bit pattern $d_2d_1d_0c_2c_1c_0b_2b_1b_0a_2a_1a_0$ Encoding with Trits If the range selected uses trits, then each integer is broken into two parts before encoding: if the selected range has b bits, then the low part of a given integer x is given by L=X mod $2^b$ and the high part is given by $$H = \left\lfloor \frac{X}{2^b} \right\rfloor.$$

The L portion is represented by zero or more bits; the H portion is represented by one trit.

The integers are then stored in groups of 5, as follows:
  First, a trit H is collected from every integer; this results in 5 trits. These are encoded into a trit-block; the full size of the trit-block is 8 bits.
  Then, bits are stored in the sequence in the following order:
    First, the low bits for the first integer are stored.
    Then, bits[1:0] of the trit-block are stored.
    Then, the low bits for the second integer are stored.
    Then, bits[3:2] of the trit-block are stored.
    Then, the low bits for the third integer are stored.
    Then, bit[4] of the trit-block is stored.
    Then, the low bits for the fourth integer are stored.
    Then bits[6:5] of the trit-block are stored.
    Then, the low bits for the fifth integer are stored.
    Then, bit [7] of the trit-block is stored.

This operation is repeated for every group of 5 integers, until all the integers in the sequence have been consumed. At encode time, if the number of integers is not a multiple of 5, the integer sequence is padded with 0s until its size becomes a multiple of 5. At decode time, if the number of integers to extract from the sequence is not a multiple of 5, then the sequence's bit representation has a (notionally infinite) string of zero-bits appended. This way, the format only stores bits for the integers actually needed, instead of storing bits for a multiple-of-5 integers.

Decoding of a Trit-Block

Let the trit-block be denoted by b[7:0]. Now, proceed as follows:

```
First, we check whether b[4 : 2] is equal to 3'b111 . If it is then:
   - Set c={b[7:5],b[1:0]}
   - Set t_4=2 and t_3=2
Else
   - Set c=b[4:0]
   - If b[6:5]=2'b11 then
       □ Set t_4=2 and t_3={1'b0,b[7]}
   - Else
       □ Set t_4={1'b0,b[7]} and t_3=b[6:5]
If c[1:0]=2'b11 then
   - t_2=2 , t_1={1'b0,c[4]} , t_0={c[3], c[2]&~c[3]}
Else if c[3:2]=2'b11 then
   - t_2=2 , t_1=2 , t_0=c[1:0]
Else
   - t_2={1'b0,c[4]} , t_1=c[3:2] , t_0={c[1], c[0]&~c[1]}
```

This encoding is chosen based on two criteria:
It has the property that if only the n lowest trits are nonzero, then only the $$\left\lceil \frac{8n}{5} \right\rceil$$

lowest bits of the trit-block can actually be nonzero.
The decoding process has a particularly efficient hardware implementation.

The AND-NOT operation on the lowest bit of to ensures that the trit-block unpacks to a tuple of 5 valid trits for all the 256 possible input values, even though there are only $3^5=243$ such tuples.

Example Integer Sequence with Trits

As an example, it will be assumed that 8 integers in the range 0.11 are to be encoded using the Integer Sequence Encoding scheme of the present embodiment, and that these eight integers are {2,9,3,5,11,8,0, 4}. First, the integers need to be split them into bits and trits; given that the 0.11 range has one trit and two bits, the result of this splitting is:
  Trits (high part of the numbers): {0,2,0,1,2,2,0,1}
  Bits (low part of the numbers): {01,01, 11,01,11,00,00,00}
Given that there are 8 trits and 16 bits, the encoded Integer Sequence will have $$16 + \left\lceil \frac{8*8}{5} \right\rceil = 29 \text{ bits}.$$

The trits now need to be encoded into two trit-blocks. The low 5 trits are encoded into one trit-block; the high 3 trits are encoded into a second trit-block.

Encoding with Quints

If the range selected uses quints, then each integer is broken into two parts before encoding: if the selected range has b bits, then the low part of a given integer X is given by L=X mod $2^b$ and the high part is given by $$H = \left\lfloor \frac{X}{2^b} \right\rfloor.$$

The L portion is represented by zero or more bits; the H portion is represented by one quint. The integers are then stored in groups of 3, as follows:
  First, a quint H is collected from every integer; this results in 3 quints. These are encoded into a quint-block; the full size of the quint-block is 7 bits.
  Then, bits are stored in the sequence in the following order:
    First, the low bits for the first integer are stored.
    Then, bits[2:0] of the quint-block are stored.
    Then, the low bits for the second integer are stored.
    Then, bits[4:3] of the quint-block are stored.
    Then, the low bits for the third integer are stored.
    Then, bit[6:5] of the quint-block is stored.

This operation is repeated for every group of 3 integers, until all the integers in the sequence have been consumed. At encode time, if the number of integers is not a multiple of 3, the integer sequence is padded with 0s until its size becomes a multiple of 3. At decode time, if the number of integers to extract from the sequence is not a multiple of 3, then the sequence's bit representation has a (notionally infinite) string of zero-bits appended. This way, the format only stores bits for the integers actually needed, instead of storing bits for a multiple-of-3 integers.

Decoding of a Quint-Block

Let the quint-block be denoted by b[6:0] Now, proceed as follows:

```
If b[2:1]=2'b11 and b[6:5]=2'b00 then
   - Set t_2={b[0], b[4]&~ b[0], b[3]&~ b[0]}, t_1=4 , t_0=4
Else
   - If b[2:1]=2'b11 then
       □ Set t_2=4 and c={b[4:3], ~ b[6:5], b[0]}
```

-continued

```
- Else
    □ Set t₂={1'b0,b[6:5]} and c=b[4:0]
  - If c[2:0]=3'b101 then
      □ Set t₁=4 and t₀={1'b0,c[4:3]}
  - Else
      □ Set t₁={1'b0,c[4:3]} and t₀=c[2:0]
```

This encoding is chosen by two criteria:
It has the property that if only the n lowest quints are nonzero, then only the $$\left\lceil \frac{7n}{3} \right\rceil$$

lowest bits of the quint-block can actually be nonzero.
The decoding process has a particularly efficient hardware implementation.

The AND-NOT operation in the first rule ensures that all 128 possible values decode to valid quint-triplets, even though there exists only $5^3=125$ distinct quint-triplet values; four of the values (of the form 7'b00xx111) represent the quint-triplet <4,4,4>.

The above decoding arrangement when using trits or quints effectively, for a stream of values, first emit the bits for each value, and then emit sufficient bits from the packed trit- or quint-block to make up 8n/5 (rounded up) bits or 7n/3 (rounded up) bits, respectively. This ensures that the bitstream can be terminated after any value without losing data.

The above trit/quint unpacking functions have a relatively low hardware cost.

Other arrangements would, of course, be possible. For example, there are a fairly large number of possible unpacking functions as such; some of these can be obtained by e.g. just inverting or swapping input or output bits relative to what is described above; other ones can be obtained by more elaborate sub-case approaches or by arithmetic (repeated division/modulo gives one particularly-easy-to-understand unpacking; however this approach is expensive in HW) or by look-up tables (which allow arbitrary unpacking functions albeit at a higher cost).

Color Endpoint Unquantization

The color endpoints, after having been extracted from their Integer Sequence Encoding, need to be unquantized so that they end up in the range 0.255 instead of whatever range was used in the Integer Sequence Encoding.

For bit-only ranges, the unquantization is done using simple bit replication.

In the case of a number composed of a trit/quint and one or more bits, a more elaborate procedure is performed:

First, the lowest bit $b_0$ is cut off.
Based on the range used, a constant C is selected; the trit or quint is multiplied by this constant, resulting in the 9-bit value T.
Based on the range used, a swizzle is performed on the remaining bits; this 9-bit value is called B.
The addition T+B is then performed, then every bit of the addition result is XORed with the bit $b_0$.
The result is a 9-bit number; $b_o$ is prepended to this number, then the two lowest bits are discarded; this leaves 8 bits, which is the unquantization result.

Below are tables that specify the swizzles and C values to use for the various ranges. Note that the lowest bit $b_0$ is not part of the input bits.

Swizzles and C values for the case where a trit component is present:

| Range  | Input bits | Swizzle   | C   |
|--------|------------|-----------|-----|
| 0...5  | none       | 000000000 | 204 |
| 0...11 | a          | a000a0aa0 | 93  |
| 0...23 | ab         | ab000abab | 44  |
| 0...47 | abc        | abc000abc | 22  |
| 0...95 | abcd       | abcd000ab | 11  |
| 0...191| abcde      | abcde000a | 5   |

Swizzles and C values for the case where a quint component is present:

| Range   | Input bits | Swizzle   | C   |
|---------|------------|-----------|-----|
| 0...9   | none       | 000000000 | 113 |
| 0...19  | a          | a0000aa00 | 54  |
| 0...39  | ab         | ab0000aba | 26  |
| 0...79  | abc        | abc0000ab | 13  |
| 0...159 | abcd       | abcd0000a | 6   |

This procedure produces an unquantization result with an error that is never greater than off-by-1 relative to a correctly-rounding unquantization, while imposing a much lesser hardware cost (the "correctly rounding" unquantization procedure requires a multiplier, while the procedure presented here does not). It can have the side effect of scrambling the code point order, but this does not adversely affect image quality and is therefore considered acceptable (the encoder can easily compensate for this scrambling with a simple table lookup).

In this unquantisation procedure, the constant C is based on 1023/M where M is the maximum value in the range, and is selected so that the trit or quint makes a low-order contribution to the final unquantized result (while the bits make a high-order contribution, which is what the swizzle ultimately tries to achieve), such that the representable codepoints are as evenly distributed as possible.

The swizzle patterns are related to the bit patterns of the reciprocal of M, so that the swizzle effectively does a truncated multiplication.

The manipulation using $b_0$ is done in order to obtain codepoint symmetry, so that if there exists a value that unquantizes to X, there also always exists a value that unquantizes to 255-X. (This symmetry does not quite hold for the 0.2 and 0.4 ranges, which do not allow for the $b_0$ bit at all; these have an odd number of codepoints and therefore cannot be made symmetric.)

Color Endpoint Modes

The format of the present embodiment supports a total of 16 Color Endpoint Modes; these modes control how the color endpoint integers are converted into actual endpoint colors. The integers are the 0.255 range integers that are present after the Color Endpoint Unquantization.

Several procedures are used repeatedly for several color conversion modes; below, C++ implementations of these procedures are given:

The bit_transfer_signed Procedure

The bit_transfer procedure is used when one of the integers in an endpoint representation is deemed to require more precision than the other ones. It is used instead of independently assigning ranges to some sets of values, to skew the bit distribution more favourably.

Assuming two integers A and B, the bit-transfer works from A to B as follows:

```
void bit_transfer_signed( uint8_t &a, uint8_t &b )
{
    b >>= 1;
    b |= a & 0x80;
    a >>= 1;
    a &= 0x3F;
    if( (a & 0x20) != 0 ) a -= 0x40;
}
```

Where necessary, the encoding should specify which values are the donors and which the receivers of the transferred bits.

The Blue-Contraction Procedure

The blue_contract procedure is used to provide 1 extra bit of effective precision for the red and green components of RGB colors that are close to gray. The procedure works as follows:

```
void blue_contract( uint8_t &r, uint8_t &g, uint8_t &b )
{
    r = (r+b) >> 1;
    g = (g+b) >> 1;
}
```

This procedure is used, because the Applicants have recognised that if the texels in a block to be encoded are close to grey, then the endpoint r, g, and b values will be close to one another, and it is advantageous in that case to encode the r and g components with more precision than the blue. The encoder may decide in this case to transfer precision from the blue by expanding the endpoint's green and red components according to the following blue-expansion transformation:

G=(g<<1)−b

R=(r<<1)−b

B=b (It can be determined that the endpoints are sufficiently close to the gray line by, for example, testing if the gray expansion transform results in values that can be properly represented, i.e. they are still in the range 0.1. Other arrangements would, of course, be possible.)

The resulting R and G and B values are encoded as the endpoint values.

If this has been applied during encoding, the inverse "blue contraction" transformation described above must be applied to the endpoint values after decoding:

g=(G+B)>>1 r=(R+B)>>1 b=B

The encoder could use an additional bit to indicate to the decoder that this is required, but in the present embodiment it takes advantage of the fact that the order of endpoints is not important. A comparison function between the two endpoint colors (e.g. by comparing the total of r, g and b for each endpoint) is therefore defined. The encoder then orders the endpoints such that that the results of the comparison between the color values at endpoint 1 and endpoint 2 reflects whether blue contraction should be applied during the decoding process or not. The decoder will then use the same comparison function to conditionally apply blue contraction on the endpoint values after decoding (as discussed below).

Colour Endpoint Mode 0: Two Luminance or Alpha Endpoints

This mode takes as input two integers (v0, v1). If v0 is less than or equal to v1, then these integers form two RGBA colors (r0,g0,b0,a0)=(v0,v0,v0,0xFF) and (r1,g1,b1,a1)=(v1,v1,v1,0xFF). Otherwise, they form two RGBA colors (r0,g0,b0,a0)=(0,0,0,v1) and (r1,g1,b1,a1)=(0,0,0,v0).

Mode 1: Luminance, Base+Offset

This mode takes as input two integers (v0,v1). Two integers I0 and I1 are then formed according to the following procedure:

```
void mode1_unpack( int v0, int v1, int &I0, int &I1 )
{
    I0 = (v0 >> 2) | (v1 & 0xC0);
    I1 = I0 + (v1 & 0x3f);
    if(I1 > 0xFF) I1 = 0xFF;
}
```

After this, two RGBA colors are formed as (r0,g0,b0,a0)=(I0,I0,I0,0xFF) and (r1,g1,b1,a1)=(I1,I1,I1,0xFF)

Mode 2: HDR Luminance, Large Range

This mode takes as input two integers (v0,v1). These two integers are then unpacked into a pair of HDR luminance values, as follows:

```
void mode2_unpack_y( int v0, int v1, int &y0, int &y1 )
{
    if(v1 >= v0)
    {
        y0 = (v0 << 4);
        y1 = (v1 << 4);
    }
    else
    {
        y0 = (v1 << 4) + 8;
        y1 = (v0 << 4) − 8;
    }
}
```

This mode is intended for use when there are large luminance changes in a small region or there is a need to represent very large/small luminance values.

Mode 3: HDR Luminance, Small Range

This mode takes as input two integers (v0,v1). These two integers are then unpacked into a pair of HDR luminance values, as follows:

```
void mode3_unpack_y( int v0, int v1, int &y0, int &y1 )
{
    if((v0&0x80) !=0)
    {
        y0 = ((v1 & 0xE0) << 4) | ((v0 & 0x7F) << 2);
        d = (v1 & 0x1F) << 2;
    }
    else
    {
        y0 = ((v1 & 0xF0) << 4) | ((v0 & 0x7F) << 1);
        d = (v1 & 0x0F) << 1;
    }
    y1 = y0 + d;
    if(y1 > 0xFFF) { y1 = 0xFFF; }
}
```

Mode 4: Two Luminance-Alpha Endpoints

This mode takes as input four integers (v0, v1, v2, v3). These integers form two RGBA colors (r0,g0,g0,a0)=(v0,v0,v0,v2) and (r1,g1,b1,a1)=(v1,v1,v1,v3)

Mode 5: Luminance-Alpha, Base+Offset

This mode takes as input four integers (v0, v1, v2, v3). From these integers, a base value (Ib, ab)=(v0, v2) and an offset value (Io,ao)=(v1,v3) are formed; the bit_transfer_signed procedure is then performed to transfer one bit from Io to Ib, and one bit from ao to ab; the two endpoints then form two RGBA colors as (r0,g0,b0,a0)=(Ib,Ib,Ib,ab) and (r1,g1,b1,a1)=(Ib+Io,Ib+Io,Ib+Io,ab+ao). The RGB values are clamped to the range 0x00 . . . 0xFF.

Mode 6: RGB and Scale

This mode takes as input four integers (v0, v1, v2, v3). From these integers, two endpoint colors are formed:

Endpoint color 0 is given by (r0,g0,b0,a0)=((v0*v3)>>8, (v1*v3)>>8, (v2*v3)>>8, 0xFF)

Endpoint color 1 is given by (r1,g1,b1,a1)=(v0,v1,v2, 0xFF)

Mode 7: Two HDR RGB Endpoints, Base and Scale

This mode takes as input four integers (v0, v1, v2, v3). These are a complex packing allowing bits to be transferred from one color component to another. The integers are unpacked into two HDR RGBA endpoint colors e0 and e1 as follows:

```
void mode7_unpack_y( int v0, int v1, color &e0, color &e1 )
{
    int modeval = ((v0 & 0xC0) >> 6) | ((v1 & 0x80) >> 5) |
        ((v2 & 0x80) >> 4);
    int majcomp;
    int mode;
    if( (modeval & 0xC) != 0xC )
        { majcomp = modeval >> 2; mode = modeval & 3; }
    else if( modeval != 0xF )
        { majcomp = modeval & 3; mode = 4; }
    else
        { majcomp = 0; mode = 5; }
    int red = v0 & 0x3f;
    int green = v1 & 0x1f;
    int blue = v2 & 0x1f;
    int scale = v3 & 0x1f;
    int x0 = (v1 >> 6) & 1; int x1 = (v1 >> 5) & 1;
    int x2 = (v2 >> 6) & 1; int x3 = (v2 >> 5) & 1;
    int x4 = (v3 >> 7) & 1; int x5 = (v3 >> 6) & 1; int x6 = (v3 >> 5) & 1;
    int ohm = 1 << mode;
    if( ohm & 0x30 ) green |= x0 << 6;
    if( ohm & 0x3A ) green |= x1 << 5;
    if( ohm & 0x30 ) blue |= x2 << 6;
    if( ohm & 0x3A ) blue |= x3 << 5;
    if( ohm & 0x3D ) scale |= x6 << 5;
    if( ohm & 0x2D ) scale |= x5 << 6;
    if( ohm & 0x04 ) scale |= x4 << 7;
    if( ohm & 0x3B ) red |= x4 << 6;
    if( ohm & 0x04 ) red |= x3 << 6;
    if( ohm & 0x10 ) red |= x5 << 7;
    if( ohm & 0x0F ) red |= x2 << 7;
    if( ohm & 0x05 ) red |= x1 << 8;
    if( ohm & 0x0A ) red |= x0 << 8;
    if( ohm & 0x05 ) red |= x0 << 9;
    if( ohm & 0x02 ) red |= x6 << 9;
    if( ohm & 0x01 ) red |= x3 << 10;
    if( ohm & 0x02 ) red |= x5 << 10;
    static const int shamts[6] = { 1,1,2,3,4,5 };
    int shamt = shamts[mode];
    red <<= shamt; green <<= shamt; blue <<= shamt; scale <<= shamt;
    if( mode != 5 ) { green = red - green; blue = red - blue; }
    if( majcomp == 1 ) swap( red, green );
    if( majcomp == 2 ) swap( red, blue );
    e1.r = clamp( red, 0, 0xFFF );
    e1.g = clamp( green, 0, 0xFFF );
    e1.b = clamp( blue, 0, 0xFFF );
    e1.alpha = 0x780;
    e0.r = clamp( red - scale, 0, 0xFFF );
    e0.g = clamp( green - scale, 0, 0xFFF );
    e0.b = clamp( blue - scale, 0, 0xFFF );
    e0.alpha = 0x780;
}
```

Mode 8: Two RGB Endpoints

This mode takes as input six integers (v0, v1, v2, v3, v4, v5). From these integers, two sums: s0=(v0+v2+v4), s1=(v1+v3+v5) are computed. These two sums are then compared:

If s1>=s0, then the two endpoint colors are obtained as (r0,g0,b0,a0)=(v0,v2,v4,0xFF) and (r1,g1,b1,a1)=(v1,v3,v5,0xFF)

If s1<s0, then the two endpoint colors are obtained as (r0,g0,b0,a0)=(v1,v3,v5,0xFF) and (r1,g1,b1,a1)=(v0, v2,v4,0xFF); both of these two endpoint colors are then subjected to the blue_contraction procedure.

Mode 9: RGB Base+Offset

This mode takes as input six integers (v0, v2, v2, v3, v4, v5). These integers form an RGB base (rb, gb, bb)=(v0, v2, v4) and an RGB offset (ro, go, bo)=(v1,v3,v5). The base and offset values are then modified by having the bit_transfer_signed procedure applied to them to move one bit from the offset to the base (that is, from ro to rb, from go to gb and from $b_0$ to bb).

The two endpoint colors are then given by (rb,gb,bb,0xFF) and (rb+ro, gb+go, bb+bo, 0xFF).

If the offset sum s=(ro+go+bo) is negative, then the two endpoint numbers are swapped and have the blue_contraction procedure applied to them.). The RGB values are clamped to the range 0x00.0xFF.

Mode 10: RGB, scale, and two alpha endpoints

This mode takes as input six integers (v0, v1, v2, v3, v4, v5). First, use (v0,v1,v2,v3) to produce two endpoint colors just as in Mode 6. Then replace the alpha of the first endpoint color with v4 and the alpha of the second endpoint color with v5.

Mode 11: Two HDR RGB Endpoints

This mode takes as input six integers (v0, v1, v2, v3, v4, v5). These are a complex packing allowing bits to be transferred from one color component to another. The integers are unpacked into two HDR RGBA endpoint colors e0 and e1 as follows:

```
void mode11_unpack_rgb( int v0, int v1, int v2,
int v3, int v4, int v5, color &e0, color &e1)
    {
        int majcomp = ((v4 & 0x80) >> 7) | ((v5 & 0x80) >> 6);
        if( majcomp == 3 )
        {
            e0 = (v0 << 4, v2 << 4, (v4 & 0x7f) << 5, 0x780);
            e1 = (v1 << 4, v3 << 4, (v5 & 0x7f) << 5, 0x780);
            return;
        }
        int mode = ((v1 & 0x80) >> 7) | ((v2 & 0x80) >> 6) |
            ((v3 & 0x80) >> 5);
        int va = v0 | ((v1 & 0x40) << 2);
        int vb0 = v2 & 0x3f;
        int vb1 = v3 & 0x3f;
        int vc = v1 & 0x3f;
        int vd0 = v4 & 0x7f;
        int vd1 = v5 & 0x7f;
        static const int dbitstab[8] = {7,6,7,6,5,6,5,6};
        vd0 = signextend( vd0, dbitstab[mode] );
        vd1 = signextend( vd1, dbitstab[mode] );
        int x0 = (v2 >> 6) & 1;
        int x1 = (v3 >> 6) & 1;
        int x2 = (v4 >> 6) & 1;
        int x3 = (v5 >> 6) & 1;
        int x4 = (v4 >> 5) & 1;
        int x5 = (v5 >> 5) & 1;
        int ohm = 1 << mode;
        if( ohm & 0xA4 ) va |= x0 << 9;
        if( ohm & 0x08 ) va |= x2 << 9;
        if( ohm & 0x50 ) va |= x4 << 9;
        if( ohm & 0x50 ) va |= x5 << 10;
        if( ohm & 0xA0 ) va |= x1 << 10;
        if( ohm & 0xC0 ) va |= x2 << 11;
        if( ohm & 0x04 ) vc |= x1 << 6;
        if( ohm & 0xE8 ) vc |= x3 << 6;
        if( ohm & 0x20 ) vc |= x2 << 7;
        if( ohm & 0x5B ) vb0 |= x0 << 6;
```

-continued

```
    if( ohm & 0x5B ) vb1 |= x1 << 6;
    if( ohm & 0x12 ) vb0 |= x2 << 7;
    if( ohm & 0x12 ) vb1 |= x3 << 7;
    int shamt = (modeval >> 1) ^ 3;
    va <<= shamt; vb0 <<= shamt; vb1 <<= shamt;
    vc <<= shamt; vd0 <<= shamt; vd1 <<= shamt;
    e1.r = clamp( va, 0, 0xFFF );
    e1.g = clamp( va - vb0, 0, 0xFFF );
    e1.b = clamp( va - vb1, 0, 0xFFF );
    e1.alpha = 0x780;
    e0.r = clamp( va - vc, 0, 0xFFF );
    e0.g = clamp( va - vb0 - vc - vd0, 0, 0xFFF );
    e0.b = clamp( va - vb1 - vc - vd1, 0, 0xFFF );
    e0.alpha = 0x780;
    if( majcomp == 1 )    { swap( e0.r, e0.g ); swap( e1.r, e1.g ); }
    else if( majcomp == 2 ) { swap( e0.r, e0.b ); swap( e1.r, e1.b ); }
}
Unlike mode 7, this mode is able to represent the full HDR range.
```

Mode 12: Two RGBA Endpoints

This mode takes as input eight integers (v0, v1, v2, v3, v4, v5, v6, v7). From these integers, two sums: s0=(v0+v2+v4), s1=(v1+v3+v5) are computed. These two sums are then compared:

If s1>=s0, then the two endpoint colors are obtained as (r0,g0,b0,a0)=(v0,v2,v4,v6) and (r1,g1,b1,a1)=(v1,v3,v5,v7)

If s1<s0, then the two endpoint colors are obtained as (r0,g0,b0,a0)=(v1,v3,v5,v7) and (r1,g1,b1,a1)=(v0,v2,v4,v6); both of these two endpoint colors are then subjected to the blue_contraction procedure.

Mode 13: RGBA Base+Offset

This mode takes as input eight integers (v0, v1, v2, v3, v4, v5, v6, v7). These integers form an RGBA base (rb, gb, bb, ab)=(v0,v2,v4,v6) and an RGB offset (ro, go, bo, ao)=(v1,v3,v5,v7). The bit_transfer_signed procedure is then used to transfer a bit from the offset value to the base values. The two endpoint colors are then given by (rb,gb,bb,ab) and (rb+ro, gb+go, bb+bo, ab+ao). If (ro+go+bo) is negative, then the blue_contraction procedure is applied to the RGB portion of each endpoint.

Mode 14: Two HDR RGBA Endpoints with LDR Alpha

This mode takes as input eight integers (v0, v1, v2, v3, v4, v5, v6, v7). The RGB components are decoded from values (v0 . . . v5) in the manner of Mode 11 discussed above. The alpha components for endpoints 0 and 1 are then filled in from values v6 and v7 respectively.

Mode 15: Two HDR RGBA Endpoints with HDR Alpha

This mode takes as input eight integers (v0, v1, v2, v3, v4, v5, v6, v7). The RGB components are decoded from values (v0 . . . v5) in the manner of Mode 11 discussed above. The alpha components are then decoded as follows from values v6 and v7 as follows:

```
void mode15_unpack_alpha(int v6, int v6, int& alpha0, int& alpha1)
{
    mode = ((v6 >> 7) & 1) | ((v7 >> 6) & 2);
    v6 &= 0x7F;
    v7 &= 0x7F;
    if(mode==3)
    {
        alpha0 = v6 << 5;
        alpha1 = v7 << 5;
    }
    else
    {
        v6 |= (v7 << (mode+1))) & 0x780;
        v7 &= (0x3F >> mode);
        v7 ^= 0x20 >> mode;
        v7 -= 0x20 >> mode;
        v6 <<= (4-mode);
        v7 <<= (4-mode);
        v7 += v6;
        v7 = clamp(v7, 0, 0xFFF);
        alpha0 = v6;
        alpha1 = v7;
    }
}
```

The Void-Extent Block

A Void-Extent block is an encoded texture data block that specifies a region within the texture in which every texture data element should be allocated the same data value when decoded and in which every sample look-up within the encoded texture will only use texture data elements having that same data value (in the present embodiment). If bits[8:0] of the compressed (encoded) block are "111111100", then the compressed block is a Void-Extent Block. This means that the block has a constant color that is common for all texels in the block, and the block additionally specifies a region within the texture (for a 2D block) in which every bilinear-sampled lookup within the texture will only touch texels whose color is identical to this constant color.

The Void-Extent feature is intended to enable specific texturing optimizations:

If a texture mapper uses a multipass method for trilinear filtering or anisotropic mapping, it may use the information in the Void-Extent block to ascertain that all its passes will only ever access texels of the same value, and thus return that value as the final texturing result immediately after the first pass without running any further passes.

A texture mapper may additionally keep a cache of recently-seen Void-Extent blocks and use them to suppress actual texture-cache line fills from memory for subsequent texturing operations.

Using the Void-Extent information is not mandatory; a texture mapper that does not implement these optimizations may ignore the Void-Extent and just treat the block as a constant-color block.

The following rules and observations apply:

If the Void-Extent coordinates are all 1s, then it is interpreted as if the block has no Void-Extent at all and is simply a constant-color block.

Encoders that cannot compute Void-Extents properly but still wish to use constant-color blocks thus always have the option to just specify an all-1s pattern for the Void-Extent in order to produce a straight constant-color block.

If a Void-Extent appears in a mipmap other than the most detailed (lowest) one, then the Void-Extent applies to all more detailed (lower) mipmap levels as well. As such, a texture mapper that implements mipmapping as a multipass method may sample the least detailed (highest) mipmap first, then upon encountering a Void-Extent, it may abstain from sampling the more detailed (lower) mipmap.

A consequence of this rule is that if a block has a constant color but the corresponding region in any of the more detailed (lower) mipmaps do not have a constant color, then the Void-Extent coordinates must be set to all 0s to signal the absence of a Void-Extent block. This situation is always the case for the top 1×1 level of any mipmap pyramid, and may be the case for more detailed (lower) levels as well, in case of e.g. checkerboard textures.

The constant-color itself is specified using IEEE-754-2008 compliant FP16 values; this is the way in the format of the present embodiment to specify floating-point content that can hold negative values.

If a Void-Extent extends all the way to the edge of a texture, the filtered texturing result may not necessarily be equal to the texel value specified in the Void-Extent block; this may happen if data sources other than the texture surface itself contributes to the final filtered result. In such cases, the texture mapper must include such data into its filtering process in the same manner as if the Void-Extent were not present. Examples of such data sources are:

Texture border color, when the border color is different from the color specified in the Void-Extent block.

Adjacent-face textures in case of Seamless Cube-Mapping

Neighboring texture repeat in the case of the "Repeat" texture wrap mode

If the texture mapper is keeping a cache of recently-seen Void-Extent blocks, it must guarantee that the presence of this cache does not produce texture filtering results that are different from the result it would have produced without the cache; depending on the specifics of the filtering unit, this may limit caching to Void-Extent blocks with very specific color values (e.g. all components are 0 or 1).

The Void-Extent specified by a Void-Extent block does not need to actually overlap the block itself; such non-overlap is unlikely to be useful, though.

Invalid Void-Extents—that is, a Void-Extent specified across a region of a texture that does not actually have a constant color—will result in undefined texturing results.

2D Textures

For 2D textures, the Void-Extent Block has the following layout:

| Bits | Usage |
| --- | --- |
| 8:0 | "111111100" |
| 9 | Dynamic range flag |
| 11:10 | Reserved, set to "11". |
| 24:12 | Void Extent: Low S coordinate |
| 37:25 | Void Extent: High S coordinate |
| 50:38 | Void Extent: Low T coordinate |
| 63:51 | Void Extent: High T coordinate |
| 79:64 | Block color R component |
| 95:80 | Block color G component |
| 111:96 | Block color B component |
| 127:112 | Block color A component |

The Void Extent is defined by a (low,high) interval for the S and T texture coordinates. The interval endpoints are represented as UNORM13 values; as such, to get normalized coordinates in the [0,1] range, the values stored in the block must be divided by $2^{13}-1$.

The Dynamic Range flag indicates the format in which the block color is stored. A 0 indicates LDR colors, in which case the color components are stored as normalized 16-bit integer values. A 1 indicates HDR color, in which case the color components are stored as FP16 values.

3D Textures

For 3D textures, the Void-Extent Block has the following layout:

| Bits | Usage |
| --- | --- |
| 8:0 | "111111100" |
| 9 | Dynamic range flag |
| 18:10 | Void Extent: Low S coordinate |
| 27:19 | Void Extent: High S coordinate |
| 36:28 | Void Extent: Low T coordinate |
| 45:37 | Void Extent: High T coordinate |
| 54:46 | Void Extent: Low P coordinate |
| 63:55 | Void Extent: High P coordinate |
| 79:64 | Block color R component |
| 95:80 | Block color G component |
| 111:96 | Block color B component |
| 127:112 | Block color A component |

The Void-Extent is defined by a (low,high) interval for the S, T and P texture coordinates. The interval endpoints are represented as UNORM9 values; as such, to get normalized coordinates in the [0,1] range, the values stored in the block must be divided by $2^9-1$.

The Dynamic Range flag indicates the format in which the block color is stored. A 0 indicates LDR colors, in which case the color components are stored as normalized 16-bit integer values. A 1 indicates HDR color, in which case the color components are stored as FP16 values.

Partitioning Pattern Generator

As discussed above, the encoding scheme of the present embodiment uses a partitioning pattern generator (a partitioning pattern generation function) in order to produce its partitioning patterns; this allows a large number of partitioning patterns to be supported at minimal hardware cost. (This comes at a slight quality cost compared to using optimized partition tables, however this cost has been measured to be only about 0.2 dB, which does not justify the large hardware cost of providing a full set of optimized tables.)

The generator itself is specified in the form of a C99 function. The arguments to this function are:

a seed: this is the partition index specified at bits 17:8 in the 128-bit compressed block. This seed may take values from 0 to 1023.

a partition count; this may be 2, 3 or 4.

x, y and z positions; these are x, y and z texel position relative to the upper-left corner of the compressed block (for a 2D block, z is set to zero (0)).

a flag indicating small blocks; its value depends on the block size being used. The value of this flag is chosen to be 1 if the number of texels in the block is less than 31, otherwise it is set to 0.

The function returns an integer value in the range 0 . . . 3 specifying which partition the specified texel belongs to. The actual function is defined as follows:

```
int select_partition( int seed, int x, int y, int z, int partitioncount, int small_block )
{
// first, scale up coordinates for small blocks.
if(small_block) { x <<= 1; y <<= 1; z <<= 1; }
// then, compute eight pseudoranom numbers, all of uniform
// distribution. They need to be at least approximately statistically
// independent, so that they can cover a reasonably wide parameter
// space. the random-seed is modified with the partition-count, so
// that the partitionings we generate for 2, 3 and 4 partitions are
distinct.
seed += (partitioncount-1) * 1024;
// we need reproducibility of the pseudorandom numbers, which calls
```

```
        // for a hash function. The hash52( ) function is designed
specifically to provide
        // a strong pseudorandom distribution at a modest hardware cost.
        uint32_t rnum = hash52(seed);
        // construct the seed values from the hash value. While it is important
        // that the seeds are independent, it is not important that they
have great precision;
        // in fact, no error improvement was seen when using seeds wider
than 4 bits.
        int seed1 = rnum & 0xF;
        int seed2 = (rnum >> 4) & 0xF;
        int seed3 = (rnum >> 8) & 0xF;
        int seed4 = (rnum >> 12) & 0xF;
        int seed5 = (rnum >> 16) & 0xF;
        int seed6 = (rnum >> 20) & 0xF;
        int seed7 = (rnum >> 24) & 0xF;
        int seed8 = (rnum >> 28) & 0xF;
        int seed9 = (rnum >> 18) & 0xF;
        int seed10 = (rnum >> 22) & 0xF;
        int seed11 = (rnum >> 26) & 0xF;
        int seed12 = ((rnum >> 30) | (rnum << 2)) & 0xF;
        // square the seeds. This biases them, so that they are more likely to
        // take small rather than large values. The seed values represent
        // frequencies for a 2D sawtooth function; squaring them causes
        // low frequencies to be more heavily represented than high
        // freqeuncies. For the partition function, this causes partitionings
        // with low frequencies (large, cleanly-divided regions) to appear
        // more frequently than partitionings with high frequencies (lots of
        // detail), while not entirely blocking the latter.
        seed1 *= seed1;
        seed2 *= seed2;
        seed3 *= seed3;
        seed4 *= seed4;
        seed5 *= seed5;
        seed6 *= seed6;
        seed7 *= seed7;
        seed8 *= seed8;
        seed9 *= seed9;
        seed10 *= seed10;
        seed11 *= seed11;
        seed12 *= seed12;
        // perform shifting of the seed values
        // this causes the sawtooth functions to get increased high-frequency
content along either
        // the X axis or the Y axis or neither; the result is an increase in the
amount of
        // partitionings that are dominated by horizontal/vertical stripes;
        // these are relatively important for overall psnr.
        int sh1, sh2, sh3;
        // use the bottom bit of the seed to toggle horiz/vert direction.
        if( seed & 1 )
        {
            sh1 = (seed & 2 ? 4 : 5);
            sh2 = (partitioncount == 3 ? 6 : 5);
        }
        else
        {
            sh1 = (partitioncount == 3 ? 6 : 5);
            sh2 = (seed & 2 ? 4 : 5);
        }
        sh3 = (seed & 0x10) ? sh1 : sh2;
        seed1 >>= sh1;
        seed2 >>= sh2;
        seed3 >>= sh1;
        seed4 >>= sh2;
        seed5 >>= sh1;
        seed6 >>= sh2;
        seed7 >>= sh1;
        seed8 >>= sh2;
        seed9 >>= sh3;
        seed10 >>= sh3;
        seed11 >>= sh3;
        seed12 >>= sh3;
        // combine the seed values with the XYZ coordinates to produce 3D
planar functions
        // Each of them also has an offset added; this offset itself needs to be
pseudorandom
        // and unbiased for optimal quality. Unlike the seeds themselves, this
offset
        // needs to have a uniform distribution.
        int a = seed1*x + seed2*y + seed11*z + (rnum >> 14);
        int b = seed3*x + seed4*y + seed12*z + (rnum >> 10);
        int c = seed5*x + seed6*y + seed9*z + (rnum >> 6);
        int d = seed7*x + seed8*y + seed10*z + (rnum >> 2);
        // bitwise "AND" with a mask turns planar functions into sawtooth
functions.
        a &= 0x3F;
        b &= 0x3F;
        c &= 0x3F;
        d &= 0x3F;
        // remove some of the functions if we are using less than 4 partitions.
        if( partitioncount < 4 ) d = 0;
        if( partitioncount < 3 ) c = 0;
        // then, compare the resulting sawtooth-function values in order to
        // select a partition.
        if( a >= b && a >= c && a >= d )
            return 0;
        else if( b >= c && b >= d )
            return 1;
        else if( c >= d )
            return 2;
        else
            return 3;
    }
```

The generator relies on an auxiliary function called hash52( ) this function itself is defined as follows:

```
        // autogenerated hash function. This hash function was produced by
generating
        // random instruction sequences (from the set: add-shift, xor-shift,
multiply-by-odd-constant;
        // these operations have in common that they are all invertible
and therefore cannot lose data)
        // and then checking whether the instruction sequence, when fed the
input data sequence
        // 0,1,2,3, ... produces a good pseudorandom output data sequence.
The randomness tests run
        // were George Marsaglia's "Some Difficult-to-pass Tests Of
        // Randomness". Several hundred sunch instruction sequences were
generated; "hash52" below was the
        // one that appeared to have the most compact hardware
        // representation. the multiply-by-odd-constant steps had their
constants specifically selected so that they
        // could be implemented with three shift-add operations, which are
much cheaper in hardware
        // than general multiplications.
        uint32_t hash52( uint32_t p )
        {
            p ^= p >> 15;
            p *= 0xEEDE0891; // (2^4+1)*(2^7+1)*(2^17-1)
            p ^= p >> 5;
            p += p << 16;
            p ^= p >> 7;
            p ^= p >> 3;
            p ^= p << 6;
            p ^= p >> 17;
            return p;
        }
```

Note that the arithmetic in hash52( ) must be implemented using unsigned integers that are exactly 32 bits wide. Also note that the multiply may be implemented as a series of three addition/subtraction operations.

The above partition generation function basically works by implementing 2 to 4 sawtooth functions with pseudorandomly-selected directions and frequencies; this is particularly cheap to implement in hardware while being able to produce nearly all partition shapes of interest.

The seed (partition index) is used to generate the parameters for the sawtooth wave generation. As each different seed gives a different combination of waves, it can be thought of as a "pattern index". (The seed is accordingly, effectively equivalent to the index into the pattern table in a lookup-table based design.)

A mask is used to generate the sawtooth function. It effectively changes a continuously increasing set of values (e.g. 0,16,32,48,64,80,96,112,128,144,160 . . . ) into a repeating set. A mask of 0x3F applied to the previous sequence would give a sawtooth of (0,16,32,48,0,16,32,48,0,16,32,48,0, 16,32 . . . ). This is equivalent to the remainder when dividing by 64, but only works when the divisor is a power of two. It is also very much cheaper to implement in hardware than a division circuit.

Other arrangements for determining the partitioning patterns could be used, if desired. For example, the function could be configured to generate curved partitioning shapes. For example, $x^2$ and $yA2$ terms could be added into the sawtooth functions. This will yield partitionings with curved shapes (which the "basic" version of the sawtooth function is unable to provide). However, testing with actual content did not actually show any image quality improvement from these shapes. This kind of curve support will also increase the hardware cost.

It would also be possible to use a ROM-based partition table, where the table is, e.g., generated through an optimization process against large amounts of game content. However, storing actual tables would consume large numbers of gates, which would also get multiplied by the number of different block sizes supported and could thereby hamper the scalability of the format.

Figure 12:
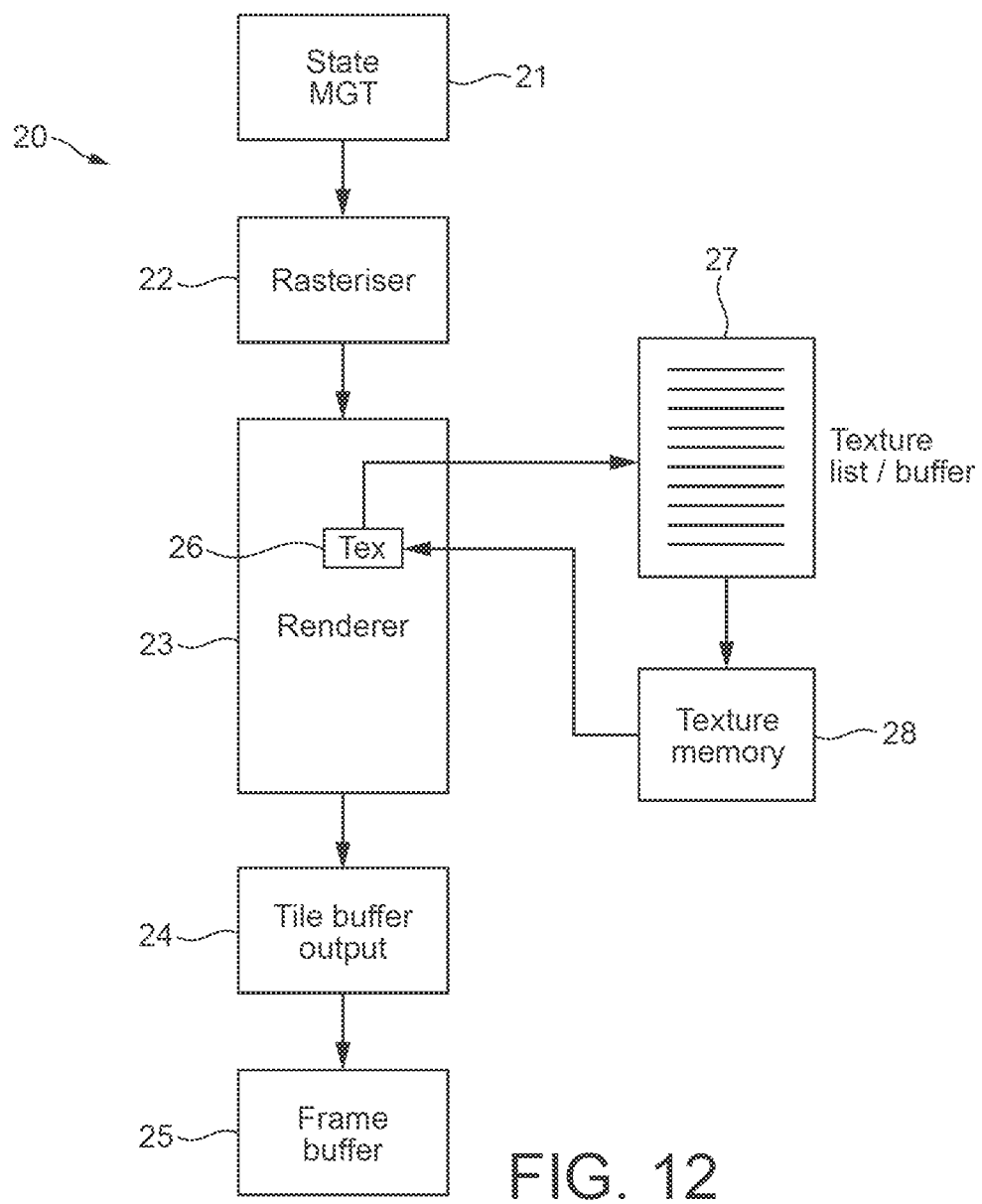
FIG. 12 shows schematically a graphics processing system that can use texture data that has been encoded in the manner of the described embodiment of the technology described herein.

FIG. 12 shows schematically an arrangement of a graphics processing system 20 that can use textures that have been encoded in accordance with the present embodiment. In this embodiment, the graphics processing system 20 is a tile-based rendering system. However, other arrangements are, of course, possible.

As shown in FIG. 12, the graphics processing system 20 includes a state management system 21, a rasterising stage 22, and a rendering stage 23 in the form of a rendering pipeline. It will be appreciated that each of the stages, elements, and units, etc., of the graphics processor 20 as shown in FIG. 12 may be implemented as desired and will accordingly comprise, e.g., appropriate circuitry, and/or processing logic, etc., for performing the necessary operation and functions.

The state management system 21 stores and controls state data and the state of the graphics processing units to control the graphics processing operation, as is known in the art.

The rasteriser 22 takes as its input primitives to be displayed, and rasterises those primitives to sampling positions and generates fragments to be rendered, as is known in the art.

The rendering pipeline 23 takes fragments from the rasteriser 22 and renders those fragments for display. As is known in the art, the rendering pipeline 23 will include a number of different processing units, such as fragment shaders, blenders, texture mappers, etc.

The output from the rendering pipeline 23 (the rendered fragments) is output to tile buffers 24 (since the present embodiment is a tile-based system). The tile buffers' outputs are then finally output to a frame buffer 25 for display.

FIG. 12 also shows schematically particular features of the graphics processing system 20 that are provided in order for it to use textures encoded in the manner of the present embodiment.

In particular, as shown in FIG. 12, the rendering pipeline 23 includes a texture mapping stage 26 configured to be able to access a texture list buffer 27 to determine a texture needed for texturing a fragment that it receives for rendering.

The texture list buffer 27 will indicate the texture that is required, and then, as is known in the art, the texture mapper 26 will fetch the relevant texture data from a memory 28 and used the fetched texture data to process the fragment in question.

The textures stored in the texture memory 28 are stored using the encoding format of the present embodiment. Thus, when the texture mapper 26 needs a given texel or texels for applying to a fragment being rendered, it will determine the texture map and encoded block within that map that it needs for the texel in question (e.g. based on the position of the texel, as is known in the art), retrieve that block from the memory 28 and then determine the texel's value (e.g. colours) from the encoded block in the manner described above.

The texture mapper 26 includes a suitable decoder (decoding circuitry) to do this. This decoder may, e.g., be in the form of a dedicated hardware element that is configured to decode textures encoded in the form of the present embodiment, or it may, e.g., comprise programmable processing circuitry that has been programmed appropriately to be able to decode textures encoded in the form of the present embodiment. In an embodiment a dedicated hardware decoder is used.

In the present embodiment, the decoding process comprises first determining whether the position of a texture data element to be decoded is within a previously encountered and stored constant data value region (void extent). If it is, the stored corresponding constant data value for the constant data value region (void extent) in question is then returned as the data value to use for the texture data element immediately (i.e. without accessing and decoding any encoded texture data block).

On the other hand, if the position of a texture data element to be decoded is not within a previously encountered and stored constant data value region (void extent), then it is determined which encoded texture data block in the set of encoded texture data blocks representing the texture map to be decoded represents (contains) the texel whose value is required (i.e. that is to be decoded). This is done based on the position of the texel and knowledge of the block size and size of the texture. The identified encoded texture data block is then accessed (e.g. fetched) from memory.

It is then determined whether the encoded block is a Void Extent block (i.e. indicates a constant data value region) or not, by determining whether the block contains the void extent flag (and also that the block is not simply a "constant colour" block).

If the block is a Void Extent block, the decoder determines the constant data value indicated in the Void Extent block and uses that value as the data value for the texel in question.

The decoder also determines from the encoded Void Extent block the extent of the constant data value region specified by the block, and stores that information together with the constant data value for the region (void extent) in question for future use. This information is stored for the most recent Void Extent blocks that the decoder has accessed, on a first-in, first out basis. Other arrangements would, of course, be possible.

The decoding process in an embodiment also comprises, where the encoded texture data block to be decoded is indicated (flagged) as being a Void Extent block, then determining from the information in the block indicating the extent of the constant data value region whether the block is a true "Void Extent" block, or whether it is in fact only a "constant colour" block. In the latter case, it is in an embodiment also determined whether the constant data value applies to more detailed mipmaps or not. If the block is a "constant colour"

block, the decoder determines the constant data value indicated in the block and uses that value as the data value for the texel in question.

Where the encoded texture data block is not a Void Extent or a "constant colour" block (i.e. is a "normal" block), the decoder determines the value for the texel from the encoded block of texture data as follows:

1. Find the x,y,z position of the texel to be decoded, relative to the corner of the block (for 2D blocks, z=0).

2. If there is more than one partition, pass the x,y,z position and the seed (partition index) through the partition generation function to determine the partition number for the texel.

3. Read and decode the endpoint values for the partition selected in step 2.

This process depends on the colour endpoint mode.

4. Read and decode the index for the texel. Where to find the index data, and how to decode it, is determined by the index range, index count, and number of index planes.

5. Interpolate between the endpoint colors using the index value, as specified above.

6. If there are two index planes, repeat steps 4-5 for the second index, and combine the color components from the separate planes (e.g. RGB from one, A from another into a single RGBA value).

7. The final color is the decoded texel color.

Thus, in the present embodiment, the decoding process for a given texel whose value is required will comprise the following steps:

Determine the position of the texel being looked up
If it is inside a cached void-extent
    return the constant colour value for that extent immediately
else
    calculate which block the texel is in
    load the block
    if the block is a constant-colour block
        return the constant colour value
        if its a void extent block
            cache the void extend bounds and the colour
        if its not a constant-colour block
            decode as normal This is repeated for each texel value that is required, and the so-generated, decoded texel values are then applied to sampling positions (fragments) that are being rendered to generate rendered data for those sampling positions (fragments), which rendered data is then, e.g., written to the frame buffer for a display to display the "textured" sampling positions and/or fragments.

As discussed above, the decoder (the texture mapping process) is also configured, in response to recognition of a "constant data value" region indicating Void Extent block to: not perform (avoid) subsequent passes in a multi-pass texture mapping process once such a block has been identified; not sample (avoid sampling) more detailed mipmaps in a multi-pass mip-mapping process once such a constant data value region indicating block has been identified; cache recently loaded/processed constant data value region indicating (Void Extent) blocks and use them to suppress (texture) cache filling from memory for subsequent decoding (texturing) operations; and/or not load (avoid loading) adjacent encoded texture data blocks, where a constant data value region indicating (Void Extent) block has been recognised.

As will be appreciated from the above, in the decoding arrangements, the actual data values (e.g. in terms of their format and what they represent) that are generated for the set of data values to be used for a texture data block and for the individual texture data elements will depend on the nature of the texture data that is being encoded. Thus, for example, as discussed above, in the case of colour data and colour maps, each data value will represent a given colour, and, e.g., comprise a set of colour values, such as RGB or RGBa values. On the other hand, for a luminance map, each data value may comprise and represent a single luminance value. For normal-maps (bump maps), each data value will comprise a set of components representing a normal vector, and for shadow maps (light maps), each data value will comprise and represent a set of values indicating, e.g., the presence or absence, and amount of, light or shadow, and so on.

The above primarily describes the decoding process used in the embodiment of the technology described herein. As will be appreciated by those skilled in the art, the encoding process will be carried out in a corresponding converse manner.

Thus, to encode a given texture map using the above encoding format in the present embodiment, the original texture map is first divided into blocks of a selected size.

Each block of texture data elements is then tested to see whether the set of texture data elements of the block can be encoded as having the same, constant data value. This is done by determining whether all the texture data elements of the block have sufficiently similar data values to be encoded as a constant data value block (based, e.g., and in an embodiment, on some selected, in an embodiment predetermined, similarity margin or threshold)

Where it is determined that the texture data elements of a block of texture data elements to be encoded all have sufficiently similar data values, then the extent of a contiguous extended region within the texture including the block in which every texture data element has sufficiently similar data values is determined. This is done by attempting to extend a rectangular (for 2D) or rectangular cuboid (for 3D) region outwards from the edge of the block of texture data elements in question (while still only including texture data elements having sufficiently similar data (e.g. colour) values). Any suitable process, e.g. algorithm, can be used for this.

It should be noted here that the constant data value region does not need to align with the boundaries of the blocks the original texture has been divided into for encoding purposes, but can only partially cover or overlap blocks that the original texture has been divided into.

If an extended "constant data value" region is found, then the block of texture data elements in question is encoded as a Void Extent block, having the form discussed above.

The constant data value for an encoded Void Extent block may be selected as desired, based on the value of the texture data elements in the original texture in the region of the texture in question. For example, an average of the values of the texture data elements of the block (or void extent region) could be used as the constant data value for the encoded Void Extent texture data block. Other arrangements would, of course, be possible.

It should be noted here that where a given block of texture data elements is found to fall within a constant data value region in the texture (and is encoded as such), that does not mean that other, e.g. adjacent, blocks of texture data elements that also fall within the same constant data value region do not need to be encoded. Rather, every separate block of texture data elements that falls within the same constant data value region (void extent) is still encoded as a respective separate encoded Void Extent texture data block specifying that region. This facilitates random access into the encoded texture.

The encoding process may also comprise identifying blocks of texture data elements as being constant data value blocks but which do not also specify a greater constant data value region (as discussed above), if desired. These blocks of texture data elements should then be encoded as "constant colour" blocks having the form discussed above.

Where it is determined that the set of texture data elements of a block of texture data elements don't all have sufficiently similar data values, then a "non-void extent" encoded texture data block representing the block of texture data elements having the form discussed above is generated.

The encoding process for a "non-constant data value" block can be carried out in any suitable manner on or using the original texture data that is to be encoded. For example, as in known prior art processes, the original data for the block could be encoded using some or all of the various different encoding and partitioning possibilities that are available (i.e. that, in effect, a "non-constant data value" encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block when it is encoded).

This is done for each different block that the original data (e.g. texture map) has been divided into. The process may then be repeated using a different block size, and so on, if desired, until the block size and encoding arrangements giving the least error (or at least a sufficiently small error) is found, which may then be selected as the encoding arrangement to use for the texture.

The original texture may then be encoded using the determined block size and the encoding arrangement determined for each block (or the already encoded blocks from the testing used, if they have been retained), to produce a stream or set of encoded texture data blocks representing, and corresponding to, the original set of data (e.g. texture map). This set of encoded texture data blocks can then be stored, e.g. on a portable storage device such as a DVD, for later use, e.g. when it is desired to apply the texture to an image to be rendered.

In an embodiment a set of mipmaps is generated to represent the texture, with each mipmap in an embodiment being generated in the above manner. Where mipmaps are used, the compression rate (and bit rate) is in an embodiment varied for (is different for) different mipmap levels, with higher bit rates (i.e. lower levels of data compression) being used for smaller mipmap levels (i.e. lower resolution mipmap levels).

Each block that the original data (e.g. texture map) is divided into is in an embodiment the same size and configuration. The block size that is being used is provided to the decoder. This may be done, for example, by including (indicating) the block size in a (global) data header that is associated with (attached to) the set of encoded texture data blocks, or in any other suitable manner.

The selection algorithm can use any desired (and many different) testing schemes such as, for example, measuring the peak signal-to-noise ratio between the encoded version of a block and the original version of the block.

The encoding can be carried out as desired, e.g. using a suitably programmed general-purpose processor that, e.g., has access to the original texture data in memory, or a suitable dedicated processor could be used.

Although the above embodiment has been described with reference to texture data in the form of colours, as discussed above, and as will be appreciated by those skilled in the art, the technology described herein is also applicable to other forms of texture data, such as luminance-maps or bump-maps, etc., and to other, non-texture data. In such arrangements the data can be encoded or decoded in an advantageous manner, but each data value will, e.g., represent a luminance value or normal vector, etc., rather than a colour.

Similarly, although the present embodiment has been described primarily with reference to the encoding of square or cubical blocks of texels, other texel block arrangements and configurations, such as the encoding of non-square rectangular blocks of texels and non-cubical rectangular cuboid blocks of texels would be possible, if desired.

FIGS. 3 to 11 illustrate the basic encoded block layouts that the format of the present embodiment will produce. Each encoded block comprises, as discussed above, 128-bits.

Figure 3:
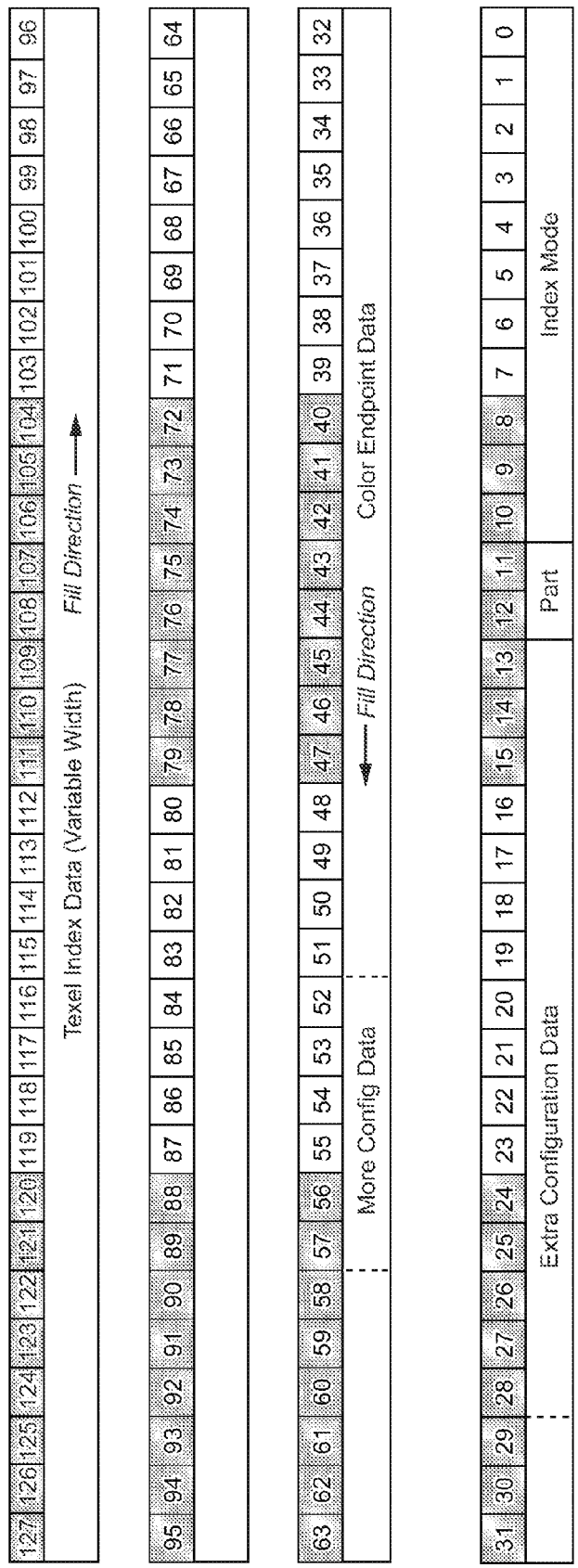

FIG. 3 shows an overview of the basic block layout. Thus it shows the index mode data in bits 0-10, the "partition count-1" data in bits 11-12, and the filling of the remaining space with any necessary extra configuration data, and the respective endpoint colour data and texel index data (which are both of variable width).

Figure 4:
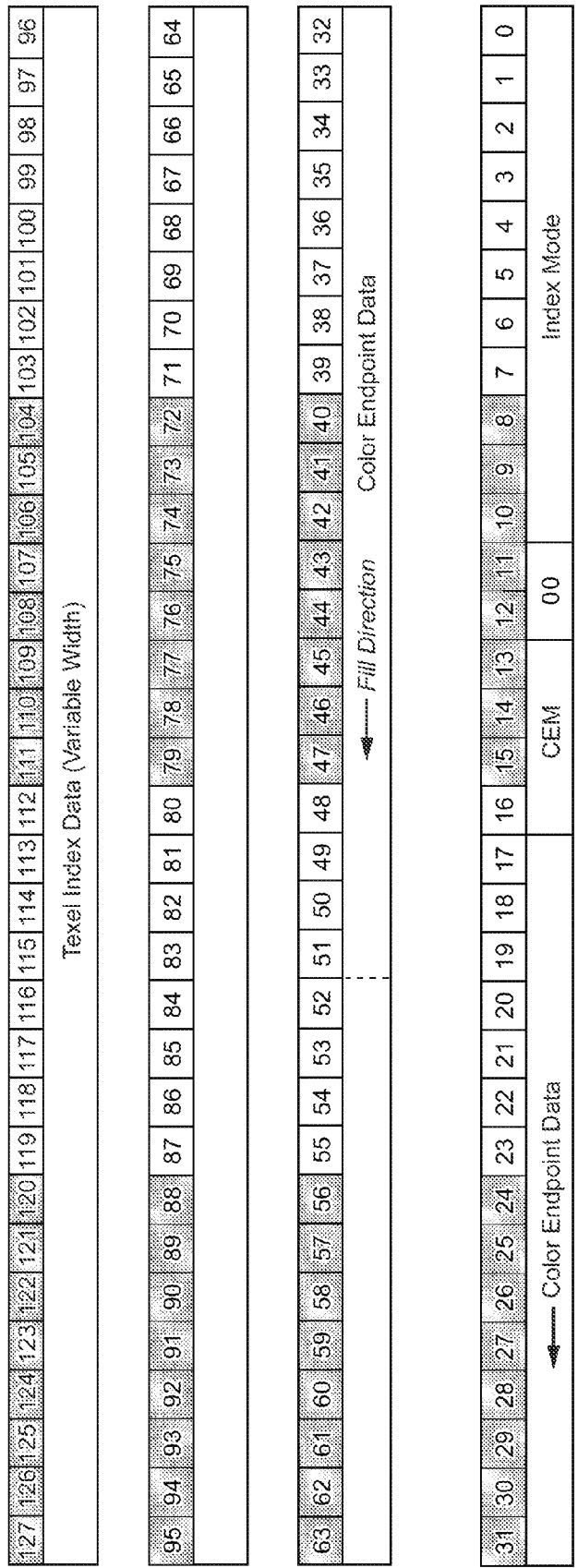

FIG. 4 shows the layout for a non-partitioned block. Thus in this case, the "partition-count-1" data in bits 11-12 is set to "00" and the colour endpoint mode data (shown as CEM in FIG. 4) is placed in bits 13-16.

Figure 5:
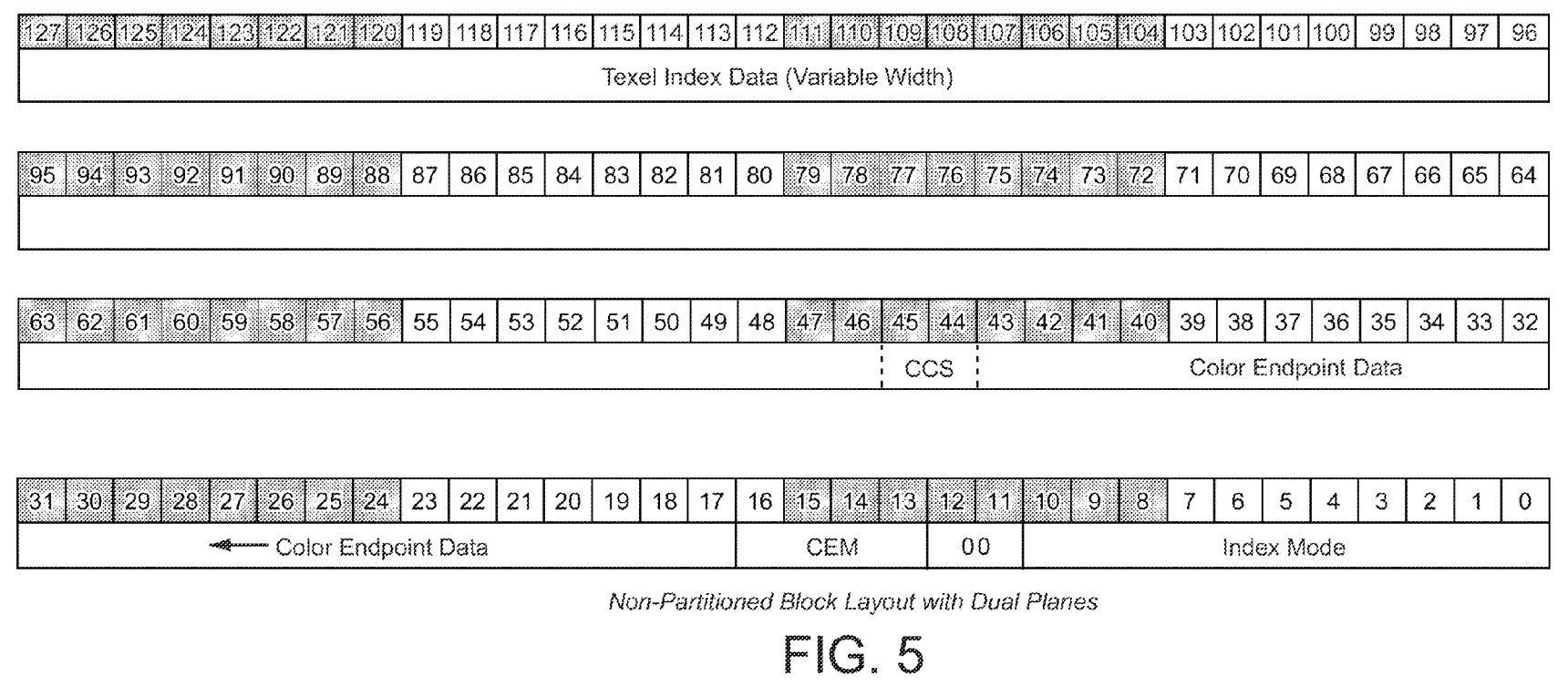

FIG. 5 shows the layout for a non-partitioned block but which uses two index planes. In this case, as shown in FIG. 5, two bits are used to act as the colour component selector (CCS) for the second index plane. These bits appear immediately below the texel index data (which is variable width, as discussed above).

Figure 6:
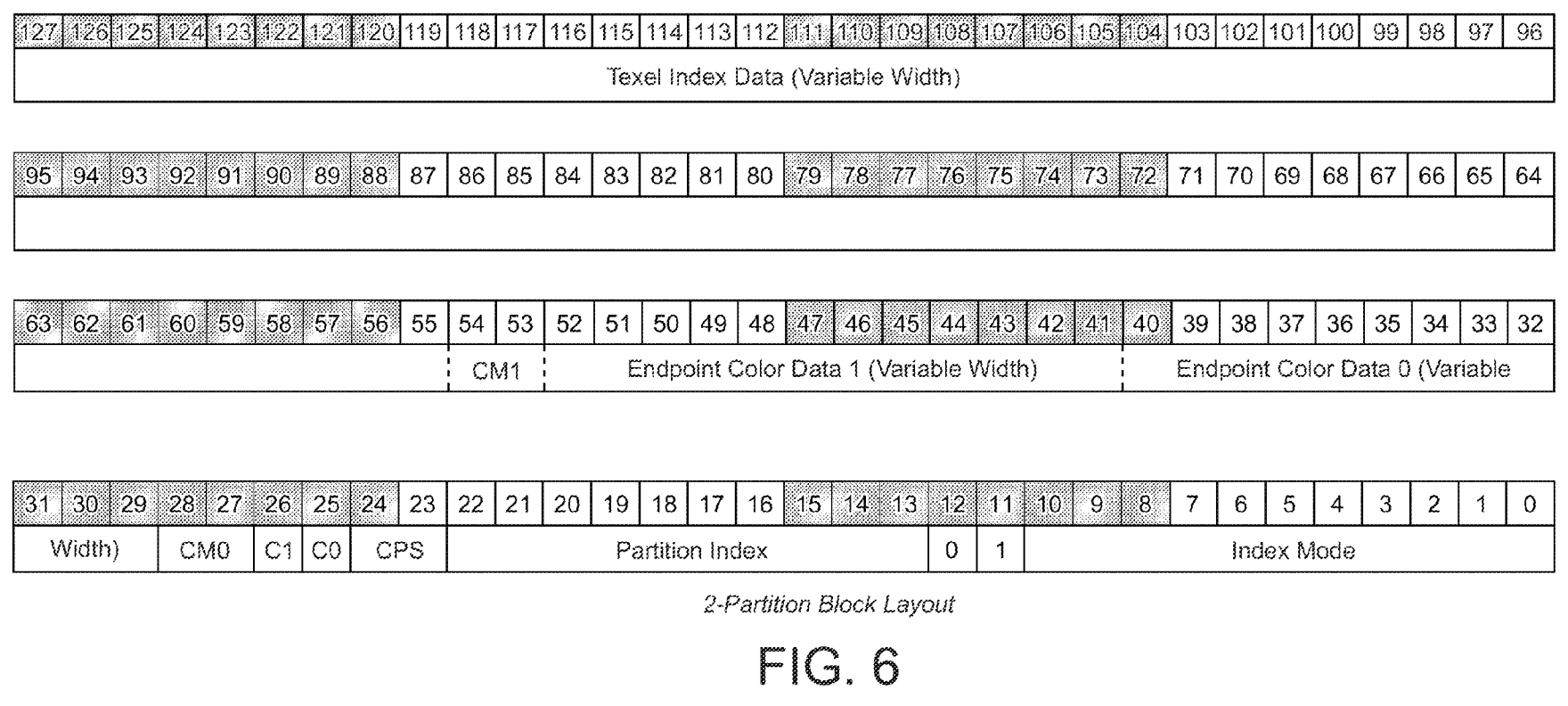

FIG. 6 shows the layout for a block encoding a block of texels (texture data elements) that has been divided into two partitions. In this case, the encoded block includes, as shown in FIG. 6, the "partition count-1" "01" (as there are two partitions) in bits 11-12, and the partition index (seed) for the partitioning pattern generation function in bits 13-22.

The encoded block also includes, as shown in FIG. 6, the colour endpoint mode pair selector (CPS) value in bits 23-24, and colour endpoint mode indicators (information) for each of the two partitions. The colour endpoint mode information comprises a respective colour endpoint class bit Cn and 2-bit colour endpoint mode field CMn for each partition n, and is arranged such that all the colour class bits for all the partitions are emitted first (in partition order), followed by the colour mode fields for each partition (in order). If this all requires more than 6 bits, then the additional bits are stored just below the texel index bits (which will be a variable position, as discussed above). It can be more efficient for a hardware decoder for the colour class bits to be at fixed positions in the encoded block.

Thus, as shown in FIG. 6, in the case of a two partition block, the colour endpoint mode pair selector (CPS) value is placed in bits 23-24, the respective colour class bits, C0, C1, for each partition (the first partition, partition 0, and the second partition, partition 1, respectively) are first placed in bits 25-26 (i.e. after the colour endpoint mode pair selector bits), and the 2-bit colour endpoint mode fields then follow (in partition order), up to the limit of 6-bits, with any remaining bits then being placed just below the texel index data. Thus, the colour endpoint mode indicator for the first partition (partition 0) is placed in bits 27-28 (CM0), and the colour endpoint mode for the second partition (partition 1) is placed in bits 53-54 (CM1). As shown, the additional bits required for the colour endpoint mode for the second partition (CM1) appear immediately below the texel index data. The block also includes appropriate sets of colour endpoint data for the two different partitions (endpoint colour data 0 and endpoint colour data 1, respectively).

Figure 7:
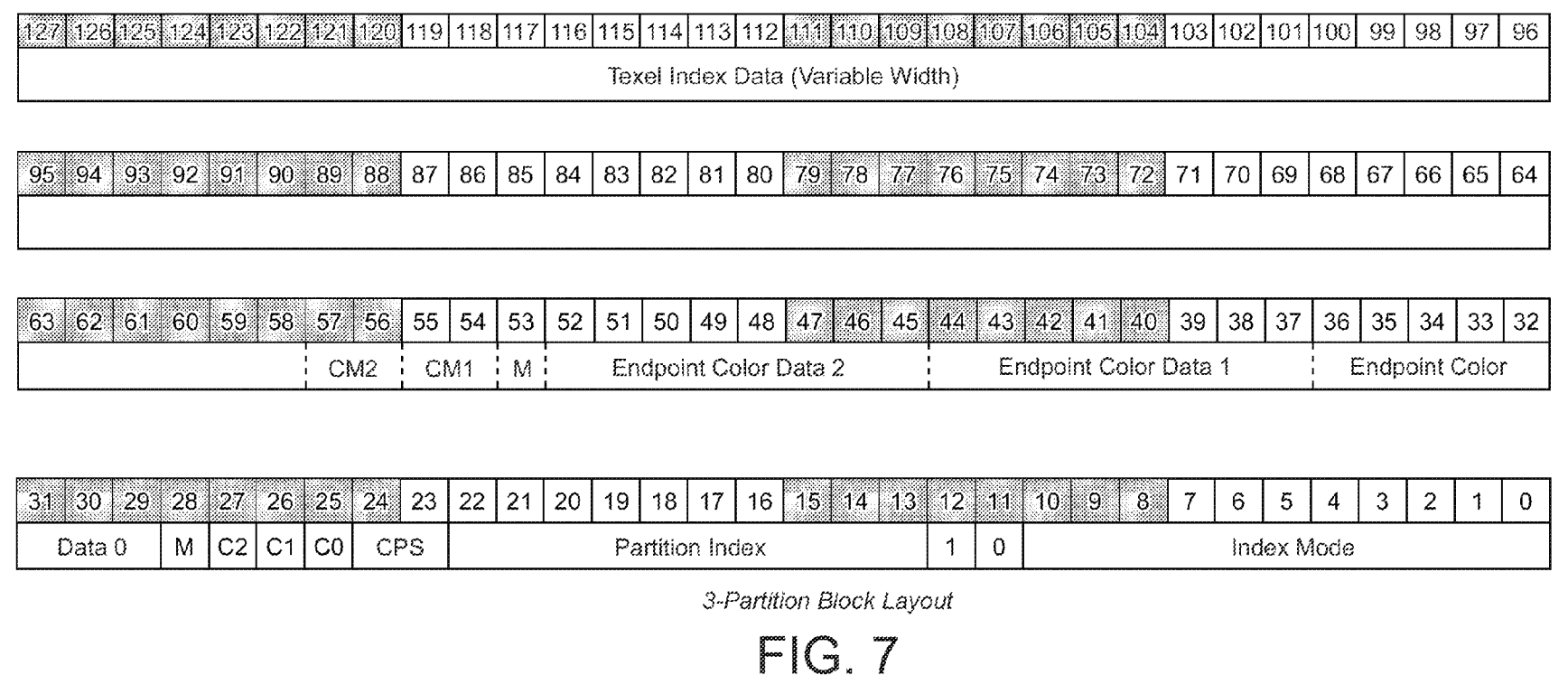

FIG. 7 shows the layout for a block that encodes a block of texture data elements that has been divided into three partitions. In this case, as shown in FIG. 7, there are three sets of colour endpoint class and mode data (C0, C1, C2, M (CM0), CM1 and CM2), one for each partition, arranged as discussed above in relation to FIG. 6, together with corresponding sets of endpoint colour data (endpoint colour data 0, endpoint colour data 1 and endpoint colour data 2), one for each partition. In this case the two bits of CM0 (denoted by "M" in FIG. 7) are, as shown in FIG. 7, split between bit 28 and a variable position immediately below CM1. Also, as shown in FIG. 7, the "partition count-1" bits 11-12 are set accordingly to "10" to indicate that this is a three-partition block.

Figure 8:
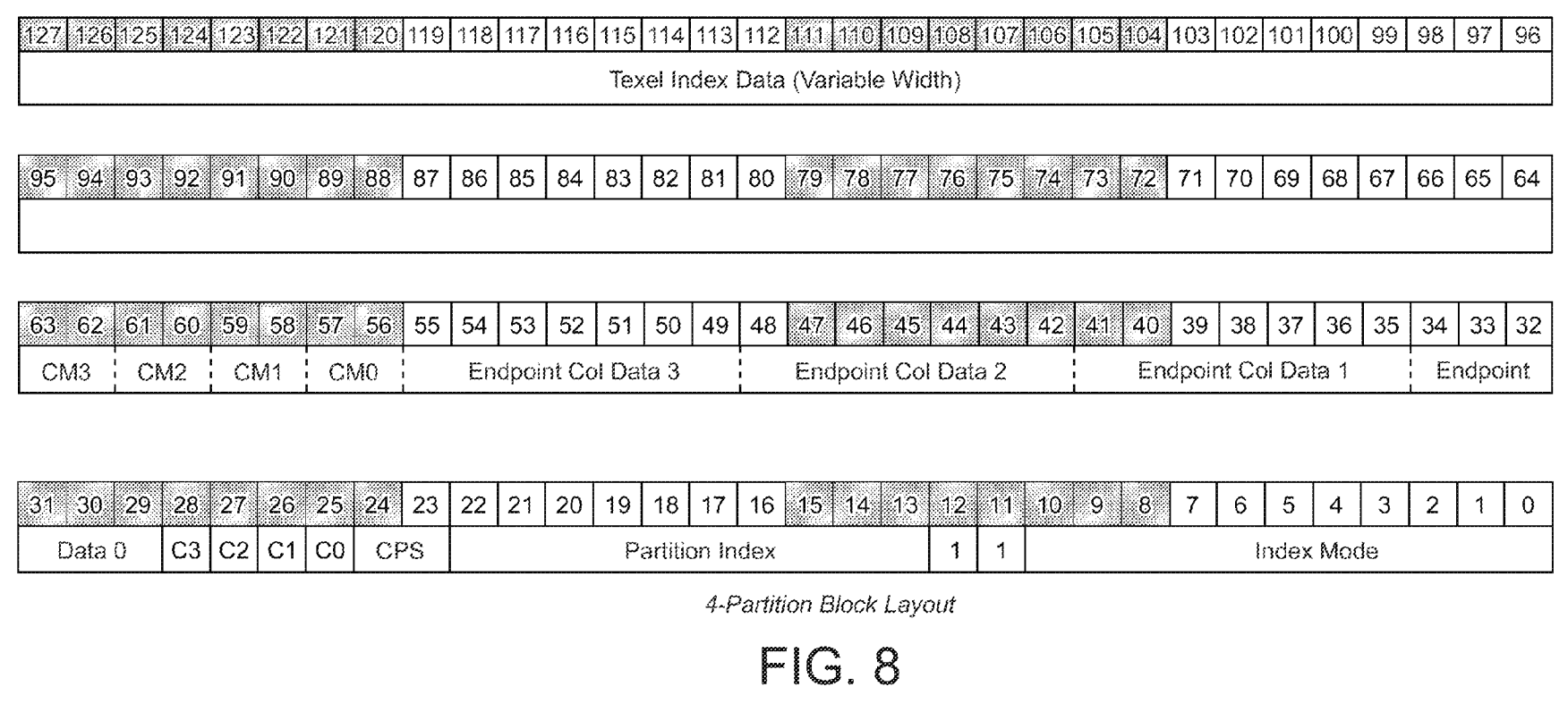

FIG. 8 shows the layout for a block that encodes a set of texture data elements that have been divided into four partitions. In this case, there is accordingly four sets of colour endpoint class and mode data and four sets of corresponding endpoint colour data, one for each partition. Also, as shown in FIG. 8, the "partition count-1" bits 11-12 are set accordingly to "11" to indicate that this is a four-partition block.

Figure 9:
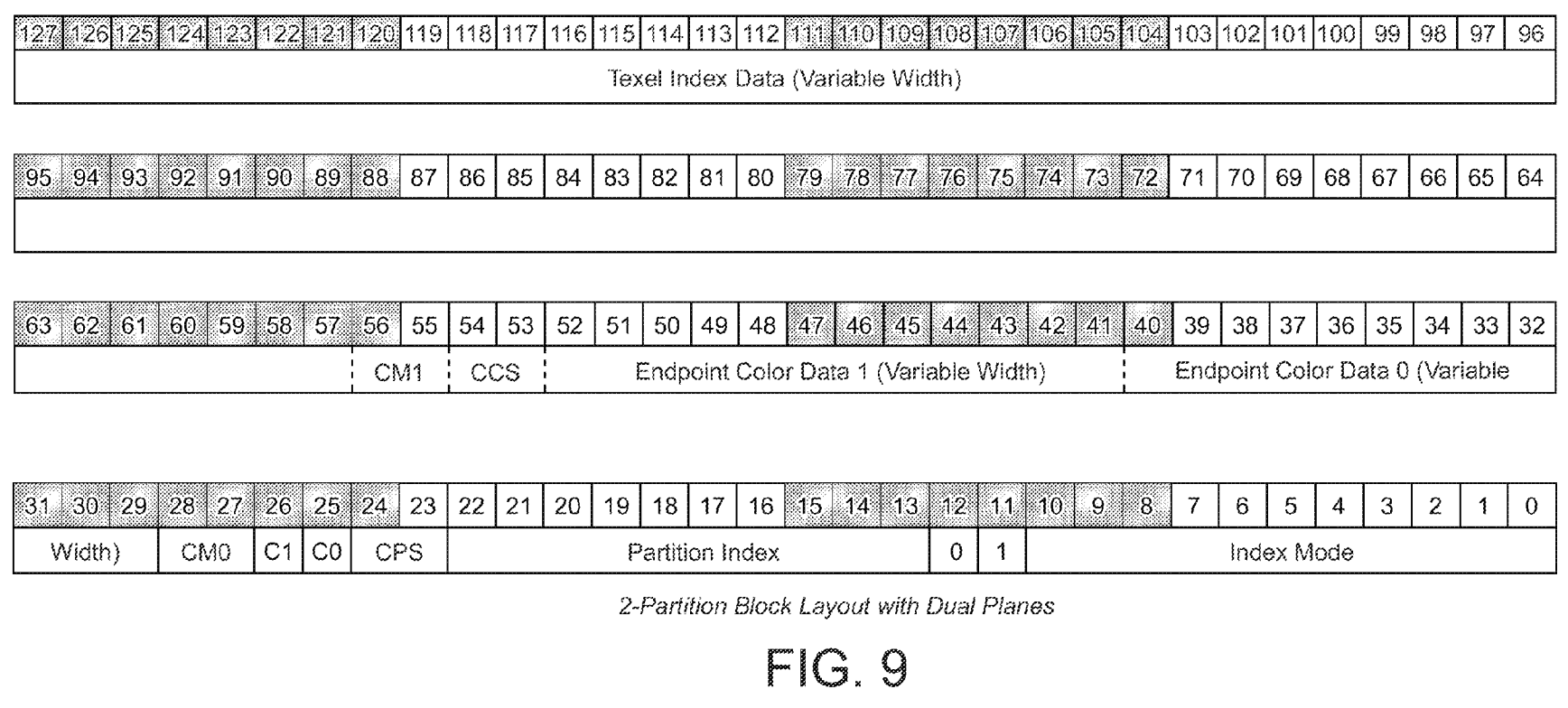

FIG. 9 shows the layout for a block that encodes a set of texture data elements that have been divided into two partitions and that also uses two index planes. In this case, as shown in FIG. 9, the block includes a colour component selector (CCS) field for the second index plane. In this case, this colour component selector appears directly below the additional colour endpoint mode bits (CM1) for the second partition, which are in turn directly below the texel index data bits. (The same layout rule (scheme) applies to three and four partition blocks with dual index planes.)

Figure 10:
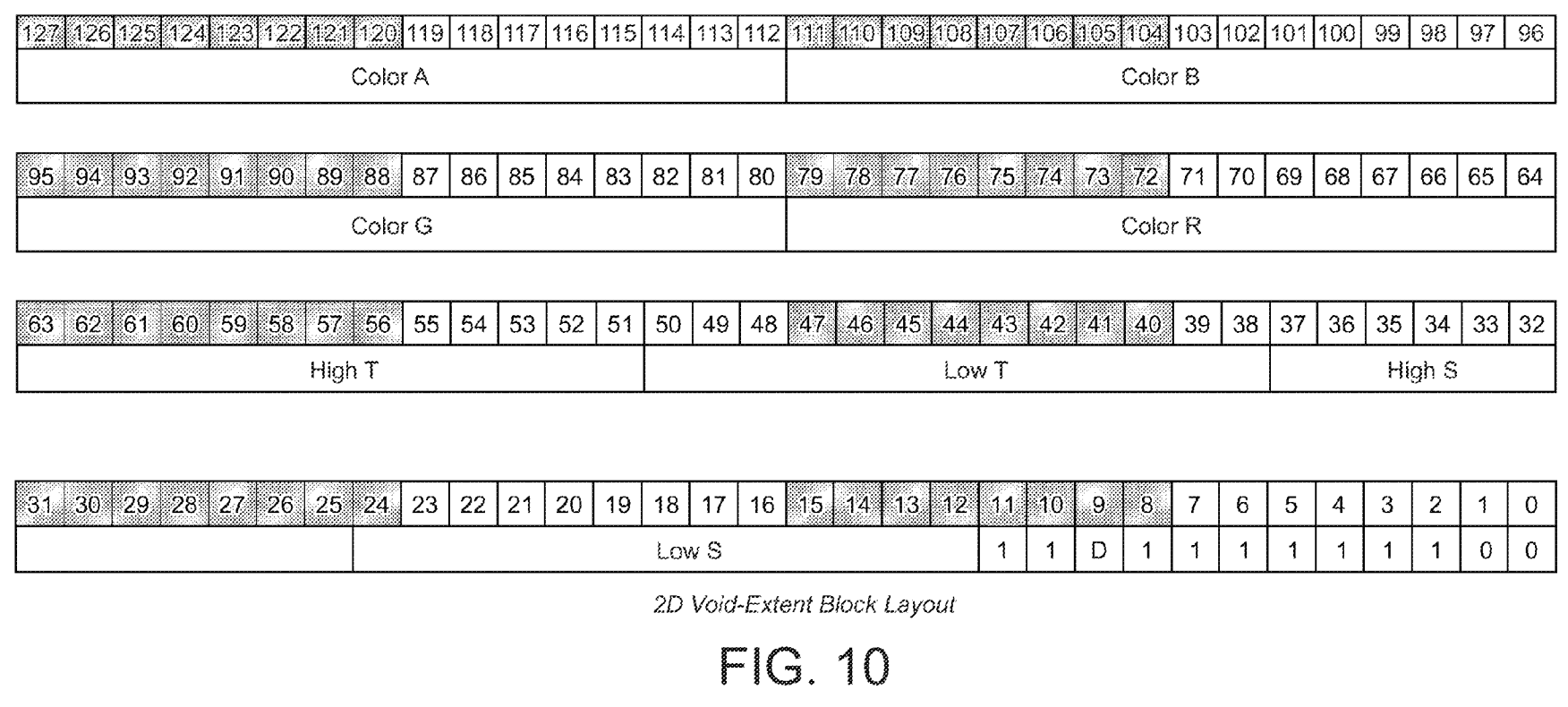

FIG. 10 shows the layout for a 2D void-extent block (i.e. a block indicating a constant colour value). Thus, as shown, bits 0 to 8 of the block are set to indicate that the block is a void-extent block.

As shown in FIG. 10, the void-extent block includes data indicating the constant colour for the block, and the extent over which that colour extends, in terms of low and high S and T values.

Figure 11:
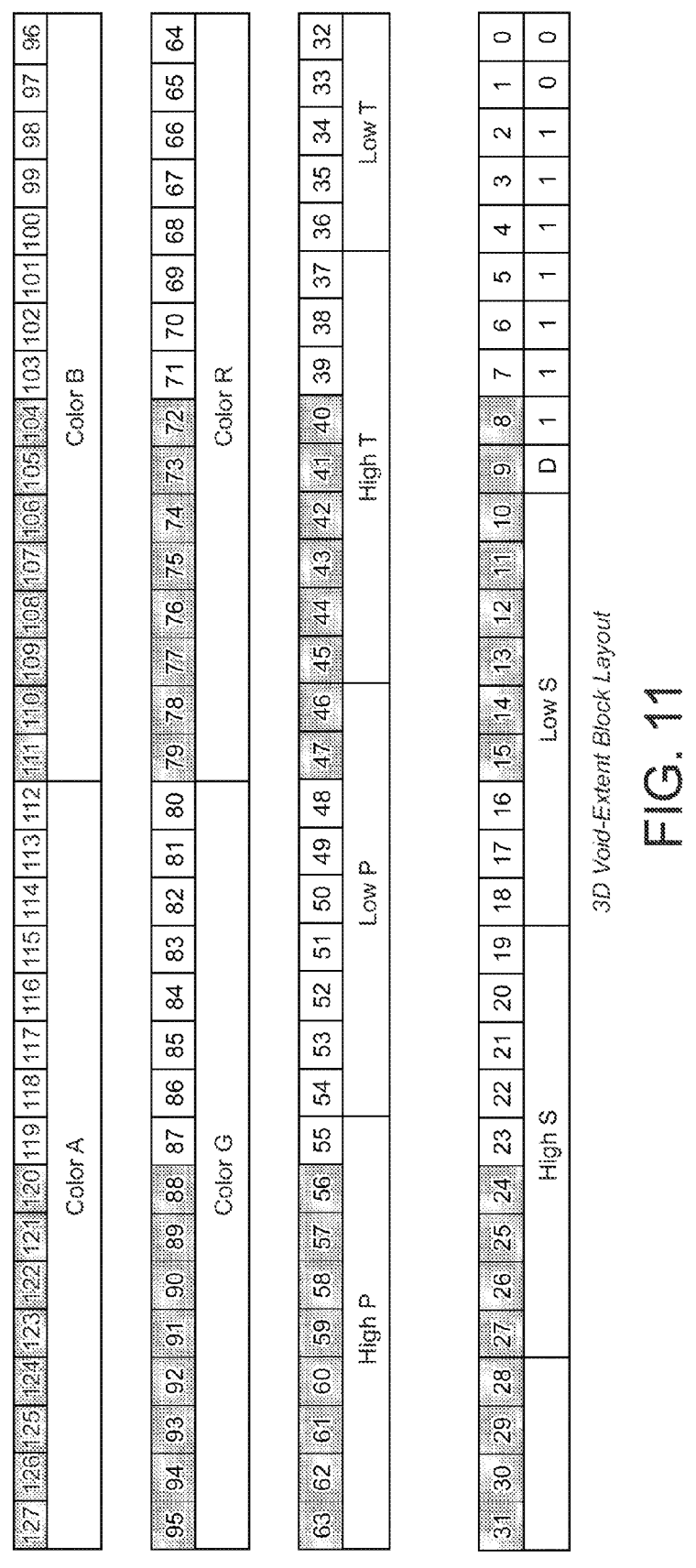

FIG. 11 shows the layout for a 3D void-extent block. This layout essentially corresponds to the 2D void-extent block layout shown in FIG. 10, but includes a further extent component P (as the encoded block represents a 3D block of texture data elements).

The ability to use different indexing schemes, data generation schemes, partitioning arrangements, etc., using a common encoding format in the present embodiment, provides the ability to provide different levels of compression (i.e. to vary the bit rate (the number of bits used per texture data element)) that is being used for a given encoded texture data block. For example, by varying the block size being used, the indexing scheme, data generation scheme, and/or partitioning arrangement, etc., different levels of relative compression can be provided for a given block encoding arrangement and/or for a given texture map or maps, for example.

As will be appreciated from the above, the technology described herein, in its embodiments at least, includes a number of new and particularly advantageous features.

The encodings used for the trit-block and the quint-block and the method used to interleave bits of trit/quint blocks with low-order bits (thereby providing tight bounds on the bit-counts of the Integer Sequence Encoding), provides enhanced efficiency.

The unquantization method for the color endpoints can take their values from 0 ... N to 0 ... 255 with rounding errors no greater than 1 ulp, without using any multipliers.

The technology described herein, in its embodiments at least, provides and facilitates fine-grain adjustable resolution of both per-texel indexes and color-components. The resolution can be adjusted in steps that correspond to approximately ⅓ bits; this fine-grained adjustment enables the format to trade off bits between indexes and color endpoints on a per-block basis (e.g. in regions with smooth colors, one would allocate large numbers of bits to the endpoints and comparatively few to the indexes; in regions with large amounts of detail, one would instead spend comparatively fewer bits on the color endpoints and more bits on the indexes, in order to represent the detail).

The resolution for color encoding is implicit and therefore does not need to be encoded; instead, the resolution is picked based on the number of values required by the selected color endpoint types and the number of bits actually available for color encoding. The resolution is normally picked as the highest resolution that will fit into the bits actually available.

As can be seen from the above, the technology described herein provides, in its embodiments at least, a data compression format for use, e.g., for texture maps in hardware graphics acceleration, that is in particular suited for applications where random access into the encoded data is desired. It can provide a high compression rate, which accordingly is particularly advantageous for portable and low power devices where power, bandwidth and storage space may be limited. Notwithstanding the relatively high compression rate and smaller compact nature of the data compression format of the technology described herein, it is still very capable of compressing, for example, different kinds of images, and in particular both real-world images and drawings, with little loss of quality.

Thus the technology described herein has particular application to the mobile gaming market, since it provides a high compression rate and therefore is suitable for devices with limited memory resources and memory bandwidth. The high compression rate also facilitates, for example, downloading of games or other applications, since it can alleviate network bandwidth and end user cost issues which increase or are related to the download time.

Furthermore, this can be achieved whilst still providing high image quality (which, as is known in the art, is critical for small mobile devices that have a limited screen size (as is known in the art, the smaller the size and resolution of a screen, the more effect on the perceived image quality noise or other errors has)). The technique of the technology described herein can also be used for a wide range of texture maps, such as including high contrast scenarios (e.g. drawings) and textures with alpha (transparency) values.

What is claimed is:

1. A method of representing integer values in an encoded texture data block that represents a set of graphics texture data elements to be used in a graphics processing system, the method comprising:
    representing by processing circuitry an integer value in the encoded texture data block using a base-n value, where n is greater than two.
2. The method of claim 1, further comprising:
    representing by the processing circuitry plural integer values in an encoded texture data block using a plurality of base-n values, where n is greater than two; and
    using by the processing circuitry a predefined bit representation to represent collectively plural of the base-n values, where n is greater than two, in the encoded texture data block.

3. The method of claim 1, further comprising:
representing by the processing circuitry each integer value in a group of integer values in an encoded texture data block using a combination of a base-n value, where n is greater than two, and one or more base-2 values;
representing by the processing circuitry the values of the base-n values (n>2) for the group of integer values using a particular bit representation; and
representing by the processing circuitry the values of the base-2 values for the group of integer values using bits; and
interleaving by the processing circuitry the bits of the bit representation representing the values of the base-n values (n>2) with the bits representing the values of the base-2 values in the encoded texture data block.

4. The method of claim 1, further comprising:
encoding by the processing circuitry two different sets of integer values in the encoded texture data block, one set of the integer-values used as or to derive a set of index values for the texture data elements that the block represents, and the other set of the integer values used as data values used as or to generate a set or sets of base data values for the texture data elements that the block represents.

5. The method of claim 1, further comprising:
encoding by the processing circuitry the set of texture data elements as a block of texture data representing the texture data elements; wherein:
the encoding the set of texture data elements as a block of texture data representing the texture data elements comprises:
determining a set of integer values to be used when generating data values for a set of the texture data elements that the block represents; and
encoding the set of integer values in the encoded texture data block including the representing the integer value in the encoded texture data block using the base n value, where n is greater than two.

6. The method of claim 1, further comprising:
dividing a texture map by the processing circuitry into a plurality of equal-sized blocks of texture data elements;
encoding by the processing circuitry each block of texture data elements to generate an encoded texture data block representing the block of texture data elements; and
storing by the processing circuitry the encoded blocks as an encoded representation of the texture map for use by a graphics processor; wherein:
at least one of the blocks of texture data elements is encoded using the representing the integer value in the encoded texture data block using the base n value, where n is greater than two.

7. The method of claim 1, wherein the base-n value (n>2) comprises a base-3 value or a base-5 value.

8. The method of claim 1, wherein the integer value represents an index value, a base data value, or a value to be used to derive a base data value, for the encoded texture data block.

9. An apparatus for representing integer values in an encoded texture data block that represents a set of graphics texture data elements to be used in a graphics processing system, the apparatus comprising:
processing circuitry that represents an integer value in the encoded texture data block using a base-n value, where n is greater than two.

10. The apparatus of claim 9, further comprising:
processing circuitry that uses a predefined bit representation to represent collectively plural base-n values, where n is greater than two, in an encoded texture data block.

11. The apparatus of claim 9, further comprising:
processing circuitry that represents each integer value in a group of integer values in an encoded texture data block using a combination of a base-n value, where n is greater than two, and one or more base-2 values;
processing circuitry that represents the values of the base-n values (n>2) for the group of integer values using a particular bit representation;
processing circuitry that represents the values of the base-2 values for the group of integer values using bits; and
processing circuitry that interleaves the bits of the bit representation representing the values of the base-n values (n>2) with the bits representing the values of the base-2 values in an encoded texture data block.

12. The apparatus of claim 9, further comprising:
processing circuitry that determines a range to be used for encoding a set of integer values in an encoded texture data block based on the number of integer values in the set and the space available in the encoded texture data block for encoding the set of integer values.

13. The apparatus of claim 9, wherein the base-n value (n>2) comprises a base-3 value or a base-5 value.

14. The apparatus of claim 9, wherein the integer value represents an index value, a base data value, or a value used to derive a base data value, for the encoded texture data block.

15. An apparatus for encoding a set of texture data elements to be used in a graphics processing system, comprising:
processing circuitry that encodes the set of texture data elements as a block of texture data representing the texture data elements;
processing circuitry that determines a set of integer values to be used when generating data values for a set of the texture data elements that the block represents; and
processing circuitry that encodes the set of integer values in the encoded texture data block by representing an integer value in the encoded texture data block using a base-n value, where n is greater than two.

16. An apparatus for encoding a texture map for use in a graphics processing system, the apparatus comprising:
processing circuitry that divides the texture map into a plurality of equal-sized blocks of texture data elements;
processing circuitry that encodes each block of texture data elements to generate an encoded texture data block representing the block of texture data elements; and
processing circuitry that stores the encoded blocks as an encoded representation of the texture map for use by a graphics processor;
wherein:
at least one of the blocks of texture data elements is encoded by representing an integer value in the encoded texture data block using a base-n value, where n is greater than two.

17. A non-transitory computer readable storage medium storing computer software code which when executing on one or more processors performs a method of representing integer values in an encoded texture data block that represents a set of graphics texture data elements to be used in a graphics processing system, the method comprising:
representing an integer value in the encoded texture data block using a base-n value, where n is greater than two.

18. An apparatus, comprising:
a graphics processing system; and
a block of texture data representing a set of texture data elements to be used in the graphics processing system, comprising:
data indicating a set of integer values to be used when generating data values for a set of the texture data elements that the block represents, and
wherein the set of integer values is encoded in the texture data block by representing an integer value in the encoded texture data block using a base-n value, where n is greater than two.

* * * * *

UNITED STATES PATENT AND TRADEMARK OFFICE
CERTIFICATE OF CORRECTION

| | | |
|---|---|---|
| PATENT NO. | : 9,041,723 B2 | Page 1 of 1 |
| APPLICATION NO. | : 13/464663 | |
| DATED | : May 26, 2015 | |
| INVENTOR(S) | : Nystad et al. | |

It is certified that error appears in the above-identified patent and that said Letters Patent is hereby corrected as shown below:

In the Claims

Column 65, line 19, claim 4: After "the" and before "used", please delete "integer-values" and replace with -- integer values --

Column 65, line 37, claim 5: After "the" and before "value", please delete "base n" and replace with -- base-n --

Column 65, line 50, claim 6: After "the" and before "value", please delete "base n" and replace with -- base-n --

Column 65, line 55, claim 8: After "value" and before "used", please delete "to be"

Signed and Sealed this
Twenty-sixth Day of April, 2016

Michelle K. Lee
*Director of the United States Patent and Trademark Office*